(12) United States Patent
Day et al.

(10) Patent No.: US 9,292,306 B2
(45) Date of Patent: Mar. 22, 2016

(54) SYSTEM, MULTI-TIER INTERFACE AND METHODS FOR MANAGEMENT OF OPERATIONAL STRUCTURED DATA

(75) Inventors: Fred Day, Cupertino, CA (US); Kevin Deremigio, Cupertino, CA (US)

(73) Assignee: Avro Computing, Inc., Cupertino, CA (US)

( * ) Notice: Subject to any disclaimer, the term of this patent is extended or adjusted under 35 U.S.C. 154(b) by 2076 days.

(21) Appl. No.: 12/267,815

(22) Filed: Nov. 10, 2008

(65) Prior Publication Data

US 2009/0125796 A1 May 14, 2009

Related U.S. Application Data

(60) Provisional application No. 61/002,628, filed on Nov. 9, 2007.

(51) Int. Cl.
*G06F 9/00* (2006.01)
*G06F 9/44* (2006.01)

(52) U.S. Cl.
CPC .................................... *G06F 9/4443* (2013.01)

(58) Field of Classification Search
CPC .............. G06F 8/20; G06F 8/33; G06F 8/71; G06F 17/30544; G06F 17/30569; G06F 17/30577; G06F 17/30598; G06F 19/322; G06F 19/3431; G06F 19/3443; G06F 19/345; G06Q 10/10; G06Q 20/102; G06Q 30/02; G06Q 30/04; G06Q 40/00; G06Q 40/12
USPC ......................................... 715/731, 762, 763
See application file for complete search history.

(56) References Cited

U.S. PATENT DOCUMENTS 5,432,903 A * 7/1995 Frid-Nielsen .................. 715/763
5,754,179 A * 5/1998 Hocker et al. ................ 715/835

(Continued)

FOREIGN PATENT DOCUMENTS

WO  WO 00/16307  3/2000

OTHER PUBLICATIONS

TimeVision, "TimeVision OrgPublisher: Make the Chart Work for You", Mar. 22, 2005, retrieved from: www.timevision.com/support/howto/howto.asp?id=mcwfu>, retrieved on Apr. 15, 2009, pp. 1-2.

(Continued)

*Primary Examiner* — Claudia Dragoescu
(74) *Attorney, Agent, or Firm* — Pillsbury Winthrop Shaw Pittman LLP

(57) ABSTRACT

The invention provides a computer implemented, methods, systems, software program devices, and a Multi-Tier Graphical Interface level General User Interface (GUI) screen designed to support data integration processes for IT and Subject Matter Experts User access and use of structured data sources. The software enables create, extract, transform, programs, processes, and load data integration application Data Integration Application (Composite Object)s through an object based software design enabling efficient and rapid retrieval, processing, and positioning of structured data directly from one or multiple data sources to the required formats, processes, and application support at the skills set levels of the user. The software is a command and processes design for Data Integration Application (Composite Object) that can be transaction oriented, recurring process, as well as periodic The software is an open, data oriented system design for rapid generation and support of Data Integration Application (Composite Object)s using a Multi-Tier three dimensional graphical interface design for cell based data applications. The Data Integration Application (Composite Object) are compiled, independent object applications residing in an object library designated by the user/user IT organization. The compiled data application object are run on the organization's existing computing systems under standard compute processing procedures as either independent applications or in support of the organizations ongoing business/operational requirements for data use requirements.

26 Claims, 63 Drawing Sheets

(56) References Cited

U.S. PATENT DOCUMENTS

| | | | |
|---|---|---|---|
| 5,900,870 A | 5/1999 | Malone et al. | |
| 6,253,218 B1* | 6/2001 | Aoki et al. | 715/201 |
| 6,816,175 B1* | 11/2004 | Hamp et al. | 715/854 |
| 7,451,403 B1* | 11/2008 | Srinivasan et al. | 715/763 |
| 2004/0139076 A1* | 7/2004 | Pendleton | 707/10 |
| 2005/0138160 A1* | 6/2005 | Klein et al. | 709/223 |
| 2005/0198569 A1* | 9/2005 | Fong et al. | 715/513 |
| 2006/0121436 A1 | 6/2006 | Kruse et al. | |
| 2007/0103984 A1* | 5/2007 | Kavuri et al. | 365/185.17 |
| 2007/0162859 A1 | 7/2007 | Yakowenko et al. | |

OTHER PUBLICATIONS

TimeVision, "OrgPublisher 6 PluginX Implementation Guide", retrieved from: www.timevision.com/docs/pdf/publishing_implementation_guide.pdf, retrieved Apr. 15, 2009, pp. 1-13.

* cited by examiner

Agora admin manager :: Accounting :: Person :: Person Change 1

Tabs: APP | GDI | Role | S | Analysis | Object | Schema | Rule

- Header Person 1 kd 01-01-1900 Change
- Compare (Branch == "denver")
- Include Person Address 1
- Include Person Name 1
- EOB
- Include Person Date 1

5501

Rule List — Expanded Include Rule Object

1) Header
2) Compare ( Branch == "denver" )
3) Include Accounting Person Address 1
4) Header
5) Comment This Collection parses an address string too; city, state and zip
6) ComputeString City LeftTrim Address " , " 0
7) ComputeString State LeftTrim Address " , " 0
8) ComputeString ZIP LeftTrim Address " " 0
9) Include Accounting Person Name 1
10) Header
11) ComputeString LastName RightTrim FullName " " 0
12) ComputeString LastName ToUpper
13) ComputeString MiddleName RightTrim FullName " " 0
14) ComputeString MiddleName ToLower
15) ComputeString FirstName RightTrim FullName " " 0
16) ComputeString FirstName ToName
17) EOB
18) Include Accounting Person Date 1
19) Header
20) ComputeString Month LeftTrim Date1 "" 2
21) ComputeString Day LeftTrim Date1 "" 2
22) ComputeString Year LeftTrim Date1 "" 2
23) ComputeValue TYear = Year
24) Compare ( TYear < 1900 )
25) ComputeValue TYear + 1900
26) EOB
27) ComputeString Date2 RightAdd Month "" 0
28) ComputeString Date2 RightAdd Day "/" 0
29) ComputeString Date2 RightAdd Year "/" 0
30) ComputeString EuroDate2 LeftAdd Year "/" 0
31) ComputeString EuroDate2 LeftAdd Month "/" 0
32) ComputeString EuroDate2 LeftAdd Day "" 0

OK

Compile

Maintain Rule Container
Command
Process Rule | Insert Rule
Edit

FIG. 55

SYSTEM, MULTI-TIER INTERFACE AND METHODS FOR MANAGEMENT OF OPERATIONAL STRUCTURED DATA

CROSS REFERENCE TO RELATED APPLICATIONS

The present application claims priority to U.S. Prov. Appln. No. 61/002,628 filed Nov. 9, 2007, the contents of which are incorporated herein by reference in their entirety.

FIELD OF THE INVENTION

The present invention relates to a computerized system, multi-tier interface and methods for data integration enabling and/or data integration applications, and more particularly to such interfaces and methods for information technology and subject matter expert users to manage operational structured data.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The emergence of the Data Integration software segment's importance for data's usage and management was defined by a leading technology industry analyst group, the Gartner Group. Following are some assessments and discussion from Gartner's Sep. 22, 2008 Magic Quadrant for Data Integration Tools Report.

To quote the report, organizations increasingly view investments in data integration tools as a strategic basis for enterprise data management . . . . Organizations recognize the role of these technologies in support of high-profile initiatives such as master data management (MDM), business intelligence (BI) and delivery of service-oriented architectures (SOAs). Recent focus on cost control has made data integration tools a surprising priority as organizations realize the "people" commitment for implementing and supporting custom-coded or semiannual data integration approaches is no longer reasonable. Vendor consolidation continues, driven by the convergence of single-purpose tools into data integration suites or platforms . . . . Buyers must recognize that, as an evolving market, disruptions caused by merger and acquisition activity are likely as smaller vendors with valuable technology continue to be subsumed into larger entities to form more complete data integration tools portfolios.

The discipline of data integration comprises the practices, architectural techniques and tools for achieving consistent access to, and delivery of, data across the spectrum of data subject areas and data structure types in the enterprise, to meet the data consumption requirements of all applications and business processes. As such, data integration capabilities are at the heart of the information-centric infrastructure . . . . Business drivers, such as the imperative for speed to market and agility to change business processes and models, are forcing organizations to manage their data assets differently. Simplification of processes and the IT infrastructure are necessary . . . .

The data integration tools market comprises vendors that offer software products to enable . . . : Data acquisition for BI and data warehousing: Extracting data from operational systems, transforming and merging that data, and delivering it to integrated data structures for analytic purposes. Creation of integrated master data stores: Enabling the consolidation and rationalization of the data, representing critical business entities such as customers, products and employees. Data migrations/conversions: Traditionally . . . via the custom coding of conversion programs, data integration tools are increasingly addressing the data movement and transformation challenges . . . in the replacement of legacy applications and consolidation efforts during merger and acquisition. Synchronization of data between operational applications: . . . data integration tools provide the capability to ensure database-level consistency across applications, both on an internal and interenterprise basis; Creation of federated views of data from multiple data stores: Data federation, —enterprise information integration (EII) . . . providing real-time integrated views across multiple data stores without physical movement of data. Delivery of data services . . . SOA context: An architectural technique, rather than a data integration usage itself, data services are the emerging trend for the role and implementation of data integration capabilities within SOAs. Unification of structured and unstructured data: there is an early but growing trend . . . "**

To summarize, the prior art suffers from the following Data Integration Software Issues: Data Integration Technology Reality—Data has overwhelmed Technology; There is no single data architecture or data truth; Data is a company's most important asset in the $21^{st}$ century.

Technology Reality—The issues and realities described below are a result from a number of technology, systems design, and software architecture limitations that have remained constant for over the past 25 years. The issues outlined here are currently being addressed by the major data integration vendors: Doing more of the same design; Doing it on a bigger scale (acquisitions), Expecting the companies to pay for a multi-step, expensive, technical high risk integration process over time.

The alternative option offered by vendors is hiding these technical issues of data complexity and chaos behind strategies such as Cloud Computing, Virtualization, Outsourcing, or Software as a Service.

Further Issues include those concerning Technology, Software Strategy, and Business Economics.

For example, Software vendors no longer provide the high level architectures to the market place for multiple application vendors to map to. Instead the market is given data integration "vision" by vendors. The implementation of the vision is being implemented through software acquisitions having disparate designs that are being merged over time into a single level of data integration software. The vision is really a compatibility strategy and not architecture. This is a result of almost 40 years of data integration type technology solutions coming to market. Data technology is getting more complex and more chaotic.

Another example issue is Fragmented Customer Data Environments. 40 years of vendor software, architectures, and processes has left companies with a fragmented disparate data environment. Second, the investment in data is large and growing. Third, data is an investment and asset that a company needs to have function in order to the run a company. Fourth, the business groups within a company are developing their own data solution on a departmental level.

A further issue is Vendor generated data silos. As the integration of software acquisitions goes forward the vendors are proposing to companies the value proposition of the issues related to data are high risk technical and business problems and we the vendor will remove these risks in return for your permission for their de facto taking over the data sources and data management responsibilities through a number of options. The vendor generated data silos eliminate a company's ability to make choices because the investment in software, implementation, maintenance, ongoing consult services makes changing financially and technically unfeasible without a great deal of cost and transition pain. Data silos have been a part of data management issues for decades. Each vendor's software, each generation of software acquired typically have their own data and data management infrastructure. It is manageable due to companies leaving the solutions in place for years; and they have slowed the rate on data software innovation to reduce cost and the technical implementation challenges.

Another issue relates to the fact that the vendor data integration strategy is to acquire enough software disciplines to offer a one stop shopping solution when a company needs data integration and data management software based solutions. They are attempting to dominate the market by being the most extensive and robust solution. Doing so by having a customer make a single vendor software choice. To date, the analysts have not confirmed any software vendor achieving the technical where with all to do this. It is an expensive, unproven, high technical risk option.

A further issue relates to License Revenue Model: How much function is enough? Software for over 40 years has been the license revenue model. It is model that today, has now become a technical problem versus a key revenue strategy for vendors and their customers. Today software revenue consists of version license fee, an annual maintenance fee, and consult services fees to implement and modify the software over time. The revenue license to be justified must periodically (3 to 4 year cycle) have new function in new versions being sold companies. The license model forces vendors to expand the scope and depth of function for each new release to justify the cost. This model is followed so publicly owned companies can retain or increase shareholder's value. Functionality growth has reach the stage where it is a problem for companies in terms of implementation costs and technical risks, diminished to no value of new the function, complexity/risks of change, and limited technical skills sets to support the process. This is another reason why architecture is no longer the focus but is it a marketing vision for software designing new software functionality.

A still further issue relates to Affordability versus Software Complexity. Small to medium business, enterprises and business groups within companies cannot afford nor technically support the data integration software trends. Whether the single vendor option is viable is a matter of debate. That is why the trend of self developed or hand code solutions are a major trend in the data integration segment. The cost basis must be re-aligned to the budgets available.

Yet another issue is Financial Operational Criteria/Group Funding. The CFO's set the financial and operational parameters for IT. The IT investments are being held to ROI or cost-benefit criteria. This is leading to SaaS, outsourcing, Cloud Computing. Etc. The financial community is sending the IT budgets to the business groups, letting the groups make their own decisions. This leaves IT with maintenance and computing operations and data storage support requirements.

A still further issue relates to User group strategies. User groups have compute skills and budgets to make their own decisions for their departmental or group operations. The PC/departmental compute and storage trend is still a major factor in software requirements. The vendor single solution approach does not fit the business, financial, or technical model used by departmental data solutions. They continue to develop and hire IT skills within their groups. The challenge is how to effectively provide a design of software to meet their data integration requirements.

A yet further issue is Sub-vendor technology. It is common development practice to utilize other vendor's software to support the value add software for the data integration software instead of the entire development being done in-house. This creates vendor dependencies on the sub-vendors. Case in point is the Microsoft software base GUI employed by the major software vendors. Many times the sub-vendor software and/or its architecture are not fully compatible or have taken off into a very different path to the vendor's own development requirements. When Microsoft announced VISTA was to replace XP based software, the data integration vendors did not move to the VISTA platform for a number of technical and business reasons. Technically, with icons, pop up screens and workflow design being tightly connected to the GUI design, VISTA represents a major re-write to the software without function enhancement considerations. The vendors opted to stay with their current GUI design. The trend is software vendors are delegating a part of their architecture and design, to other vendor standards.

The limited technical skill resources to implement and support complex software and data integration projects. The staffs trained in using data integration software are in very small groups of a few dozen trained data integration staff to support 5,000 to 10,000 or more size user community. The role becomes one of maintaining control versus supporting business/ROI initiatives. The highly skilled technical resources are not growing and therefore a new software design is needed to work with user groups have different and less skills than an IT corporate staff possesses.

The technology design challenges are also contributing to data integration issues. New, innovative design and GUI solutions are slow in coming because the underlying technology and design have not progressed. There are significant core technology design issues that are impacting data integration software's capacity to support company's leveraging their structured data sources.

The design, use, technical risk, and cost issues outlined are key factors facing data integration and management software. There is thus a need in the art to reduce the software complexity, data chaos, and provide the maximum flexibility for a company to use its data as required. Second, improving the ROI and business value proposition; by placing the data integration benefits and risks with those who require the solutions—the Subject Matter users. Third to provide the software to manage the disparate structured data sources at the Subject Matter Expert user's computing skills sets. Finally, provide an architecture and solution at a stable cost. To achieve this outcome requires a new design and invention basis for data integration and management software.

It is a design for current issues and to support the emerging technologies of the $21^{st}$ century: Cloud Computing, Virtualization, Software as a Service (SaaS), Services Oriented Architecture (SOA), Master Data Management (MDM), Business Intelligence (BI), Customer Relationship Management (CRM), outsourcing, open source software, and complex vendor software products (ERP, Real Time BI, Web 2.0, enterprise mash ups, etc). Fourth Generational Language ($4^{th}$ GL) interpretive software base: The standard software programming base is $4^{th}$ GL programming running an interpretive code execution basis. $4^{th}$ GL's design point is as interpretive based productivity programming whose purpose is to insulate programmers from the machine level code impacts. As applications grow in number over time and the amount of data being processed, the size of the server/mainframe must be increased for performance purposes.

Further, the visualization processes deploy icon commands; pop up screens for options to select, workflows for object base design, IE file folders and dashboards monitoring using a traditional Windows based GUI to provide function and visualization to the data integration processes. What changes have occurred are incremental to the core design first employed in the 1980's under the then new PC based (Client-Server design) initiatives running in private networks using dumb devices for users. This type of software design requires significant IT skills and experience to install, maintain, and use in the operations/business environment. The population in a company with the training and skills is 10 to 25 people supporting 5,000 or more employees or customers.

Second software design impact is the required use of script programming to support $4^{th}$ GL data integration solutions and connections between the programming. Script programming designs require scarce, trained, and experienced infrastructure programmer skill sets for writing support code for vendors' data integration software to function in a production or development environment. It is an intensive process.

Third impact is the design issues with data software GUI's very complex screen design, the processes supporting the data integration software, and its interpretive, $4^{th}$ GL. These screens are very icon intensive, use file folders schema extensively, pop up screens and program workflows within the GUI screen design. It requires IT skilled users to utilize this level of complex software design. The design inherently restricts how non IT users can access data.

The fourth major design factor is the central control of the data integration content and data sources. Security and control have been considered the value proposition for data integration design and use for over 40 years. Design issues also include the fact that the Internet came 10 years after the core design and architecture was developed for data integration software tools; and has not progressed away from its first generation design point.

The design and programming retro fits by the major software vendors has improved the design marginally. With the emergence of new technology trends for $21^{st}$ century outlined above, the design or combination of multiple software company acquisitions having very disparate architectures is a business market share program, not a design solution.

The interpretive code and code execution design architecture requires dedicated computing resources for designing and then executing the code in a computing production environment. The software must reside on the computing production system in order to execute. Since the large data integration vendors today employ interpretive code design, this assists in the business model of a single vendor strategy and the complimentary vendor generated data silo problem. Though $4^{th}$ GL was designed as productivity software it has become part of the issues due to incompatibility of vendor versions of the code, new functions one vendor has and another does not leads to vendor's software and structured data formats being incompatible. Great for the vendor revenue but an issue for a company needing an open, flexible data platform in order to maximize the business opportunities and ROI The acquisition strategy/trends are delaying re-design or new software design platforms because compatibility issues need to be resolved first. Customers do not want to deal with vendor software incompatibility design issues due to the master vision of vendor's market strategy. The latest trend by large vendors that indicates the scope of the design issues are recent announcements of dedicated computing hardware and storage merged with software to create "data warehouse machines" or "data machines/platforms". It is another indication that thirty year old designs and inventions is no longer meeting the requirements.

In all of these software design and architecture issues, the core of extensive technical skills is always a part of the designs offered. The central tenant of data integration software design is the control of the data is the most important functional design aspect. The control criteria also includes the security access processes but they are only a small part of the design complexity of the current data integration software standards. Thus, providing additional user access in the control data design, is viewed as placing the data at high risk for a number of valid business, security and IT management reasons. The net result however, is for the past 25 years departmental or group computing solutions have become a standard way of design support for users that is not fully managed by IT or the vendors. Such control issues as data de-duplication has already been by passed by the departmental solutions trends. The users are pulling the needed data to their compute and storage environment or are creating the data sources in the group.

The most serious software design issue with central control is that it involves the demand for data exceeds the limited IT resources. With 25 IT trained people to support 5,000 or more employees and control the data access and data source creation has been overwhelmed by the dynamics of the business model and workload. IT does not possess the skills, even when working with group representatives to support a dynamic $21^{st}$ century global business environment. This is why the statement that data has overwhelmed technology reflects a very significant data problem. It is because the software design and the processes are not structured to support the data environment into the future.

The technical review and assessment evaluation is the data integration software designs and architectures had become functionally overloaded, too complex for users. The fact that alternative options such as Cloud computing are being implemented are the real indicators of the need to start the design process from a new base point. It requires new software design criteria based on the proven, best, and practical results. The major design criteria is a mixture of technology, performance, ease of use, and support of a business ROI for data integration and how structured data sources are utilized.

In summary, data integration's complexity and chaos issues trends are getting larger and more difficult. The business performance criteria, data ROI, the data software complexity—chaos issue, and the emerging technology trends results in the conclusion that more function, more complex single vendor solutions, and more consulting services are no longer the future for an effective, flexible data integration solution strategy. It has failed and a new invention and design is required. A new solution based on the current issues and the lack of innovative design thinking is needed in producing cost effective, software having the core function to support a company's IT data requirements; and provide the Subject Matter Expert user direct access support to the needed structured data at their existing computing skill sets.

SUMMARY OF THE INVENTION

The present invention provides methods and systems for processing and managing operational data that overcomes the above issues, among other things. In a first broad aspect, the invention provides a Multi-Tier three dimensional graphical interface for viewing and/or managing operational data and corresponding functions. In a second broad aspect, the present invention provides functionality design for software to support subject matter expert users and IT users.

As for the first broad aspect, the invention provides a computer implemented method, system and computer program for disparate information enabling multiple sources and targets. The invention provides a method to display graphical sketch pad unlike the related artwork which provides icon driven workflow patterns and icon driven hierarchical menu systems. The invention sketch pad provides a layer-tiered pattern of applications, libraries and composite objects shown as Tee patterns, L patterns and Z hybrid patterns.

The invention provides a composite object system, computer program and method to enable a framework to include one or more connector, language and variable objects. New language object methods be created and provided language object methods can be extended and enhanced to service different application verticals: data transform, graphic exchange, engineering supply chain, data modeling or any other information related vertical.

According to certain aspects, the invention provides a Display method to draw objects on a TV, screen, computer monitor or handheld device. One implementation is a virtual sketch pad as a display panel that is boundless in the horizontal plane (X) and vertical plane (Y). It includes a single display component group is a composite of objects consisting of horizontal and vertical objects that decompose into sub-objects.

According to other aspects, the invention provides Placement algorithms to automatically place objects on a screen based on the intra and inter-relationships among objects. This includes a suite of placement algorithms that place components onto the virtual sketch pad based on component heuristics, inter-component relationships and intra-component relationships. This further includes a suite of placement algorithms that place components onto the virtual sketch pad based on usage, process and expert user knowledge defined into an algorithm. This also includes a placement strategy to place related components onto cells in a left to right process clustered around a center horizontal axis the overall algorithm is called the "T" algorithm. This still further includes a placement strategy to place related components onto cells in a bottom to top and left to right overall algorithm is called the "L" algorithm. This also includes a suite of algorithms called the "Z" algorithm places components onto cells using a composite of "L" and "T" algorithms based on the clumping of intra-relationships of related components and inter-relationships of related components.

According to additional aspects, the invention provides Navigation methods where a user can easily move from object to object on a virtual sketchpad A navigation aid provides a quick 1 or 2 button click from any primary level (application) and/or secondary level (library) component to a third level (object) component group located anywhere on the virtual sketch pad. A single click on a virtual sketch pad neutral image area turns "on" or "off" the display of all third level components. A single click on a virtual sketch pad primary level (application) image turns "on" or "off" the display of all third level components that belong to the selected primary level. A single click on a virtual sketch pad primary level (application) component highlights the display of all secondary level components that belong to the selected primary level component. A single click on a virtual sketch pad secondary level (library) component highlights the display of all third level components that belong to the selected secondary level component. Pan—the ability to point and click to slide the virtual sketch pad logically via a reference link, to the left, to the right, to the top and to the bottom. Zoom—the ability to point and click to zoom in (magnify) or zoom out (compress) the current virtual sketch-pad display. The zoom in and out can be either a reference link or actual pixel manipulation.

As for the second broad aspect, the invention provides advanced, composite compiled object software based, open data platform software invention to leverage large operational structured data volumes from disparate, incompatible, structured data sources for IT and Subject Matter Expert Users. These sources include, database, flat files with keys, binary, XML, and sources with structured data profile. This also includes the ability to transpose vendor unique designs, such as Microsoft EXCEL into standard structured data formats.

The software invention and design according to this aspect maximizes the ROI from the largest IT investment a company makes—that of creating, capturing, storing, managing, and using its operational structured source data assets. The software invention and design provides object based data integration management and data integration application processes for Subject Matter Expert Users and IT expert users. Software invention expanding the number of users having a more fundamental set of computing skills to directly access operational structured data sources. Data ROI criterion and design to maximize ROI by maximizing direct structured data access by non-IT users within standard security processes. Software architecture and invention designed for mitigating and reducing and/or eliminating conventional, highly centralized control of structured data sources, accessed by a limited number of users through traditional data integration software. The software invention is to expand the active use of data sources by as large a group of qualified users. A design with supervisory capabilities to manage a large of users directly accessing structured data sources through security processes. Software invention and design assisting in containment of data duplication (copying) with version management design since there is no single version of data truth. The software invention and design assists in containment of the technical process issues related to the data time stamp synchronization challenges.

According to additional aspects, the present invention recognizes that operational, structured data is the most important business asset of an organization. The ideal practical solution is single software architecture supported by multiple vendors, an open platform software or potentially open source code strategy supported by the company. Each of these three options has specific technical advantages and issues. All must support the following traditional requirements: data quality, data integration, data modeling, and ETL. Embodiments of the invention supports these and the requirements for data integration in the 21$^{st}$ century of: an expanded subject matter expert user group with direct access and participation to structured data sources. Second, a software invention and design for data processes to directly leverage application process without IT skill set prerequisites defined as a Data Integration Application. Third, a software invention reducing the traditional data integration software design complexity and chaos execution—keep it simple. Fourth, a software design and invention expanding structured data's ROI significantly expanding the direct number of Subject Matter Expert Users).

Aspects of the present invention provide for systems provide for systems tools and techniques allowing subject matter expert and IT users to easily create, test, and/or use data integration applications in connection with structured/key based data sources of existing computer systems within the company or external if access is permitted by other parties (global supply chain). The design structure format is a repeatable set of processes integrated into the software's screen formats, simplifying the data integration application creation for the users According to another aspect of the invention, the invention's open data platform is design to leverage the characteristics of operational structured data sources. The software is not the categories found in data software management at the time of the application filing. The software provides medium to small companies the net functionality needed for data quality, ETL, ETL and data integration application functions without requiring a massive infrastructure investment. Its design is uniquely efficient in the access and use of operational data sources, within the existing computing resources of the company; doing so in a much shorter period of time and resources due to software invention and design.

According to another aspect of the invention the software is designed as an open, horizontally integrated structured data platform. The functionality is designed to directly leverage disparate data operational structured data sources for technical and subject matter users to modify, copy, transport, or load into other data environments. It is designed to bridge major data source systems when companies are adding or selling business units. The software function execution is designed specifically for subject matter user experts to perform the processes that are done by a handful of very technical experts Embodiments of the invention and design support data integration and data integration applications via a command oriented and spread sheet function application design attributes. The core functionality is achieved without the standard GUI and software design using icon centric GUI processes, work flow charts, file folders or multiple pop up screens. Instead the software's command oriented solution that also integrates spreadsheet functionality programming options familiar to subject matter and IT users from PC based office suite software. The design function integration has been removed from the GUI and the software invention According to some aspects, the software has its data integration functional content designed in an integrated internal code. The integrated function is access through the custom designed, Multi-Tier graphical, three dimensional interface. The software and its Multi-Tier interface are designed to manage dozens to tens of thousands of data integration processes and applications on a company wide basis from a single enterprise level screen design. The scope of management capacity via the 3D graphical interface is extended with drill down capability into the underlying GUI tiers for edit and review purposes. A user can in a few seconds reach any data integration application in the company and review, edit or create or compile. The software's processes provide the core data integration functionality for a Global 2000 companies, business units, Small to medium Enterprises (SME), or Small to Medium Businesses (SMB).

According to certain aspects, the programming processes automatically document the DIA created by the user. The software design permits the printing of an entire DIA from the software's four major screens (Object, Rules, Schema, and Analysis). IT technical experts can utilize the software invention for rapid movement of data without the technical complexities of interpretive code or the use additional script programming. The software invention and design provides the core data integration functions where 90% or more of the necessary function can be provided with significantly smaller percentage of the resources (IT skills, cost, training) required by current options.

Current data integration software design require user's have significant technical skills, training, and extensive experience of several months to be effective and efficient. According to another aspect, the software design/architecture the invention's function internalization shortens learning curve to a few weeks for a Subject Matter Expert user. If a company experiences user turnover, the standardized command function permits immediate understanding for the next user of the data integration applications. The design also speeds structured data use transition between incompatible systems during acquisition or sale of a unit According to one or more embodiments of the present invention is based on long term trends of computing budgets being distributed to business/operating units of a company, the development of extensive PC software functionality and user skills sets (Subject Matter Expert User). Group PC software has created a large group of non-IT users having technical skills plus subject matter expertise in areas such as finance, healthcare, supply, manufacturing, human resources, process management, etc. The software design and the Multi-Tier interface enable the Subject Matter Expert users to directly access data sources and to perform data integration operations with minimal to no assistance from the IT. The commands and programming options enable a user to be trained in short period of time (a few weeks).

According to another aspect of the software when new vendor software versions of structured data are installed the software invention does not require re-compiling in order to operate. Interpretive data integration requires re-compile and interpretive compiling with each execution. Interpretive software must be compiled on the same type compute compiler as it was created on each time it is executed. The software uses the available company compiled adapters for each version of the computing system According to another aspect the software creates compiled object code for the Data Integration Applications. Consequently the software uses very small processor/server compute configurations to create and compile the software's data integration applications. The data integration application can be modified until it is compiled. Once an application is compiled it does not require recompile for extended use. Once compiled, an application runs in the standard computing environment; there is no requirement for the compiled application to be run on the development processor/server.

Another aspect of the software is by using command and spreadsheet programming concepts we do not require technical or script programming as a support prerequisite unlike the major data integration vendors in order to utilize our software by the subject matter expert user. The software is placed into the appropriate company IT libraries FIG. 9 with adapter support and access permission to data sources in order to function. Once set in place, the subject matter expert user or other users, per security permission can call and use the data integration application, even if they do not have the authority to generate or edit new data integration applications.

In embodiments, the software is designed to use the existing data access protocols of data base software. With compiled C++ generated data integration applications in the standard libraries of the compute environment. The Composite (Data Integration Application) objects can be used with transaction application systems within the Internet or be a batch processing an entire data base for Accounts Receivable on one time or recurring basis. Complied object software prevents the software vendor's generated vertical data silo strategy because of the open Data integration Application runs on any computing system. It is a self contained application not requiring direct AGORA software support.

An enhancement of the command function options does not impact the interface beyond the addition of the command to a pull down tab element or new spreadsheet application function term. An example is the addition of the "INCLUDE" command. It enables an existing Composite (Data Integration Application) that is compiled or uncompiled to be added at the users designated point of attachment into another Composite as nested code function. Beyond the pull down tabs new command on the Rule screen, all other changes were internal to the AGORA software code. We always can take uncompiled code, and place into another unpublished Composite object and then compiled with rest of Composite Object the Include has been placed. Can also take compiled or published objects and include with uncompiled Composites and then compile. Also the command and spreadsheet programming functionality is structured to be a very short learning cycle that expands to the skill set of the subject matter user capability similar to what spread sheet office software does in principle today.

According to another aspect, the invention provides data version control of the data integration applications created by author, time, and use of already existing DIA, compiled prior data integration applications and data sources. Until an application has been compiled into an object, the Rule, Schema, and Object compiled object modules. At that point a new version of that data integration application (DIA) can be created to be modified for new requirements. Data version control is basis for compliance—audit integration processes used for internal audit, public audit and compliance review and analysis. How data is used, when it is used and by whom it is used is critical in maintaining data quality, keeping data time stamps in synch over a large enterprise or unit business or technical environment.

According to one or more embodiments of the invention, the software maintains data integration application version control. The subject matter expert user creates edits, analyzes and compiles an application into object form. It is possible within a security class or defined group to give access to uncompiled applications prior to their being completed for edit or modification requirements. However, per the software security design, until a Composite is published (compiled object) a new uncompiled copy with a new version (X+1) and title cannot be created. In this structure, using the 4.2 Level of the Multi-Tier interface, a user will always see the last version of a data integration application as the first application cell on the three dimensional graphical interface. The user has the option to move back toward the original first version of a specific data integration application. Be able to review the schema, rule, object and create a new version, uncompiled with a new control identification number assigned to the Composite. For internal or external audit, IT operations review, etc. an administrator can review and validate every version of a data integration application created for a specific user path.

According to one or more embodiments of the present invention the software automatically documents the data integration application of the three elements: rule, schema, object, analysis. The design is to provide immediate documentation at the Subject Matter User skill set.

According to another aspect of the software, the Principal Administrator or designates have the ability under the Multi-Tier interface to copy pre-compiled or compiled applications. This provides the capacity to run hundreds or thousands of objects from the software on the largest VM or IBM Z series processor configuration since interpretive processing is not required. DIA are compiled objects to a computing system and executes profile similar to a business application.

Another aspect of the invention is the data integration support of a company's internal, external, and regulatory audit data requirements (Audit Integration). The invention can also be used to assist independent data detection programs for fraud detection and ID theft along with service options.

An embodiment of the invention is software that provides an internal audit and CPA centric Audit-Solution utilizing a sophisticated application based architecture and strategy to support the audit requirements. A cost effective solution that retrieves value from the client's data through rapid creation, positioning and structuring to the required audit data-information formats. The solution also supports testing and computations supporting the audit evaluation requirements processes for improved productivity and cost. Functionality includes: Sarbanes-Oxley compliance support; Simple user interfaces; Merges, splits disparate data sources into audit organization requirements; Data synchronization; Data quality and filtering capability; Automatic audit trail documentation Still further aspects of the invention relate to the operational data needs to support a global supply chain and a glass supply chain. Embodiments of the invention are designed to contain and reduce the impact of the data challenges associated with supply chain requirements. The invention assists IT in positioning, creating, controlled replication, structuring and delivering data to subject expert users while meeting the CFO's objective for IT'S cost effective support of the company's business requirements. The invention also assists support of an enterprise's external and global supply chain data volumes. Additional embodiments of the invention also provides for supply chain operational data which includes: Support internal and external operational data sources Rapid reposition, restructure and selective copy of operational data sources Integrate disparate data sources for use within the enterprise or reposition for external business partners requirements.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 55 is a drawing example of a Composite Object program display with nested Composite Objects.

DETAILED DESCRIPTION OF THE PREFERRED EMBODIMENTS

Figure 1:
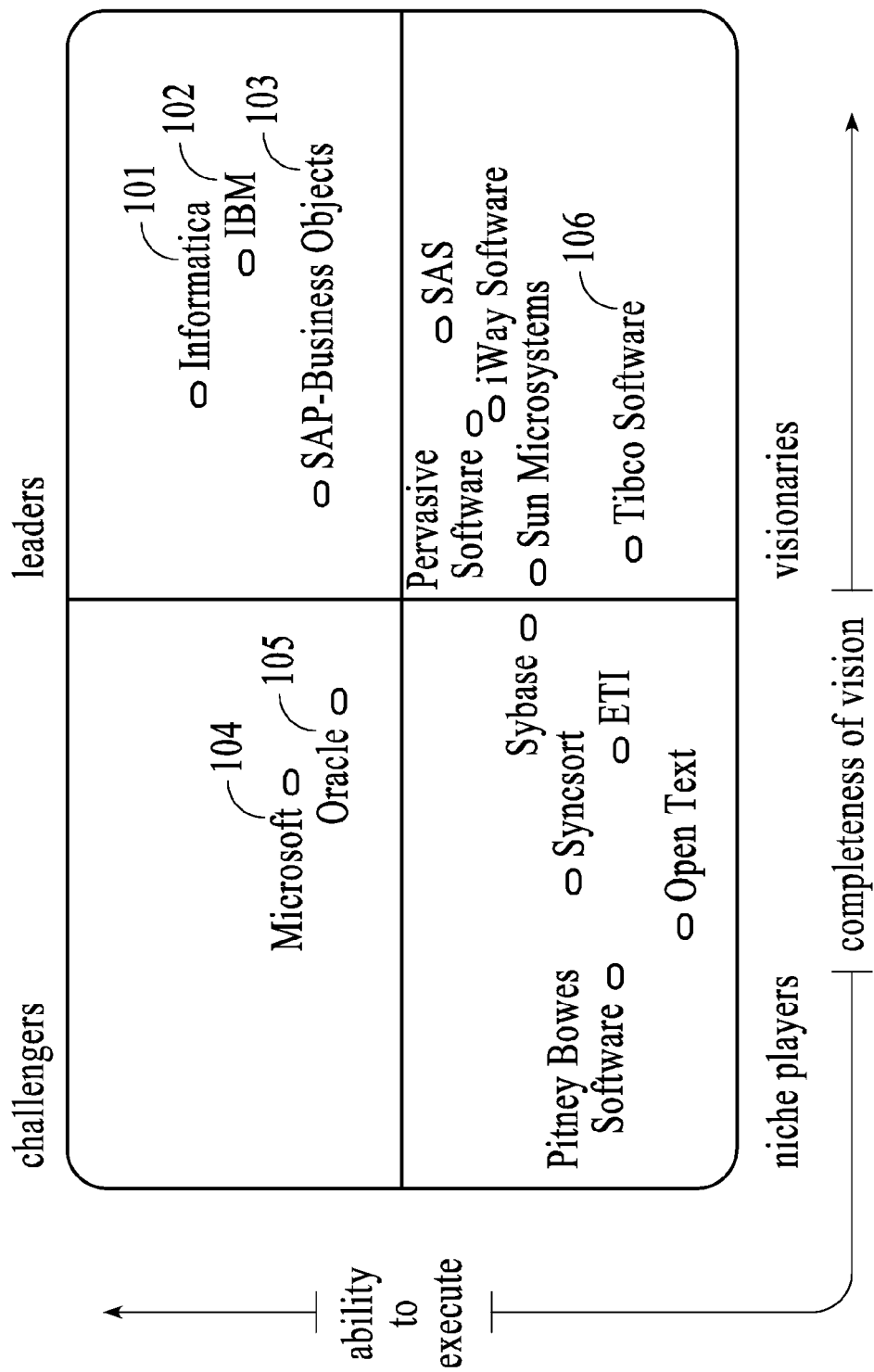
FIG. 1 is a chart illustrating conventional Data Integration Tools.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general aspects, the invention is designed for structured and key based operational data sources. According to survey's by the software industry, these types of data constitute approximately 15% to 20% of all data resources within an organization. The other 80% of data type is unstructured data. The unstructured data's operating profile is a short life cycle value versus structured data's the high value proposition supporting a company's operations. The value loss for unstructured data is validated by the backup and short time to archiving processes used by companies in order to control costs associated with maintaining on-line data for extended period of time. We are also excluding retention of data called for by statutory and compliance requirements (Sarbanes-Oxley).

The design incorporates data integration's extensive and complex functionality principles in the AGORA software inventions enabling an intelligent Multi-Tier interface to efficiently support a Subject Matter Expert user at their computing skill set. The design permits the subject users to leverage their expertise in performing their job. The traditional design of data integration software since its inception in the mid-1980's is to have a small team of highly train IT technical experts manage and centrally control the structural data of a company. In an organization with several thousand employees, you will find between 10 and 25 IT staff trained on data integration software. Given the employee turnover rates, acquisitions, mergers, and de-acquisitions, this has resulted in the reality today that Data Has Overwhelmed Technology.

This data issue is causing the large data software vendors to begin designing software to centrally control all aspects related to the structural data of a company. Such influences indicate an acceleration of the developments along the current data software architectures. The first trend is the extensive acquisition activity by large software vendors of data software companies in several segments of the data integration market (ETL, BI, CRM, Performance, De-duplication, etc.).

Second trend are the reports of significant development resources, public announcements of integration projects/programs to merge these large disparate software acquisitions over a period of time. The goal being reduced data complexity in source environments and reduction of the disparate data software architectures.

Third, the vendor's unified data software strategy where companies are told they can significantly reduce the data complexity and chaos factors by having the vendor assume the technical risks through transferring effective control of data to the vendor's resources. There are technical issues with the unified approach with vendors including, significant script programming, and use of $4^{th}$ GL interpretive software and its impact to computing.

Fourth, the traditional design point of using a Microsoft based GUI with its standard design options of extensive icon function use, pop-up screens, workflows and object flows, IE folders, and the use of 1990's based dashboard monitor screens processes. The interfaces were designed in a more generic level to be used in multiple software environments versus optimization to data integration requirements.

Fifth, the data types, sources, and high growth rates have caused the structured data environment to become so complex and data management support so expensive that the cost-benefit model by vendors is moving to alternatives such Software as a Service (SaaS); Cloud Computing/data centers supported by Virtualization to improve the efficiency of compute and storage systems. These options are intended to preserve the vendor's footprint in an account versus the alternatives.

Sixth, the financial trend company's CFO is requiring IT to lower costs and provide more services to the company. IT is becoming a commodity service that must produce an ROI to justify budgets and resources. IT is seen by financial executives as a cost center needing financial metrics to improve. That computing can be outsourced since the cost benefit is the highest priority and the cost is not worth the value-add of IT. Further, IT is being reduced in its skills resources; along with its budget being directed away from IT's traditional control to the business/user units within the organization.

According to certain aspects, the data integration application invention described herein is based on technical, ROI, and subject user productivity requirements from direct access to structured data sources. One aspect is to simplify the screen format, moving current external function processes to internal software processes, eliminate script programming, and center the design such that it supports a high productivity for Subject Matter Expert Users. The software architecture invention is designed to support thousands of users in a global operating environment where it is highly likely to be in a data operations environment with complexity, chaos, numerous incompatible data formats, minimal IT skilled resources and the need for stability of software versus the software upgrade license revenue driven approach. The inventions and designs are based on the actual ways structured data is used within organizations. The realities include:

First, there is no one version of truth as regards data. The biggest challenge faced with any software working with data is the time stamp challenge. Data is in constant state of being added to, modified in order to support changing and new data requirements for organizations to make needed decisions. The invention is designed to account for this reality. It is designed to replace the long standing strategy of central data control being a priority for data software. Additional support for this position is found in the data de-duplication software's emergence as being essential due to the amount of data being copied. The central resource approach of a group of 10, 20 or 50 IT skilled technical staff managing this has proven to be ineffective and expensive.

Embodiments of the invention are designed to assist in containing the data complexity and chaos. It permits some level of data being copied by the Subject Matter Expert users for doing their work. The ROI value proposition is the more data is used directly by a large user group, the higher will be the ROI. However, without giving larger groups of people direct access to structured data sources, the ROI will continue to under perform.

Second, the trend of vendor taking the technical data management risks associated with structured data use in return for control and management to date has not proven itself to be effective. The single data software vendor option leads to the "vendor generated data silo." That once data is captured in the vendors schemas, the technical and cost challenges will preserve the data silos and restrict the organizations decision flexibility. The assumption that a single data software vendor can integrate disparate software acquisitions and deliver a cost effective, complete technical solution to large, medium or small companies is historically an open question.

Third, the software vendor's integration program for merging the disparate acquisition architectures is generating large software programs of technical complexity requiring extensive third party expertise in order to install, use, and maintain. Such technology architecture, merged with the data silo impact, is not a practical, cost effective solution for Small to Medium Business-Enterprises. They do not have the budgets.

The present disclosure hereinbelow generally outlines a Multi-Tier Interface design and invention and an integrated software design and inventions (sometimes referred to as AGORA or AGORA software). Features in one embodiment of this invention may be combined and support other features in additional embodiments of the invention, as will become apparent to those skilled in the art after being taught by the present disclosure. More particularly, one embodiment that will be described in detail below is that the Multi-Tier Interface inventions are practiced together with the integrated software design and inventions. However, this is not necessary. For example, the Multi-Tier Interface inventions may be practiced with other data management software, such as commercially available software from Oracle and SAP. Those skilled in the art will be able to implement the inventions in these and other variations after being taught by the present disclosure.

FIG. 1 illustrates how various conventional products can be viewed at a market level in the software segment defined by the Gartner Group Analysts as the Data Integration software category. In general, products in this segment are designed to support the use, transformation, and control of structured and unstructured data sources. The embodiment of the inventions centers on access and usage of structured data sources for groups beyond the traditional IT skilled user groups to what is defined in this application as the Subject Matter Expert users.

Subject Matter Expert Users are those users who have software and compute skills enabling them to utilize software at spread sheet create level of skill and experience. They also have subject matter expertise in their work experience (HR, finance, manufacturing, marketing, sales, etc.). The software and Multi-Tier Invention enables these users to have direct structured source data access and use without having the pre-requisite IT of data integration skill sets. The goal of providing direct data source access to these users is they are a much larger group of users per an organization than IT skilled group. Second, one of the goals of this invention is to expand the ROI gained from structured data sources. ROI is defined, in part, as the more data is used, under proper authority; the higher is the ROI benefit for the company.

Embodiments of the inventions find particular utility in one or more segments of the multiple data software categories within the data integration space. FIG. 1 is a Gartner Group overview of software segments and architectures they have included in the Data Integration market. The categories include: Service Oriented Architecture 106 (SOA), Master Data Management 106 (MDM), Enterprise Data Mash-ups, Web 2.0, Business Intelligence (BI), Customer Relationship Management (CRM) 104-105, Extract, transform, and Load (ETL), 101-105 and Data Warehouse (DW) 101-105. The large vendors are major participants (Oracle, Microsoft, IBM, Informatica, SAP-Business Objects).

According to certain aspects, the present inventions provide improved access, use, version control, and a significantly wider access to users with PC based, computer software skill sets. Second, the software and the Multi-Tier Interface of the invention support the most valuable data in an organization—its structured data. This includes databases, flat files with keys, binary, etc. Although not supported in some embodiments, unstructured data is a future support option that may also be supported. Finally, the invention and design for the software is the extended use of data with automatic Composite Object documentation and Search support.

Problems To Address: Current data integration software design profile is a very complex structure built up over many years. It requires extensive IT skill sets and data experience to use the software effectively. The design point purpose of data integration software is the control of data sources dome by permitting only a small user group of a few dozen out of several thousand employees the direct access to an organization's structured data sources. Control equals value because data is the most important asset a company owns.

The Cost Factor: Current data Integration software has several cost factors. First, has a high vendor license software fee, plus ongoing maintenance fees. Second, there are extensive installation and implementation consult fees because the technical skill sets are scarce. Third, the interpretive software code design drives significant amounts of computing and storage infrastructure. Fourth, the large software vendor's acquisition strategy is to create a single software vendor option for customers; thereby causing several expensive software license installation cycles of merging disparate software acquisition architectures is expensive. Fifth, the vendor's strategy of a one vendor solution is creating a new problem of "vendor generated data silos" where competing data software strategies are making transitions or interfaces with other software vendors difficult; plus restricting companies from remaining flexible. Sixth, businesses are facing increased complexity to support and use their data as the global economy forces ongoing changes to the business model. Finally, businesses re-organize, changed business models, or buy-selling business units. All add to the costs of data use and integration while adding technical complexity, chaos, and costs to how best leverage their data sources.

AGORA/Multi-Task Invention Value Proposition: According to some aspects, the present invention provides core data integration functionality for structured data sources permitting direct source data accessed by Subject Matter Expert users at their compute skill levels. This is done with the understanding that new technology features alone will not fully resolve the large challenges facing data use and integration.

Part of the background criterion the present invention and design take into consideration include: Data has overwhelmed technology; There is no single data version of truth; Data is the most important asset owned by a company; and The more data is accessed and used the higher the organization's ROI from its data.

Addressing these challenges requires a technical and business re-evaluation of how to design a system and method to better work with structured data. It also means looking forward to the emerging technologies and trends of Cloud computing, Enterprise Data Mash-ups, Virtualization, outsourcing, off-shoring, LEGO data centers, and Software as a Service (SaaS).

The software and Multi-Tier Interface designs and inventions are based on these and other technical and business criteria. The inventions' goals include achieving cost effective, efficient data integration software than can be deployed on a scale from small business to business units to enterprises and into global supply chains in order to gain the full ROI potential in structured data sources. The criteria applied to these inventions and designs include: (a) Support for IT, Management, and Subject Matter Expert users access at their respective compute and expertise skill sets; (b) Designed as an Open data platform focused on structured data; (c) Is a Horizontal data centric platform; and not a B.I, CRM, data ware house, etc. type solution; (d) Maximizes the number of users from dozens up to thousands within large organizations because direct access and use brings an ROI similar to what PC based office software has accomplished; (e) Cost effective support for small, medium, business units and global 2,000 companies/organizations; (f) Provide data integration core functionality to support direct access to structured data sources; (g) Bridge disparate structured data resources internal and external to the organization; (h) Minimize the required resources from the IT skill set group to a support and supervisory role versus a data integration development role; (i) Scale back the heavy centralized control strategy has caused data to overwhelm the technology.

Figure 2:
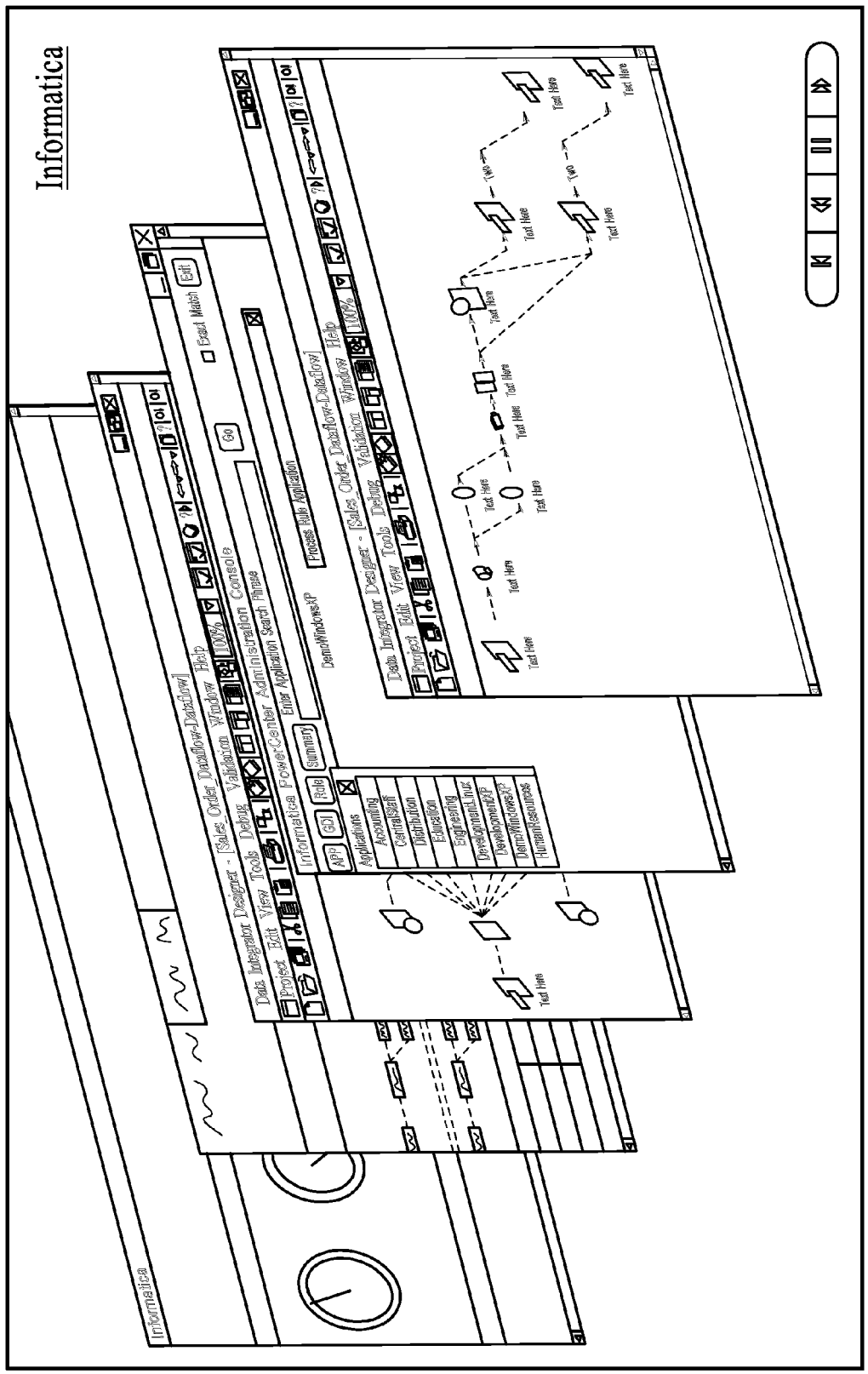
FIG. 2 is a marketing brochure data integration software screen shot from Informatica, a leading vendor in the Data Integration software market, showing the design of their software using workflows, file folders, dashboards for their data software.
Figure 3:
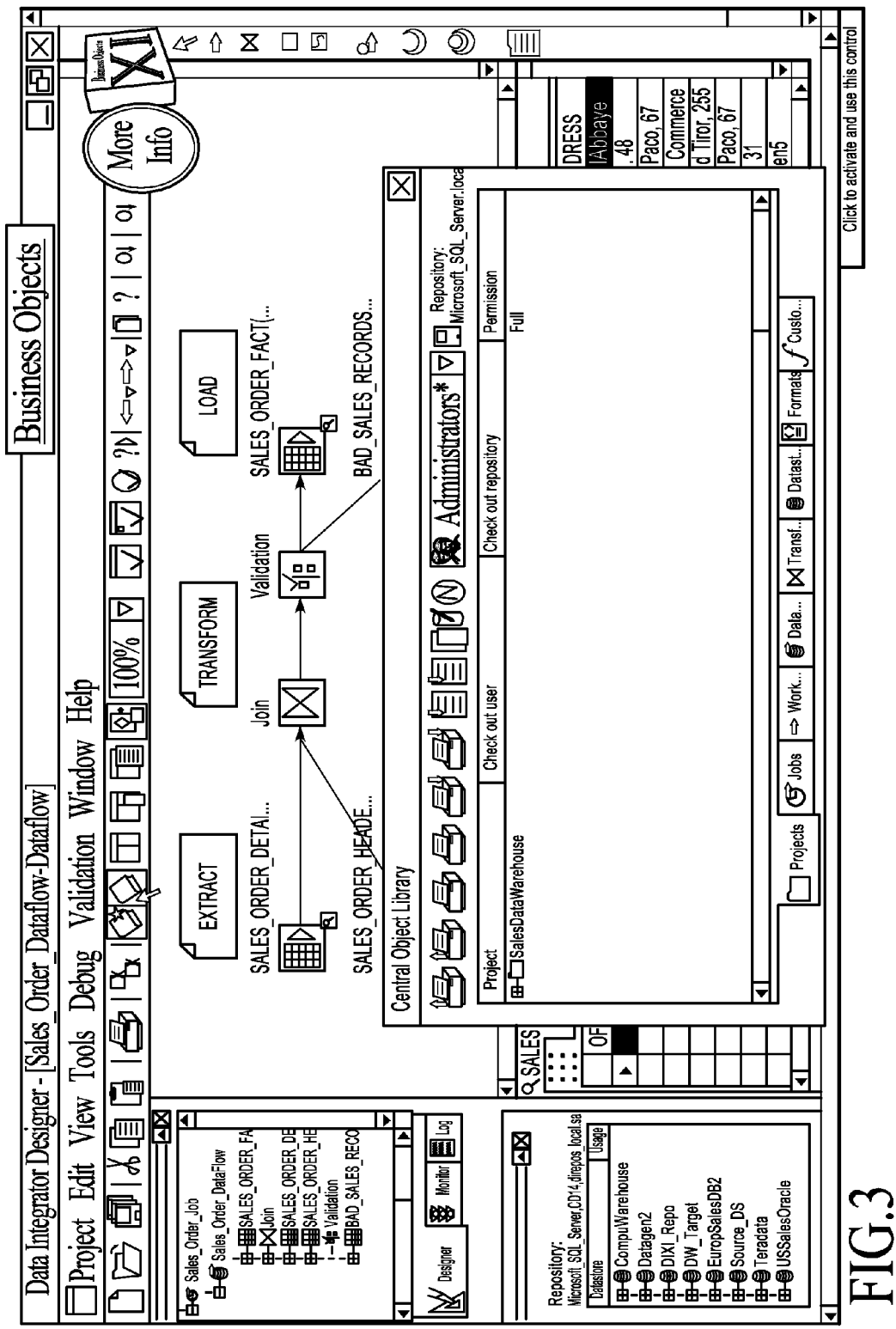
FIG. 3 is an example from SAP-Business Objects marketing content of a published screen of their data software design containing a traditional screen design with numerous icons positioned on the periphery of the monitors screen display.

An aspect of the scale of the data integration design issues can be seen in FIG. 2 and FIG. 3, which illustrate examples of the current technology interfaces and software design standards available from Informatica and Business Objects, respectively. These designs were initially developed in the 1980's a decade prior to the Internet and post the main frame era. The screen design issues center on the extensive use of icons, pop-up screens, workflows, dashboards and IE folders based on Windows GUI architecture based on a general vendor GUI design.

The present invention generally includes a Multi-Tier Interface and data integration software (sometimes referred to herein as AGORA software). Embodiments of the inventions are designed for Subject Matter Expert users and IT skilled users leveraging structured data sources through a data integration design. Embodiments of the inventions use an objects based design using a series of data oriented screen formats (Rule, Schema, Connection, Analysis, Manage, and Search) that support command with spread sheet programming functionality. Although the AGORA software design and Multi-Tier Interface is particularly useful for Subject Matter Expert Users computing skill sets, it can also be used by IT users. The invention provides application support for simple to complex programs as designed by the users for their requirements. The invention also will support IT users for data integration, data quality, and a new form of application design of a Data Integration Application (DIA). A Data Integration Application takes the principles of business application development and applies them in a new design and invention for data only production programs structure and implemented by Subject Matter Expert users within their security authorization.

In embodiments, the Multi-Tier interface according to the invention includes multi-level and multi-design GUIs designed to simplify the access and direct use of structured data sources while the function complexity resides in the AGORA software invention. A command and spread sheet function programming design enables the Subject Matter Expert users direct access to structured data sources; and permits the build of data integration applications through users current computing skill sets. One of the design goals is to enable a large number of users to conduct their job requirements with a minimum of support from the IT resources. By engaging more users, the provision of a more productive interface and code design significantly increases the ROI from operational structured data than current data integration designs.

Figure 4:
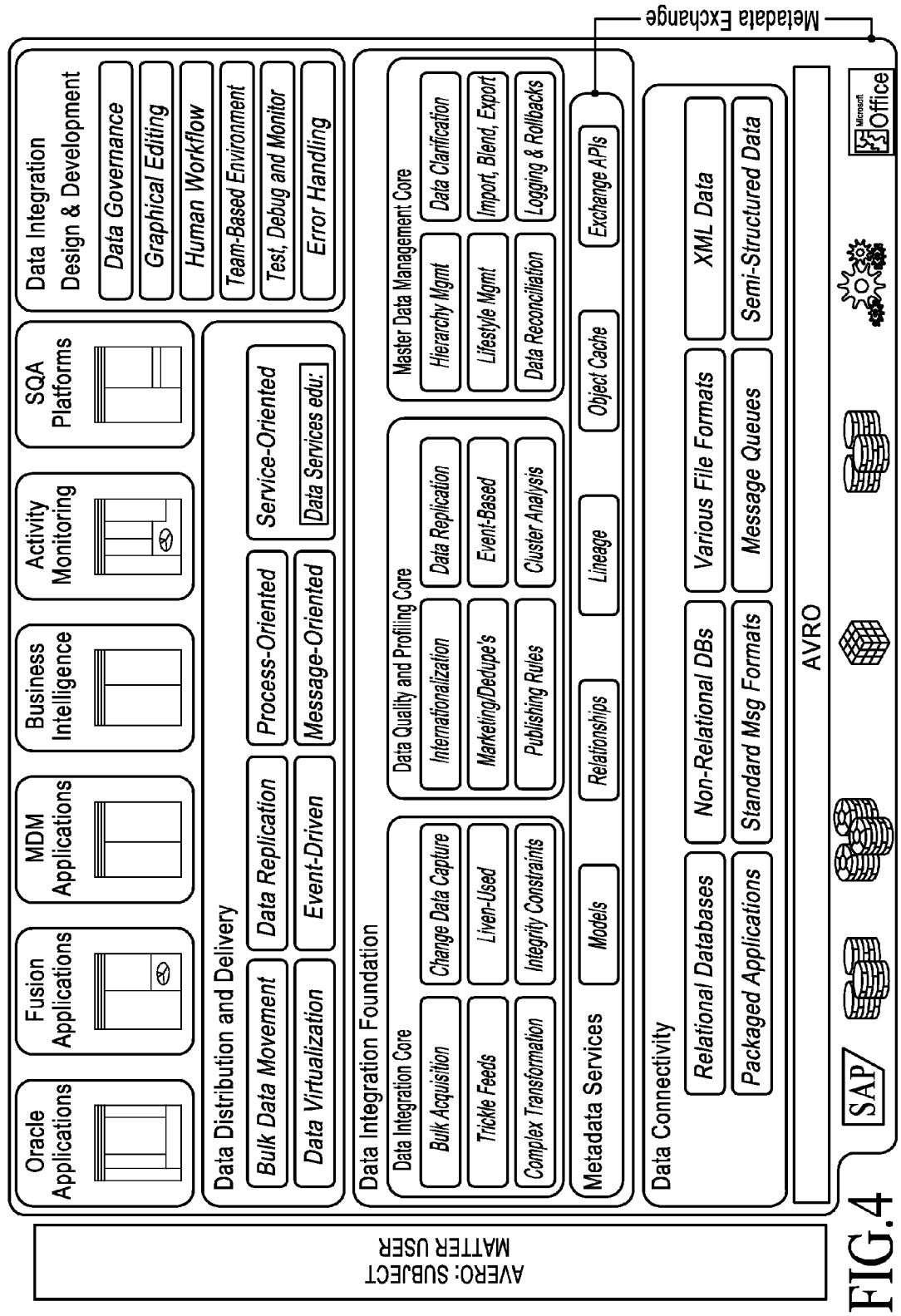
FIG. 4 is an Oracle published architecture diagram defined in their data integration marketing brochure that outlines the multi-level applications, data, and meta data layers.
Figure 5:
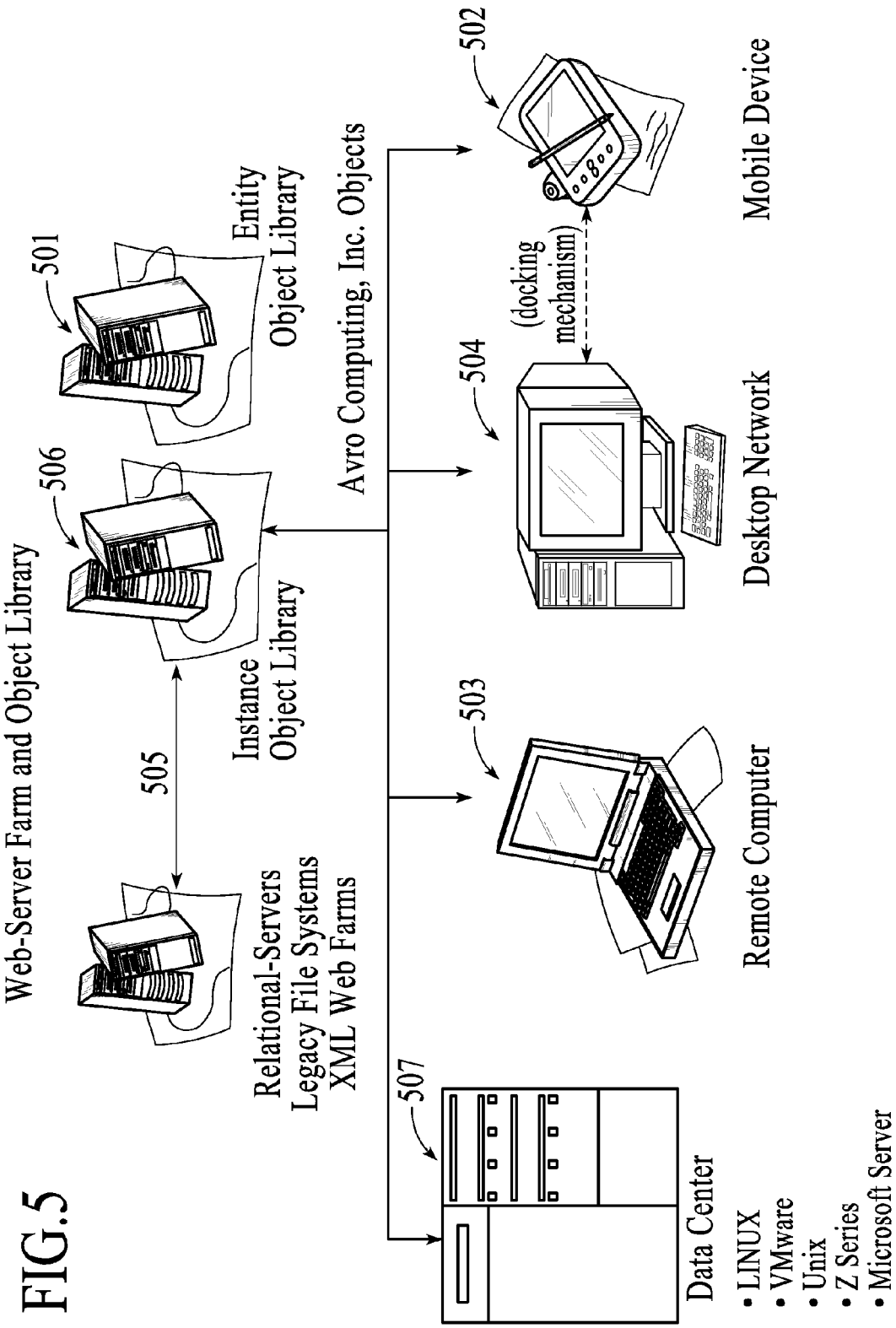
FIG. 5 is a drawing of a Services Overview compute environment with intelligent compute platforms and storage and the future environment having numerous types of intelligent appliances with requirements for structured data and how software invention is positioned.

An example implementation of the invention positioned with Oracle's software stack FIG. 4. As shown, it positions the software (i.e. AGORA) and Multi-Tier interface of the invention within an Oracle stack strategy referencing their master data and application strategy including recent software acquisitions. There are approximately ten layers of software and software function. AGORA's positioning is above the storage hardware platform software and below the data and application levels of the vendor. It should be noted that, other than AGORA software being inserted into the stack drawing, no changes have been made in other aspects of the Oracle stack. The open platform design of the invention permits access and use of data sources without impact to existing data and application processes. This flexibility permits additional users access without impact to the operations FIG. 5 is a services overview of software connections according to one or more embodiments of the inventions. It illustrates the multiple types of connectivity functions and capabilities of the invention to move structured source data to and from a physical storage location(s) 505 to the device or user location via a series of compiled objects that form a data integration application (DIA). The access to the source data can be in the form of one data source to one data target, one to many, many to one, or many to many. It also merges data fields from different data sources as well as the entire data record. Each instance of the DIA is an object compiled application residing in an object library 501 as designated by the company's IT group. This design does not require vendor specific libraries. The request for data can be made by a Subject Matter Expert user via a number of intelligent appliance options. It enables devices both web-based and data/server centers located; encompassing from server, PC's and intelligent appliances 502-504 to access or provide structured data sources or targets per the software invention's object based design (Composite Objects).

Direct access to operational-structured data sources 505 is done via the company's security processes. Composite (C++ compiled) objects for structured data access are created in the software design and invention via the Multi-Tier Interface through a series of commands and spread sheet type programming options. The invention design permits individuals with subject expert computing skills to access data sources directly and develop compiled objects we define as a Data Integration Application (Rule, Schema, Object) applied design based on invention of a Composite Object (Variable, Language, Connector) residing in account designated Web-server and object Libraries 506.

The software of the present invention provides data applications designed to work all of the traditional and emerging technologies data requirements. The design supports ETL, Data Quality, data management, compliance-auditing processes, and copy functions 506 as required by the user criteria. It has data version and application control to maintain the time stamp continuity between original data sources and the extended data used in a multiple user requirements.

Composite Objects (i.e. Data Integration Applications) are created with embodiments of the software invention and the integrated Multi-Tier GUI interface. Once compiled, the Composite Objects (DIA) are placed in a user designated object library 501. Library 501 is not necessarily unique to the software of the invention. The objects are created with a set of six base screens. The software's Composite Objects supports data center and web based processing enabling the users to schedule the data integration applications as individual transactions initiated through a web request by a user. The object library applications can also support batch processing, batch store and forward requirements using the computing systems job scheduling resources, and under IT supervision, applications can be replicated in order to run thousands of data integration applications in parallel computing operations in a global 2,000 organization across multiple processor platforms 503,505,507. The invention also runs under and/or with multiple vendor operating systems.

The capability to execute in multiple processor and intelligent appliance environments from a single web based transaction to thousands of compiled objects executing in parallel across a data center is based on a design that avoids using interpretive code programming, icons for command function execution, workflows, pop up screens with any of the prior programming functionality, dashboards, and documentation per application of dozens of pages that no one is going to read or use. The invention permits Subject Matter Expert users via the design to access data from new sources within very short periods of time (hours not days or weeks) using an integrated test and analysis design for validation of Composite Objects (Data Integration Applications).

Embodiments of the software design according to the invention are based on using C++ compiled object code, 6 screen types (Schema, Rule, Object, Analysis, Manage, Search) to form the data integration application, auto documentation, data version control, and leverages a Multi-Tier interface design supporting enterprise wide access in a few seconds to any data integration application, subject to security authorization. Because it is compiled object software, the server residence profile for the invention and design resided can be dedicated or shared (see FIG. 9) Embodiments of the software are designed to run with the in-house compute operating systems 507 enabling the software to scale from small servers to multi-engine servers to large IBM type Z-Series processors. It should be noted that the design does not require script programming to create or run execution of Composite Objects (DIA).

Software design compiling processes enable the software according to the invention to be compiled in most instances a single time and then run on one or more of the multiple computing platforms 507 shown in FIG. 5 (e.g. Linux, VMware, Unix, Z Series, Microsoft server, etc.) This permits a degree of scalability across not only disparate data source structures but disparate computer operating systems. Like other data integration software, the adapters used in interfacing through the API are required to be compiled for each instance of a vendor data software version; and also for the version of the computing system running a Data Integration Application. It should be noted that there can be additional compute operating systems 507 beyond those listed in FIG. 5

Figure 6:
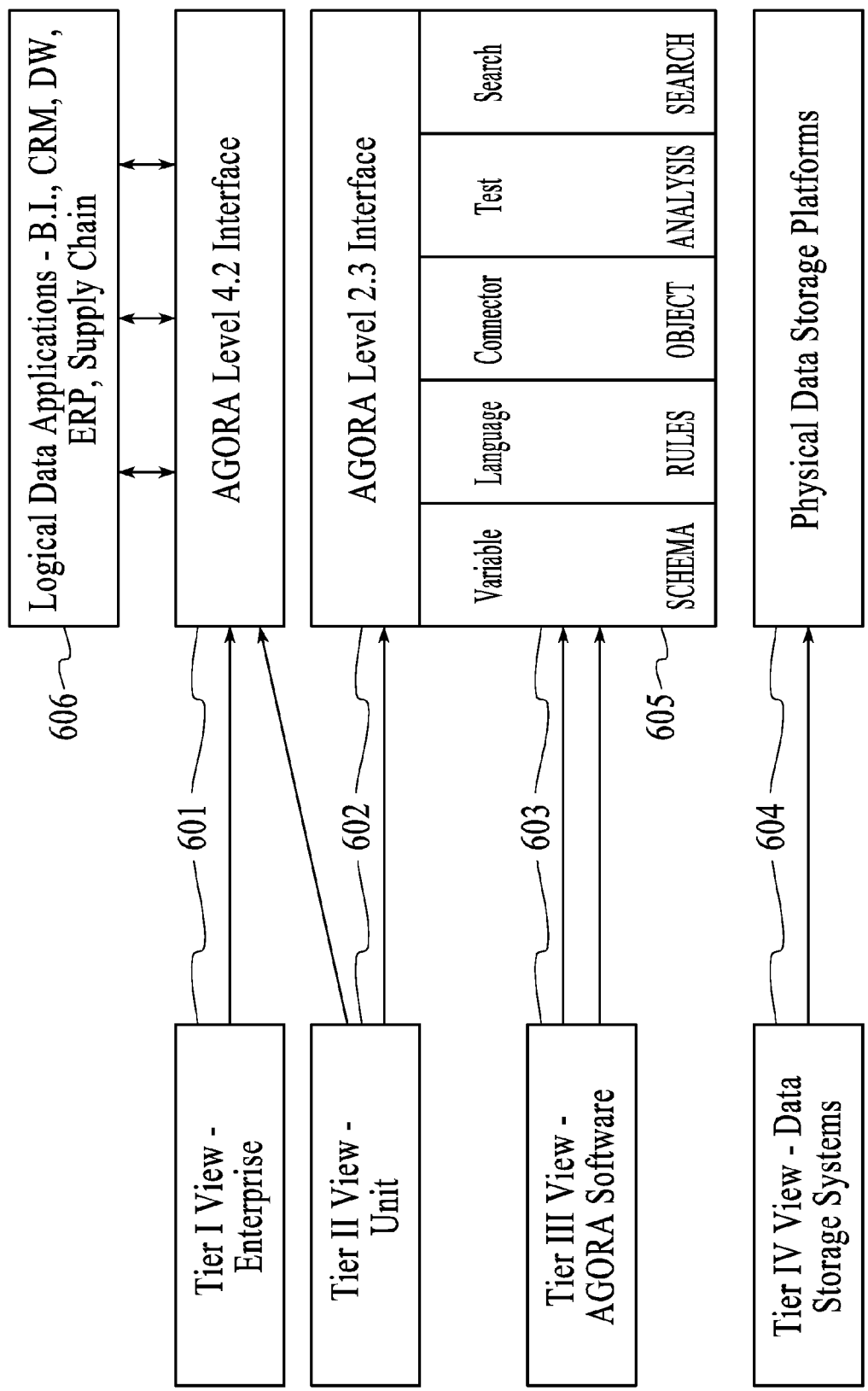
FIG. 6 is a drawing of the design elements of the invention in a multiple tiered design overview.

FIG. 6 shows how embodiments of the software platform inventions can have several object components including Tier III 603 which can include objects Schema (Variable), Rules (Language), and Object (Connector) There are four Tiers 601-604 of the software and the Multi-Tier three dimensional interface.

As shown in FIG. 6, Tier I is the enterprise/company level 601 the applications 606 and the primary Level 4.2 interface to embodiments of the present software invention. The Multi-Tier interface is a combination of various possible interface designs according to embodiments of the invention. The Tier I provides (e.g. through techniques and methods to be described in more detail below) a design supporting the Subject Matter Expert user's compute skill sets while creating data integration applications from simple to complex scale. The preferred interface (sometimes called Level 4.2 herein) is a graphical, three dimensional design for use with extensive amounts of Composite Objects. It displays through a graphical layout, thousands to tens of thousands of Composite Objects (Data Integration Application) cells that are Published (compiled) or uncompiled (Change mode) state. Tier I also enables a user to rapidly access the required data application. The interfaces support moving and modifying structured data to meet the application requirements 606.

Tier II is the function development and compile level 602 of the Multi-Tier Interface GUI. Other possible interfaces (sometimes referred to as Level 2.3) can be reached through the preferred (i.e. Level 4.2) primary interface cell access. It can also be directly accessed directly. From either Tier I or Tier II the data integration applications are accessible.

Tier III includes the software levels 603, 605 where the function and compile components are located. Tier I and Tier II are associated with the Multi-Tier Interface for the direct access to structured data sources. The complex design components for data integration and data quality software principles are located inside the software design. The Multi-Tier interface initiates the processes by the user in the present invention's design through the extensive programming function and execution aspects. The command level design of the invention preferably provides flexibility to add commands and spread sheet functionality. Users can create their own programs similar to what is done with spread sheet software programs use to create simple to complex programming by users for the organization without violating the command language or programming tenants of the software. Neither users nor IT can modify the software inventions internal design or add commands.

According to certain aspects of the invention, the software's open platform, horizontal design keeps the use of all operational structured data sources open to multiple vendor uses and allocations. It is designed to prevent vendor generated data silos for a company—independent of the size of the organization.

Tier IV includes the connection processes 604 between the logical layer of the software invention and the physical layers employed by storage systems and intelligent storage subsystems storing/managing the actual operational structured data sources. Tier IV is not necessarily aware of the program function provided by the programming of the invention. This is part of the open platform design invention permitting the software to copy, move, transform and conduct data quality processes with Subject Matter Expert user skill sets versus the conventional IT in depth technical profile user required by today's large data integration vendors.

The present inventors recognize that one of the technical impediments causing data to be overwhelming technology is due to the interpretive software, multi-layered, multi-purposed architectures and GUIs used by data software vendors FIG. 4. Embodiments of the invention design point reduces the software layers, reduces component complexities (interface design, $4^{th}$ GL programming, interpretive execution) through internalizing these design complexities and simplifying the connectivity path between the Tier I to Tier IV levels that are engaged in data software processes and management. The present invention's design preferably has optimizations for interfacing directly to structured data sources on storage devices 604.

Figure 7:
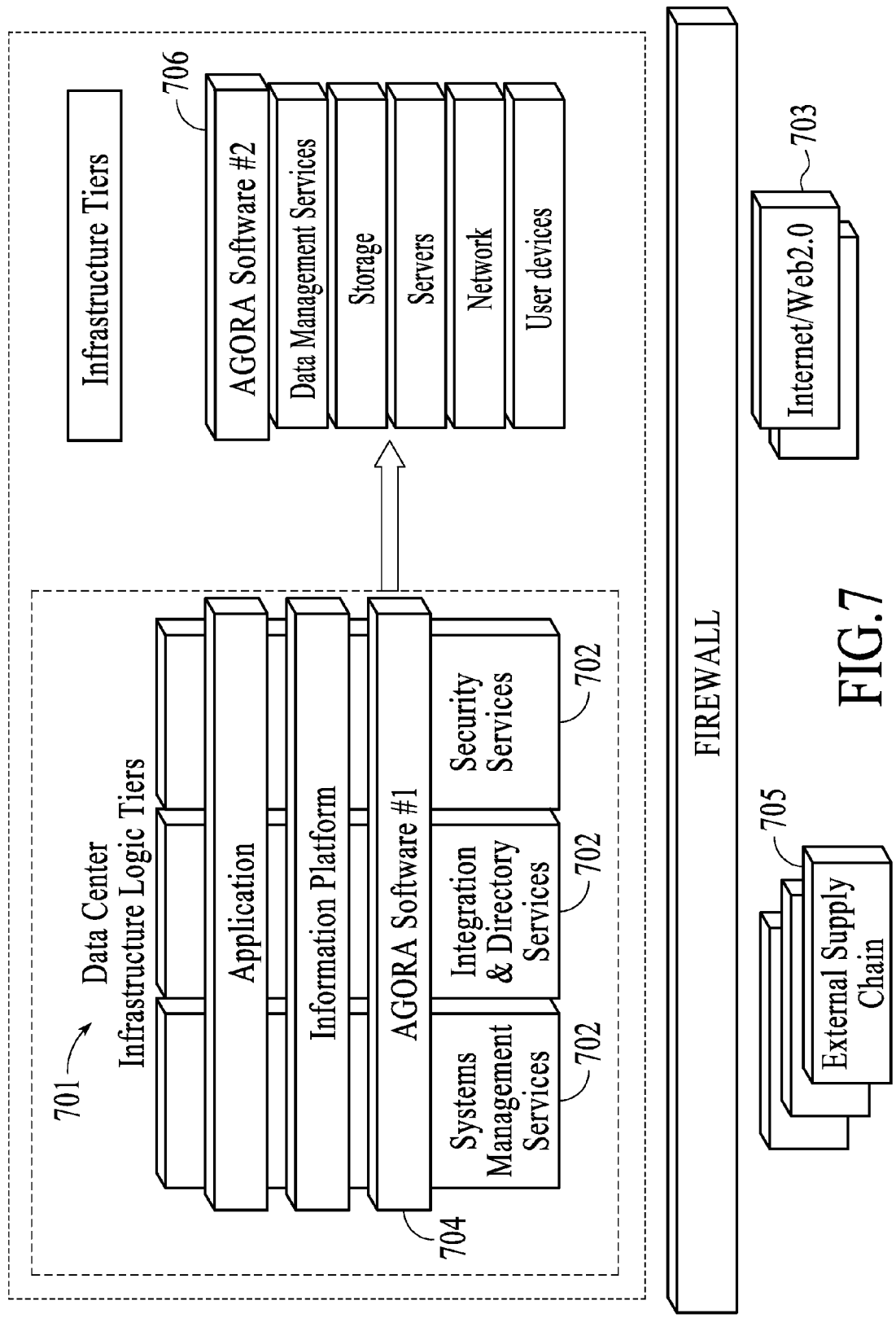
FIG. 7 is a drawing of the positioning of the AGORA software on computing environment or storage sub-system location options within a data/server center software stack and hardware

FIG. 7 is an architectural description of the physical-logical components connectivity relationship within embodiments of software according to the present invention. In embodiments, the design places the functions within the infrastructure platform of a company or organization 701. It resides as an open, horizontal data platform functioning across the compute environment. It is placed in the infrastructure layer of a company's software map 702. The software can create its Data Integration Applications from a server 704 or intelligent storage subsystem server 706. The four tiers of the software described in connection with FIG. 6 reside behind the security firewalls of the organization. It is not software as a service (SaaS) design, as is commonly implemented in conventional approaches. DIA objects can also be stored and accessed from an intelligent appliance or working via a web based application 703, supply chain 705 or data storage infrastructure 706. The object compiled DIA's can be called within the web based infrastructure independently or as part of a web application. The software can store the compiled object DIA's on a storage device in or outside the firewall of the creating organization. Data downloads or retrievals to cell phones or other wireless intelligent devices 502 can be supported by the software. The horizontal data platform crosses and integrates with the infrastructure core functions 704. The design can also support vertical vendor software strategies application integration principles.

Figure 8:
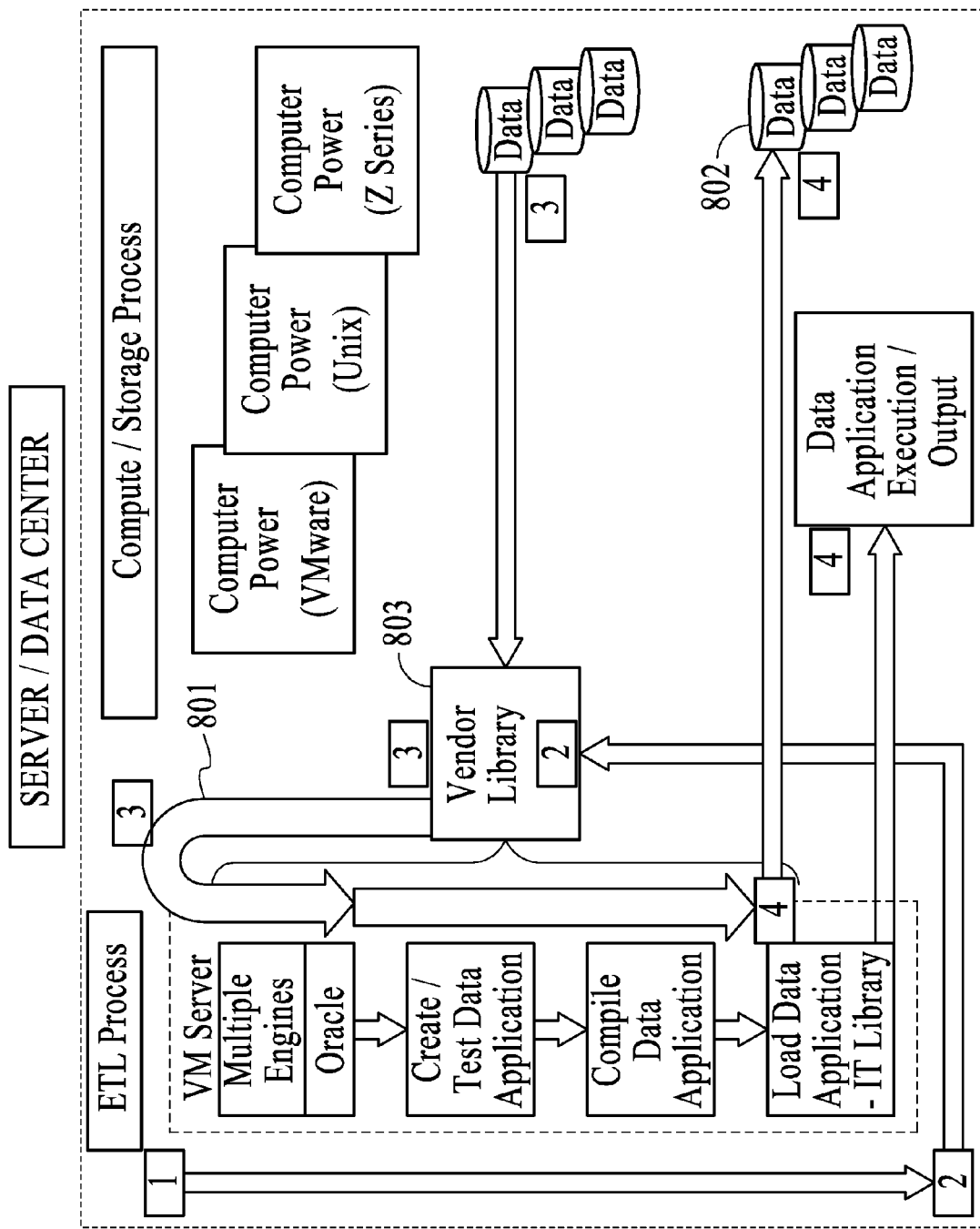
FIG. 8 is a drawing of a computing and storage environment running interpretive software design and production environment.

FIG. 8 illustrates a high level design flow for an interpretive software program process environment for data integration function according to embodiments of the invention. According to some aspects, the creation of a data integration function/workflow occurs with a computing configuration designed to create the initial interpretive objects. The interpretive processes preferably also use the interpretive based software for the data integration workflow execution phase. If the created workflow is run on another computing system; that system preferably has the vendor's software on the system in order to execute the workflow 801. Leading to what analysts call a "vertical vendor data silo strategy or effect" 802. The silo strategy is reinforced with software written with interpretive, $4^{th}$ GL software. In FIG. 8 the execution compute system and data processes are outside of the normal computing processes of the company. The solution bypasses the customers existing IT software investment. The interpretive objects, for example, are stored in vendor designated libraries, adding to the compute environment 803 investment. Industry analysts project the large software vendors will use this approach to institute a single vendor solution for their customers. The strategies also include hardware, software and, consult services for a single source solution/low risk option to a company. A second order impact to the single vendor option is companies will have to deal with the vendor's acquisition integration processes that will require several iterations to complete.

Figure 9:
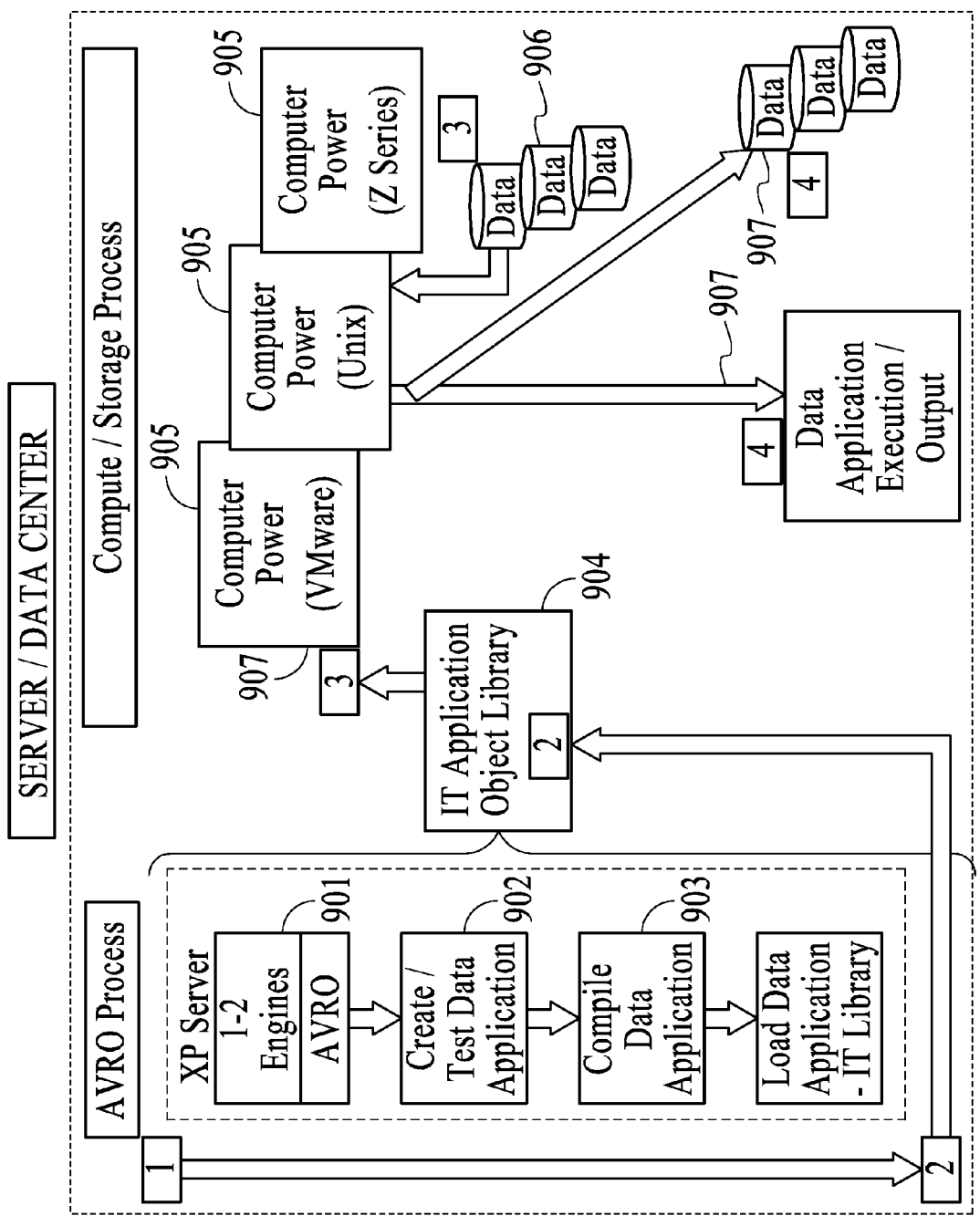
FIG. 9 is a drawing of a compiled object computing and storage environment as the AGORA software invention resides and operates.

FIG. 9 provides flow diagrams illustrating how a compiled Composite Object (DIA) flows through a computing system according to the invention with much less compute resource, more compute flexibility versus an interpretive software processes. The design point is a Composite object optimized design, compile and activate set of processes and programs. The AGORA software design according to embodiments of the invention has its development Composite object compilation as an independent process 901 through. 904. The process design is for development 901 and compute execution operations to be occurring on separate computing systems 905-907. The compiled Composite Objects (Data Integration Applications) are stored as independent objects supported by compiled adapters connected between the source and target data sources. The independent compiled Composite object is placed by a Subject Matter Expert user or IT in designated libraries 904 using the same processes as the company's applications. The object code is either activated through a standard application CALL statement or executed as an independent application within the computing systems or web-based transaction 907.

The design operates within the process parameters of the computing system operations and data resources for that organization. The design does not require special execution or data retrieval code to support the object compiled code or DIA. The invention's interface to database software is the same as an application request. The database software is not necessarily aware of the AGORA request being part of a Data Integration Application process. It is a more efficient design based on an open, horizontal data application integration platform. The DIA flow is an added layer of functionality for leveraging the data sources by Subject Matter Expert users plus traditional IT data integration users under IT supervision. The software is designed to mesh with the existing compute and storage systems software. The technical design produces software functionality that is scalable from SMB's to SME's to Global 2,000 companies. The design minimizes impact to the existing IT infrastructure and reduces the complexity and chaos associated with the data environment by leveraging in place IT assets and adding new processes only incrementally.

The following sections describe example implementations and designs for the software and Multi-Tier Interface according to embodiments of the invention. One example of how the design terms hereinbelow can be mapped to business definitions according to the data integration market place terminology standards and definitions according to TABLE 1 below. More particularly, TABLE 1 below provides an example mapping of technical and application terms used in the descriptions below with business terms sometimes used by IT and other professionals. The present invention is not limited by this mapping, but is included herein to ease an understanding of the descriptions of the invention.

Figure 12:
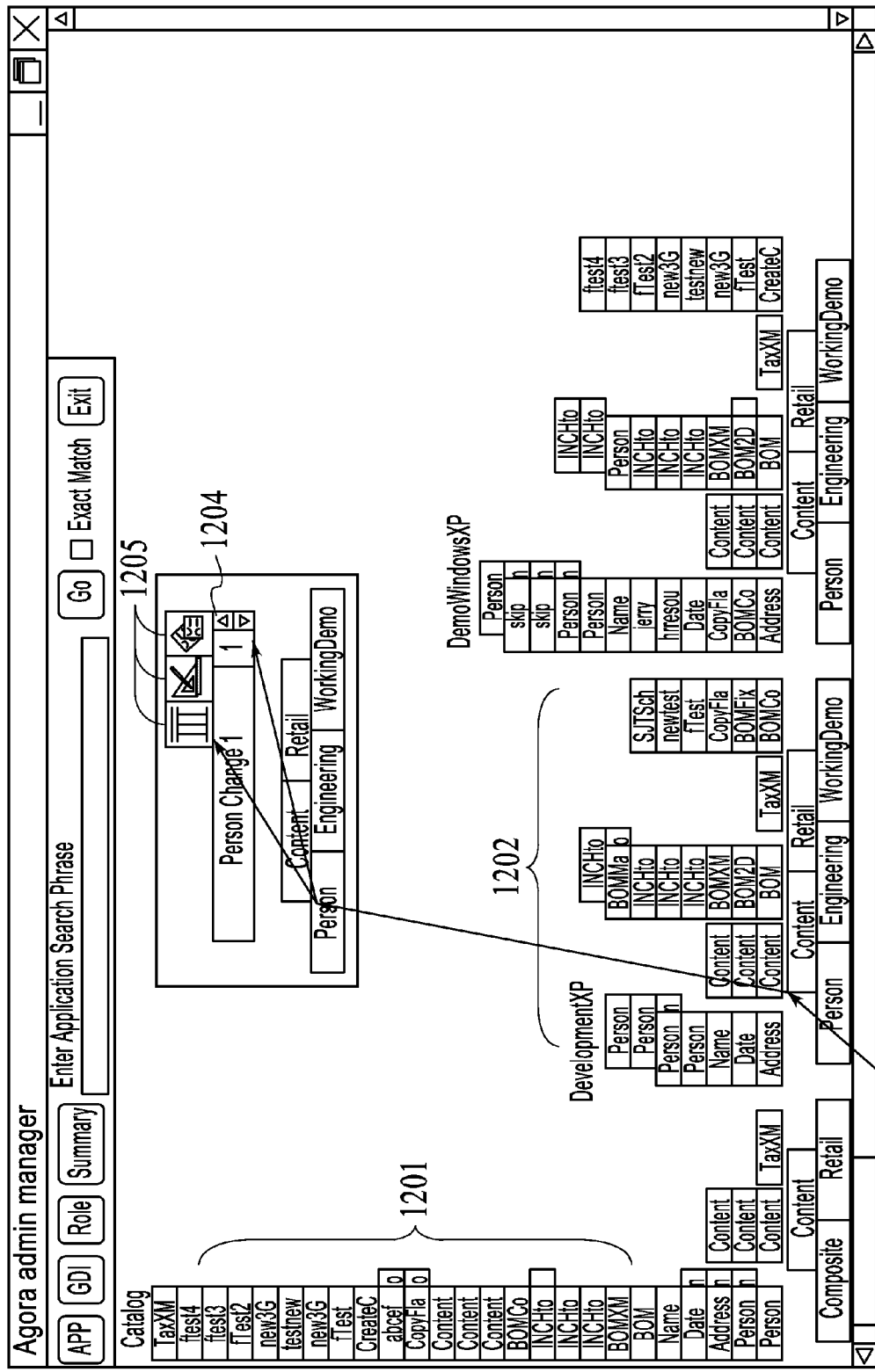
FIG. 12 is an example drawing of an "L" Stack showing the embodiment of the data cell design of the Level 4.2 graphical interface.

FIG. 12 illustrates aspects of how a Cell is the building block for the user Level 4.2 component of interface display according aspects of the invention. As shown in FIG. 12, each Cell within a Library of Cells 1201-1202 contains a published (compiled) Composite Object or a Change (unpublished) Composite Object with Version management elements. The Cells are the third dimension of the Multi-Tier Interface as they are accessed by current or prior versions 1204 of a Composite Object. (See FIG. 45 and corresponding descriptions below, for example). The Cell can be modified or expanded for additional invention and design criteria beyond the current processes 1205. Among the potential options are using the Cell format for detailed data modeling documentation; supply chain process, Bill of Materials, etc. Complex information or data requirements may find applicability as

TABLE 1

| FUNCTION | Meta Architecture | Software Components | Software Applied Function (example) | Software Business Name (example) |
|---|---|---|---|---|
| Object | Connector | Object | Data Access | Data Access Path |
| Object | Variable | Schema | Data Profile | Data Map |
| Object | Language | Rule | Program | Application |
| Process | Analysis | Analysis | Test/Data Quality Filter | Test |
| Combined Object | Composite | Data Integration Application | Data Integration Application | Data Application |
| Control Process | Version | Version | Level | Version |
| Design/ Architecture | Cell | Application Cell | Data Cell | Data Application |
| Organization | Library | Library | Primary, Secondary Library | Sub-Library |
| Architecture | Application | Library | Master Library | Library |
| Architecture | Project | Master Library | Master Library | Master Library |
| Process | Evaluation Mode | Browse | Review | Browse |
| Process | Edit Mode | Edit | Edit | Edit |
| Process | Manage Mode | Manage | Create | Create |

FIG. 9 shows the operating options with an example embodiment of the AGORA software and Multi-Tier interface according to the invention. Software design resides on a small server 901 where code compile occurs. Run time Applications are executed on the computing environment designated machines and computing software. The present invention can conduct source to target objects with intelligent appliances connected to the web based application. Sources of structured data are not restricted to inside a firewall (see FIG. 7). Server compute software operating system supports AGORA code as an independent application or from a CALL statement of a business application.

Figure 11:
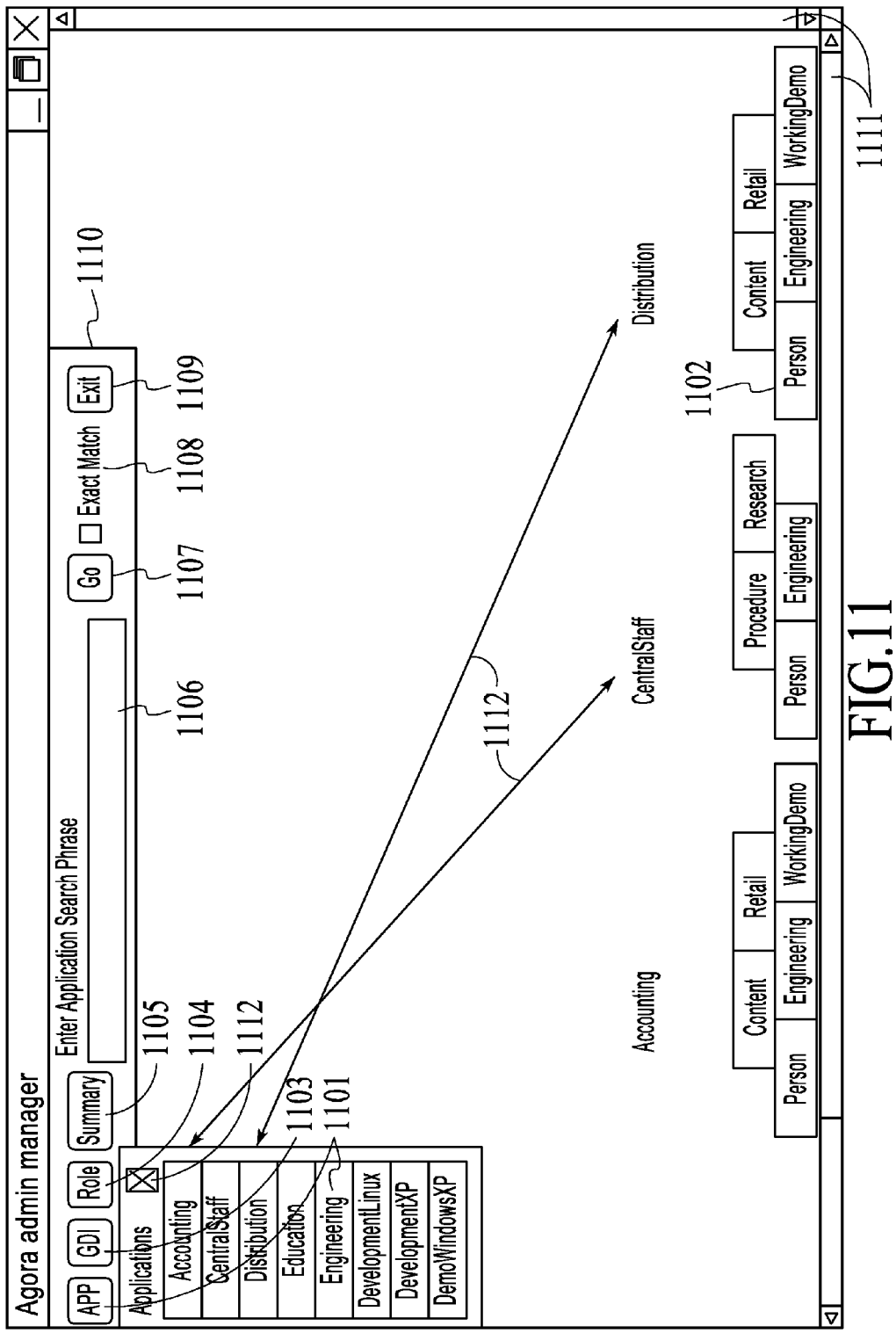
FIG. 11 is a drawing of an "L" stack Project screen.

FIG. 11 illustrates an "L" stack (placement) format 1102 within a user interface according to aspects of the invention. In embodiments, this screen is the first display screen following the sign on process. The point of design permits the user to access the Data Integration Application Cells through "L" Stack 1102 (bottom of drawing FIG. 11) or the Project level Application List stack on left side 1101 of the screen. Command line at top provides Search function 1106, Administrative Summary 1105 (Summary) and Role Tabs 1104 structure for the Principal Administrator's use. The Graphical Data Interface (GDI) 1103 is used to move from "L" to "T" DIA cell stack (screen placement). And the APP tab is to expand or close the Application Listing 1101. Listing and display of libraries is done in alpha numeric order under Application List, "L" or "T" stack configurations.

well. Merged with the zoom-in Multi-Tier capability (see FIG. 22 and corresponding descriptions below, for example), the Cell design can retain significant amounts of detailed content-tracking information.

Figure 13:
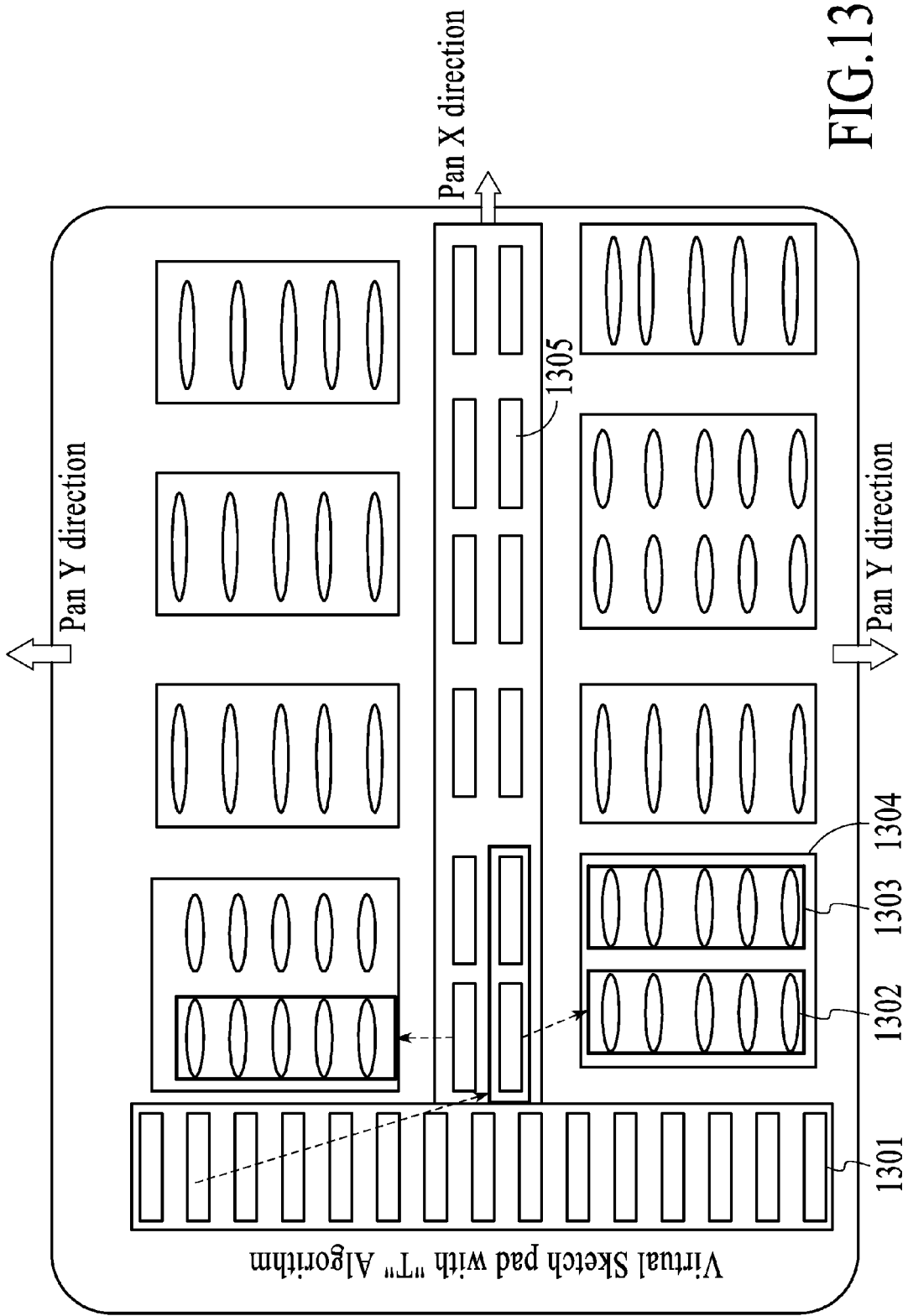
FIG. 13 is a drawing of a virtual sketch pad with "T" algorithm (stack) for the design background

FIG. 13 illustrates an architectural view of additional user interface aspects of the invention. In example embodiments, the "T" screen shown in FIG. 13 has applications listed on the left top to bottom, Library components are shown left to right in the center of the screen and composite objects are shown at as stacks either above or below the associated library object. A user can navigate by clicking on an application or library object and by panning the screen left to right or top to bottom. The second access option is through the Applications List located on the left side top left corner that displays all Libraries user is authorized to view and work in. This is a virtual sketch pad with "T" Algorithm have the following components: Application Component 1301, Composite Object Component 1302. Library Object Group 1303, Application Object Group 1304, and Library Component 1305.

Figure 14:
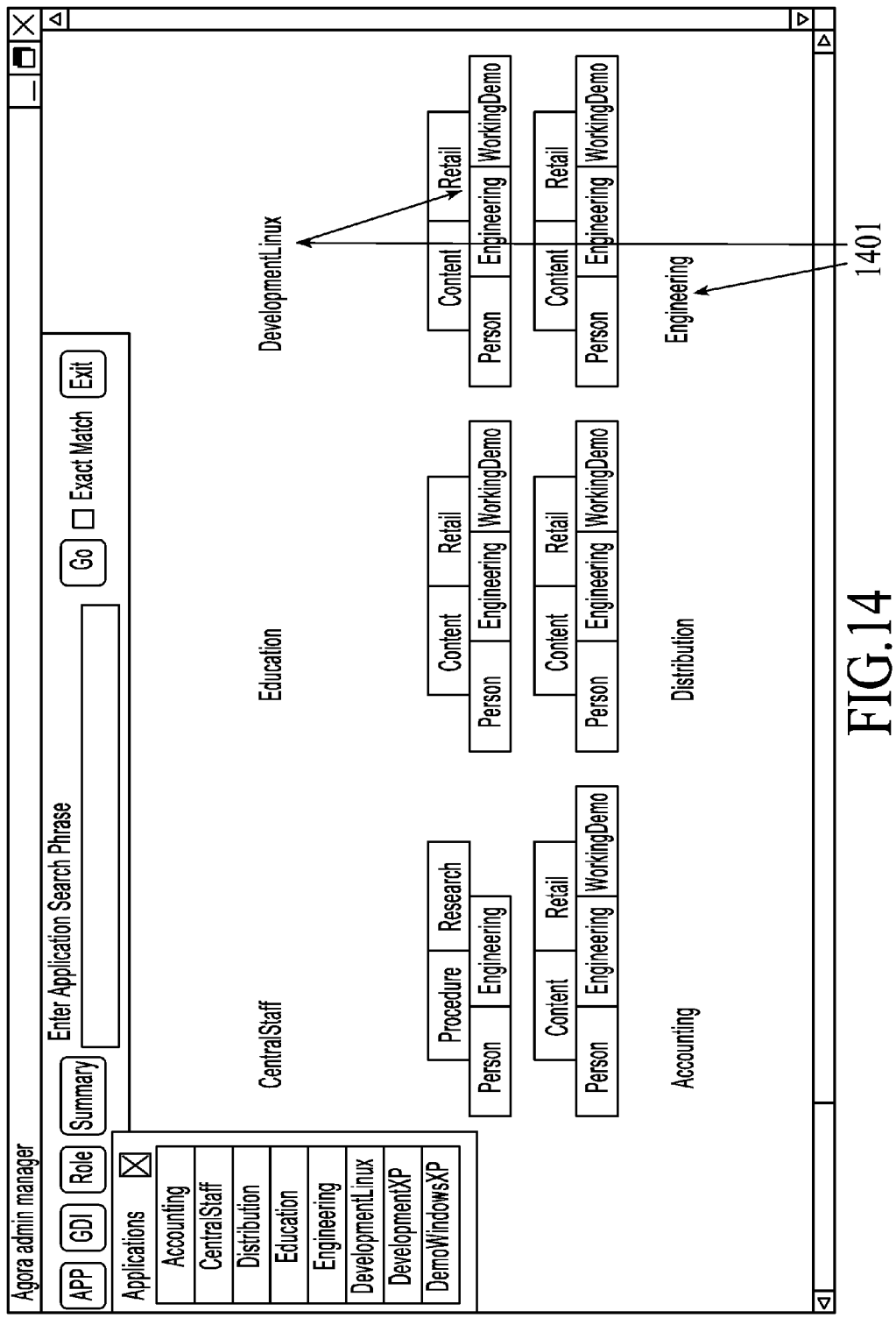
FIG. 14 is an example drawing of a "T" stack (Algorithm) with Application List displayed of Level 4.2 Interface.

FIG. 14 is an example of implementation of a "T" stack ([placement) display 1401 prior to a next step of opening required Composite Object (DIA) Cells for user processing. The Libraries are stacked in the middle of the screen to display their Data Integration Application Cells on the top or bottom half of the screens. All function and command line actions remain the same as the "L" stack screen shown in FIG. 11

Figure 15:
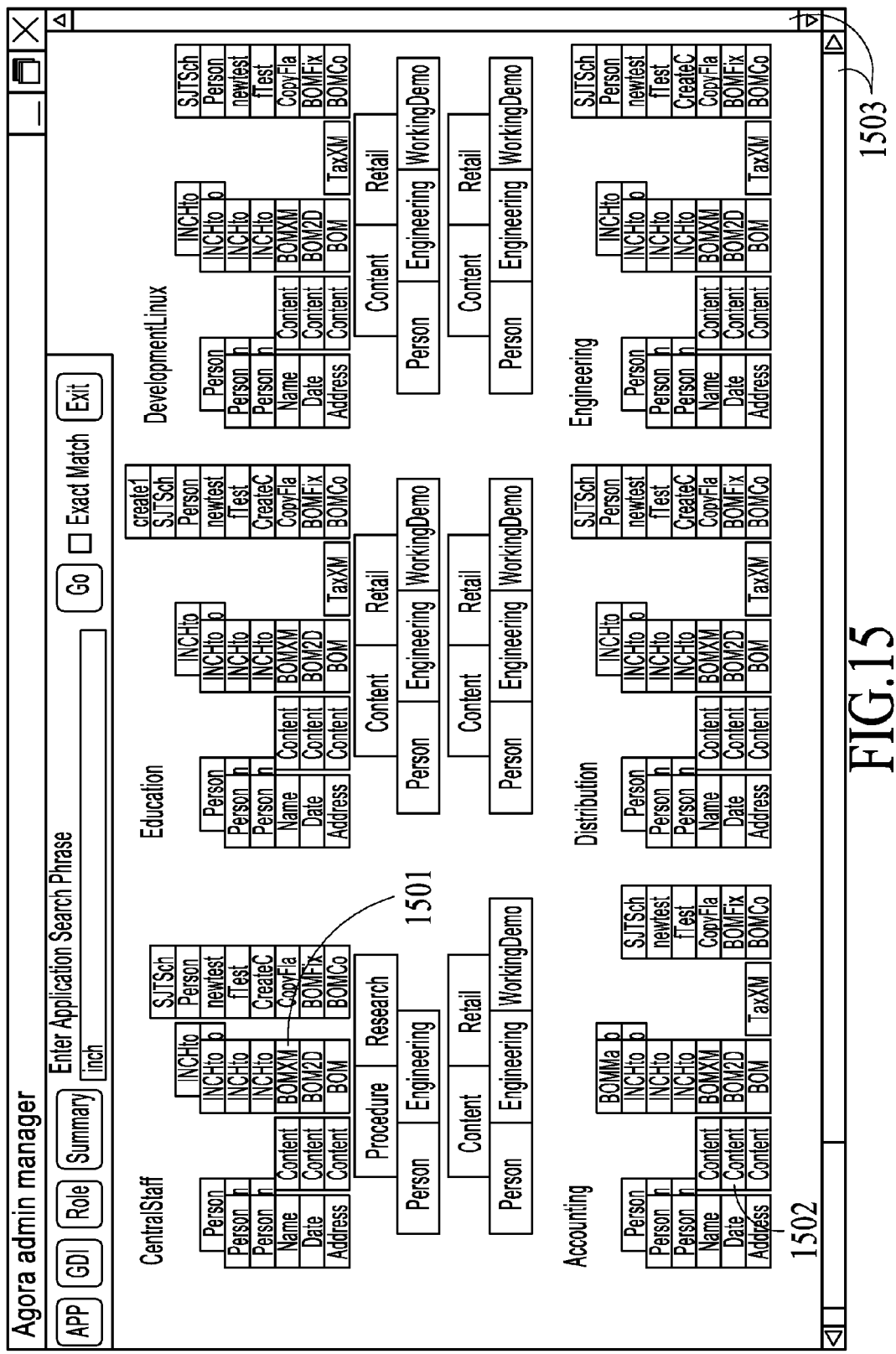
FIG. 15 is an example drawing of a "T" stack (Algorithm) showing the embodiment of the full display of all Composite Object cells using Level 4.2 Interface.

FIG. 15 illustrates an example implementation of an actual "T" stack screen 1501-1502 The full expansion of all Composite Object (DIA) Cells in the Libraries is possible. From this point the user can access any Composite Object Cell in the enterprise in order to work with or use the software invention's functions: Schema, Rule, Object, Analysis, and Manage Mode with Create, Delete, Publish (Compile), Up-Version of the Composite or Import/Export composite object via XML. The access to any Cell from the Multi-Tier interface can be reached via Cell drill down processes. If the expanded Libraries exceed the screen size, the Multi-Tier interface has horizontal and vertical scroll capability 1503. Therefore a Project (master screen) with several thousand Cells can be accessed via scrolling in very few seconds by the user. This location function is supported in both the "L" and "T" Stack configurations. The process of locating the appropriate Cells is supported by the Search Engine design (see FIG. 35 and corresponding descriptions, for example). It should be noted that certain cells have a color (e.g. Green), which indicate nested objects (INCLUDE—see FIG. 36 and corresponding descriptions, for example) from either published Composites or unpublished Composite Objects. Nested Objects are only done at Composite level. Design does not nest independently Schema, Rule, or Object, screen content.

Figure 16:
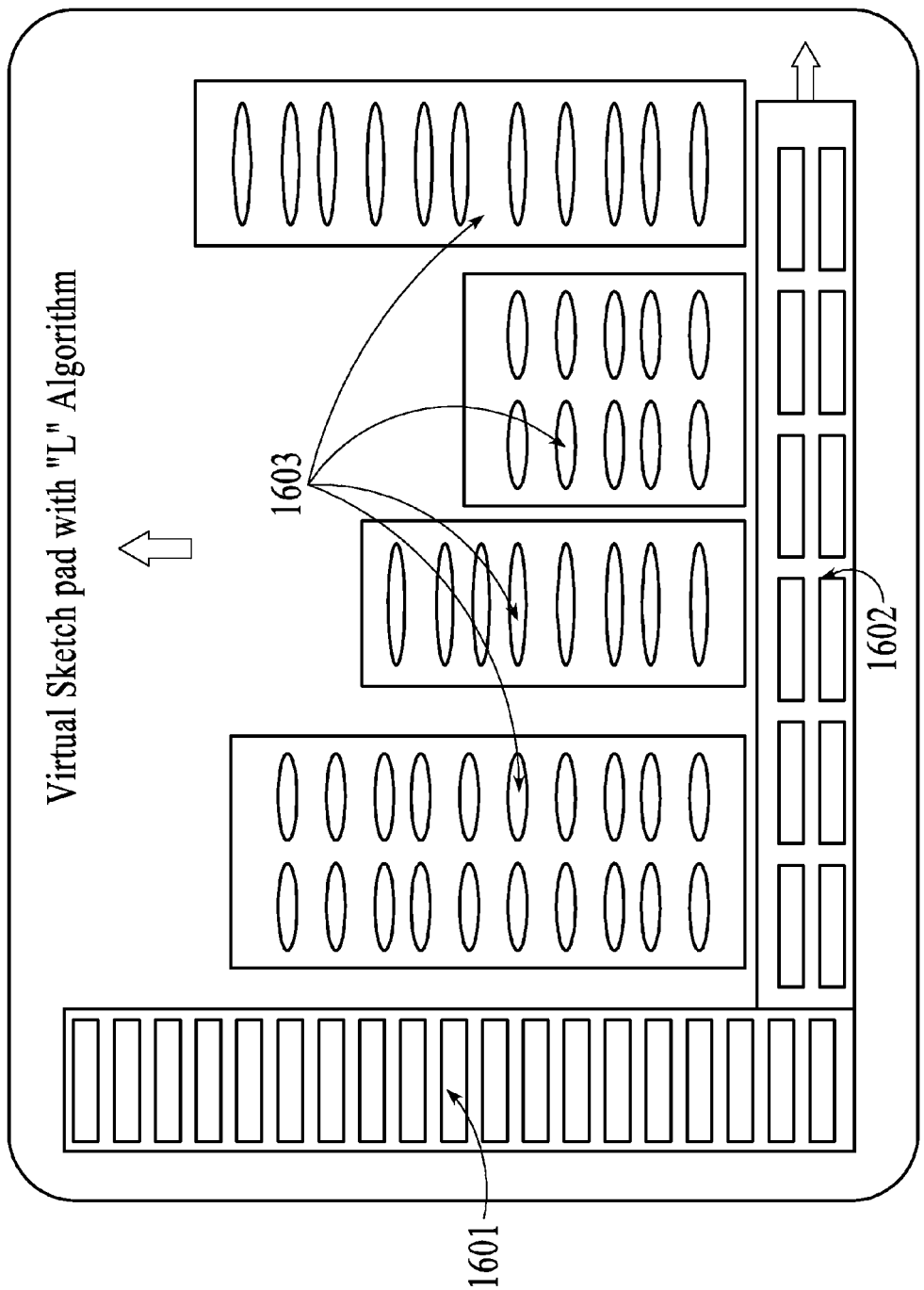
FIG. 16 is a drawing of invention design of Virtual Sketch pad with "L" Algorithm

FIG. 16 is a block diagram illustrating an "L" placement algorithm according to embodiments of the invention. In embodiments, the algorithm places the application list 1601 on the far left top to bottom. The libraries 1602 are shown left to right on the bottom of the screen. The composite objects 1603 are shown above the associated library in a bottom to top placement. In embodiments, the "L" placement is used instead of the "T" placement when libraries tend to contain many more objects then in a "T" placement. This is computed by the space requirements of a full screen stack versus a half screen stack.

Figure 17:
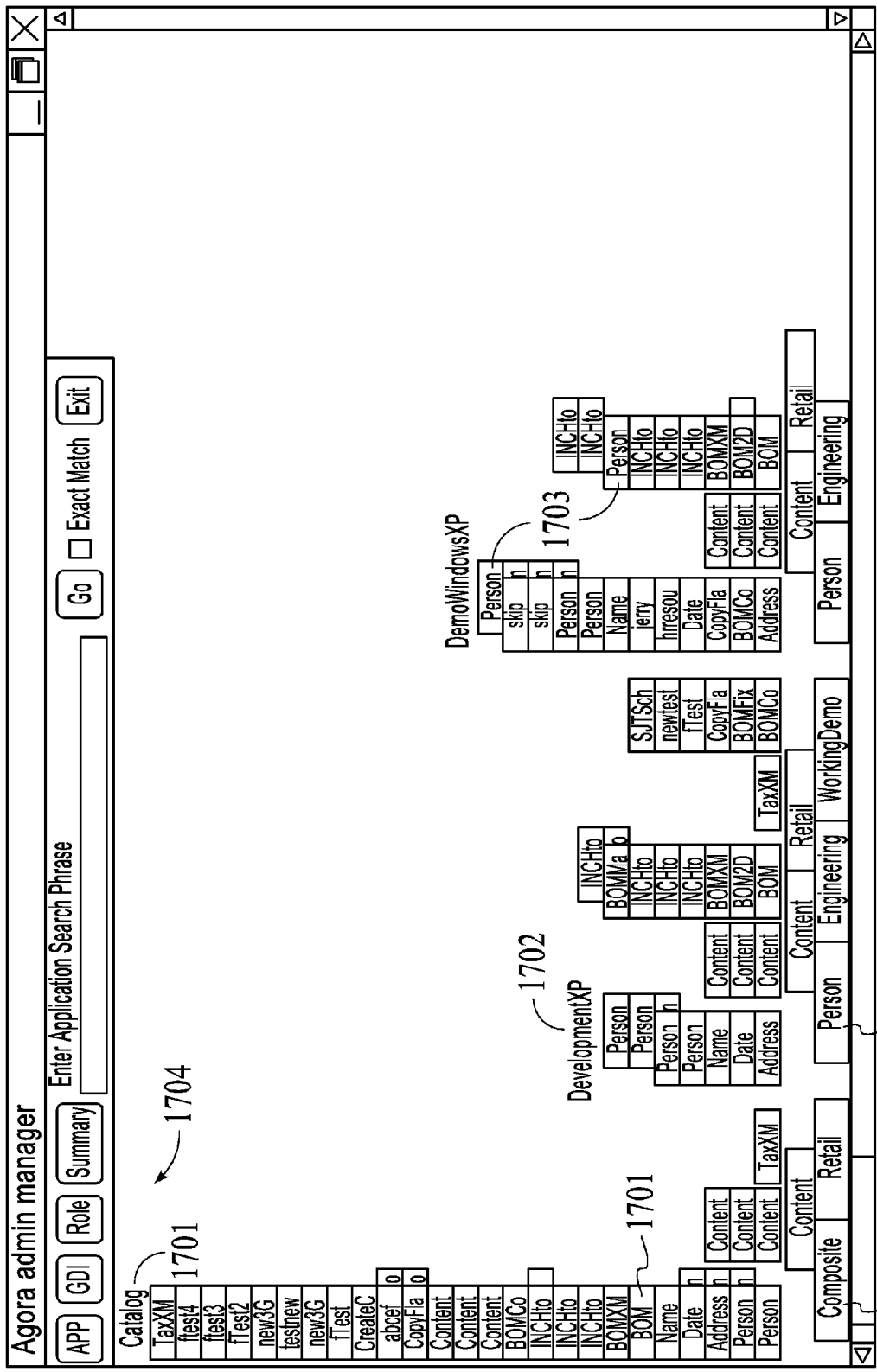
FIG. 17 is an example drawing of a "L" stack (Algorithm) with the Composite Objects (Data Integration Application) cells expanded with Published (compiled objects) and Unpublished (uncompiled objects).

FIG. 17 is an example implementation of "L" stacks 1704 according to aspects of the invention. This example illustrates a full display of Composite Object (DIA) Cells 1701-1703 for the entire Application List. Nested objects (INCLUDE Composite objects) are in Published (compiled) or Change status (in process). The nested Composite objects are stacked behind the Composite Object they are attached. It should be noted that a composite can have a number of nested objects from other Composite Objects. Also the nested object can be its own Composite Object (Data Integration Application) in the same or different Library.

Figure 18:
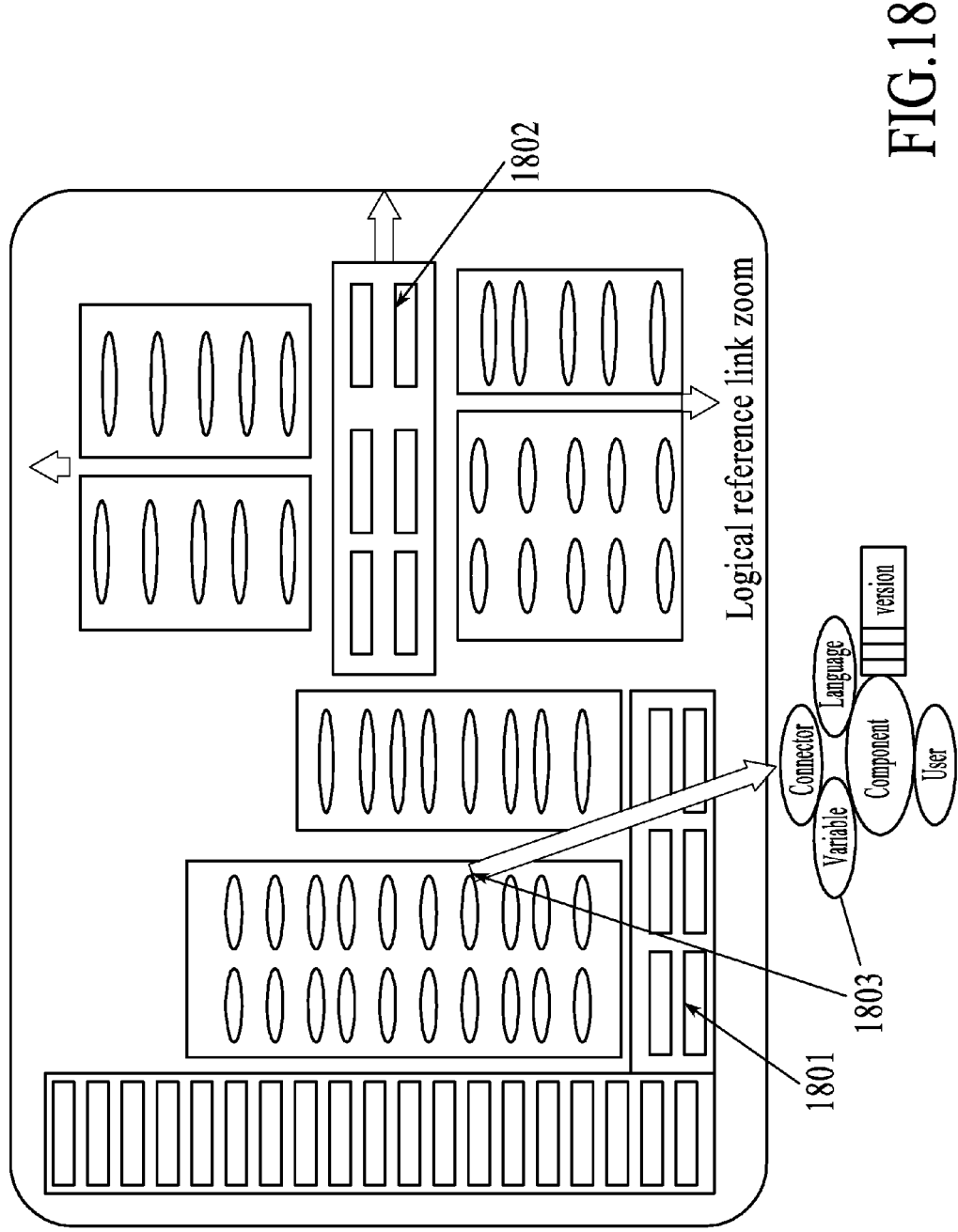
FIG. 18 a drawing of invention design of a Virtual Sketch pad with "Z" Algorithm Hybrid of "L" and "T" Algorithms

FIG. 18 illustrates one example of how to zoom in a design function of a composite object for the purpose of showing the first layer of detail 1803 about a composite object. FIG. 18 also illustrates how a suite of algorithms called the "Z" algorithm places components onto cells using a composite of "L" and "T" algorithms 1801 and 1802, respectively based on the clumping of intra-relationships of related components and inter-relationships of related components. This results in a Virtual Sketch pad with "Z" Algorithm Hybrid of "L" and "T" Algorithms 1801 and 1802, respectively. The "Z" Hybrid algorithm is shown in FIG. 18. See FIG. 12 on how this invention supports the Cell design.

Figure 19:
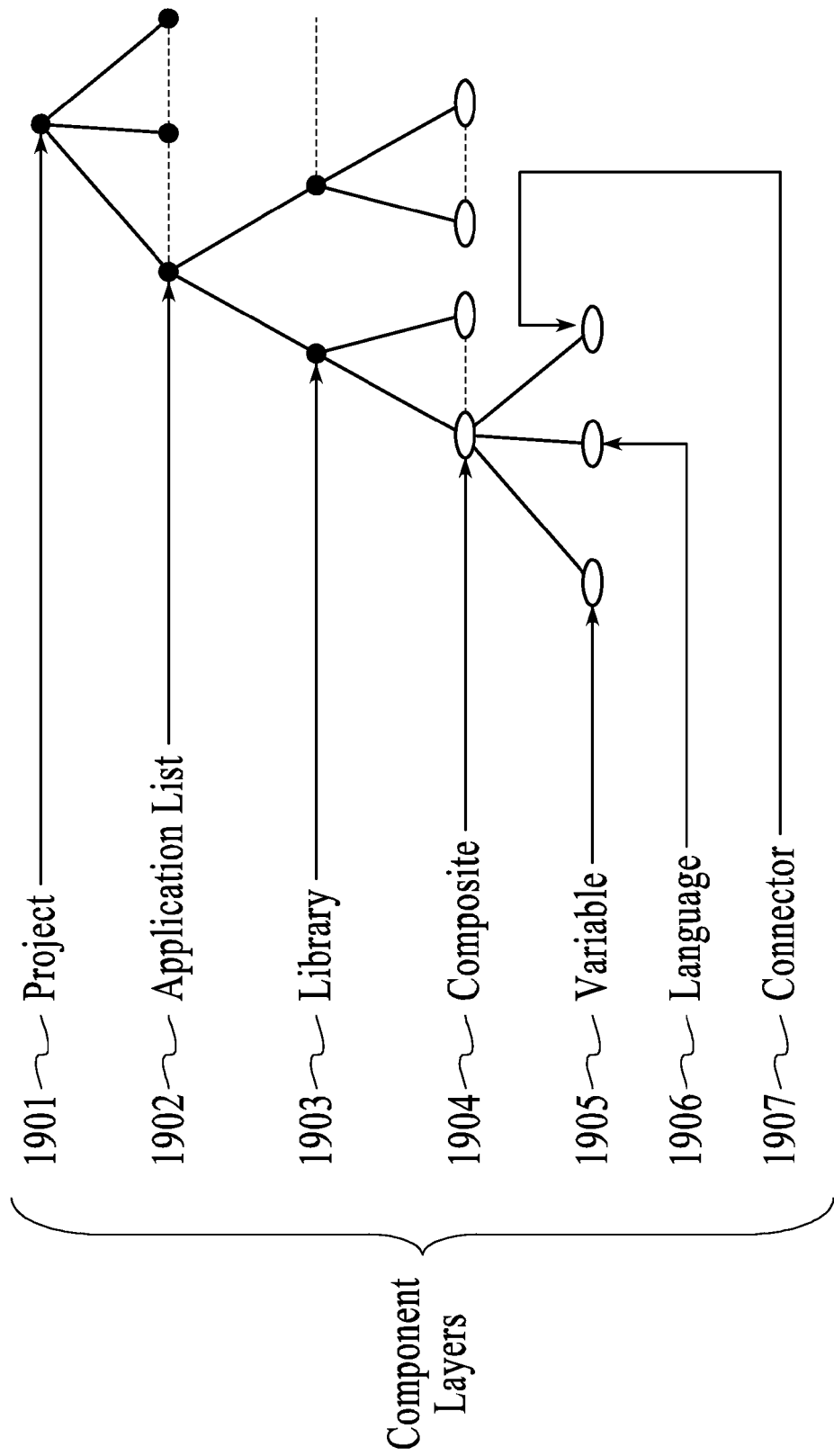
FIG. 19 is a drawing showing the embodiment of the Component Layers invention and design for the software.

FIG. 19 illustrates one example of the logical structure for AVRO component layers. In this example, the structure is hierarchical: Project 1901 is the root and contains applications. Application Lists 1902 can contain Libraries 1903 and Libraries contain Composite Objects 1904, which can further include one or more of: Variable (Schema) 1905, Language (Rule) 1906, and Connector (Object) 1907. It should be noted that the terms Variable, Language and Connector are one example of the present invention's abstract design names which can be translated to familiar user named terms or applied terms: schema, rules and objects which are meta names, as shown in TABLE 1, for example. It should be further noted that it is possible to have meta extraction where the base is Variable base and it can connect for our purposes with past Schema rules and objects. The scope of the Project is the hierarchy and the project; one can customize the content for their terms and requirements. For example, one can customize the names of the hierarchy at the GUI level not at AGORA code or for individual users if they are comfortable about using as part of the subject matter expert user mindset. This is especially true for data modeling and data engineering.

Figure 20:
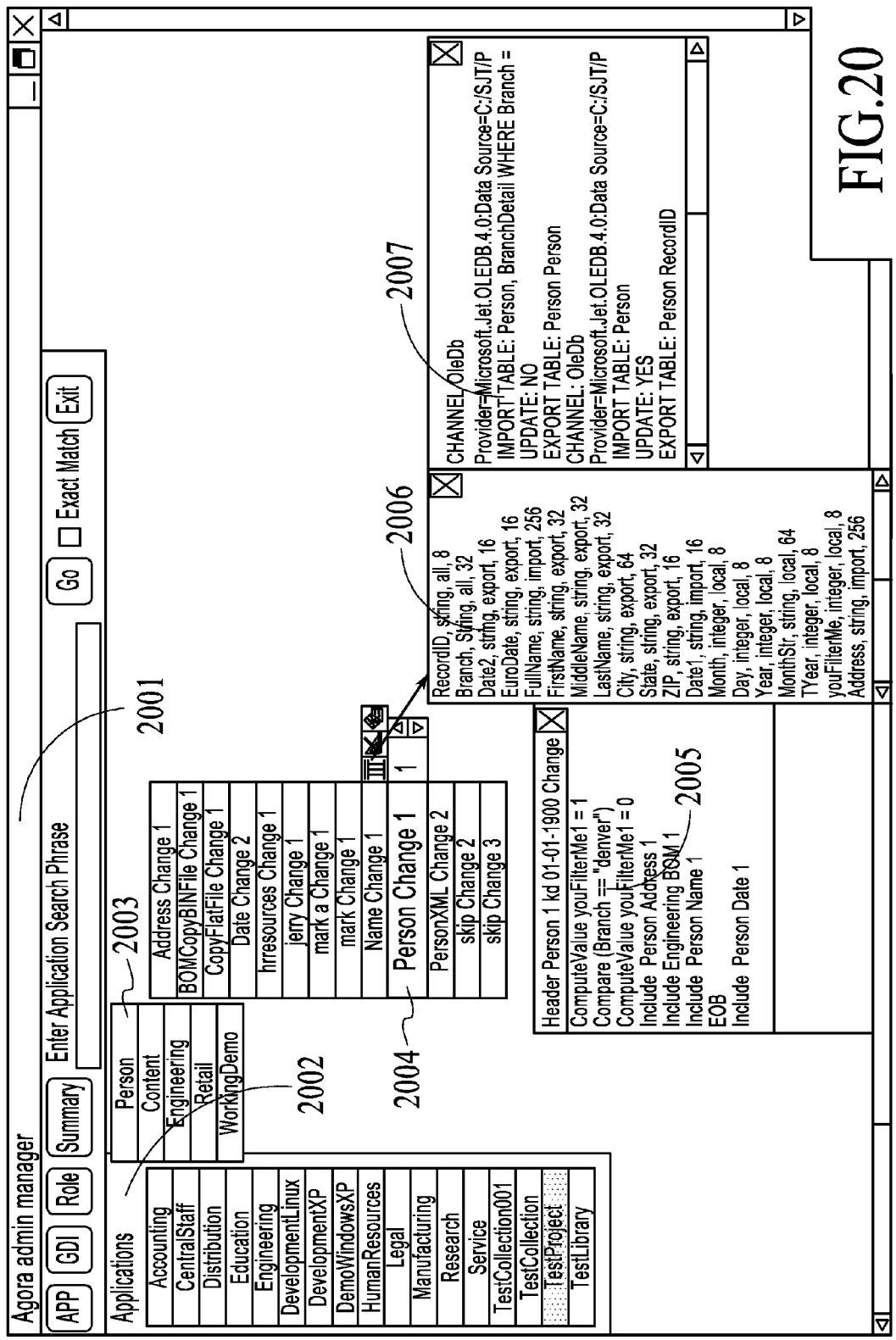
FIG. 20 is a composite drawing showing the Component Layers design in FIG. 19 displayed with Level 4.2 interface.

FIG. 20 illustrates one example of a screen design and implementation of the Component Layers outlined in FIG. 19. More particularly, the following features in the figure are associated with the design terms for the software of the Component Layers in FIG. 19 as follows: Project is the Left most Library list top of screen 2001; Application List is the next level of Library formation 2002; The Library are the Composites (Data Integration Applications) making up the group 2003; Composite is the assembled DIA of Rule, Schema, and Object 2004; Language is the Rules Screen 2005; Variable is the Schema or data definition screen of the DIA 2006; and Connector is the Object screen to define the structured data sources accessed as source and targets. 2007.

Figure 21:
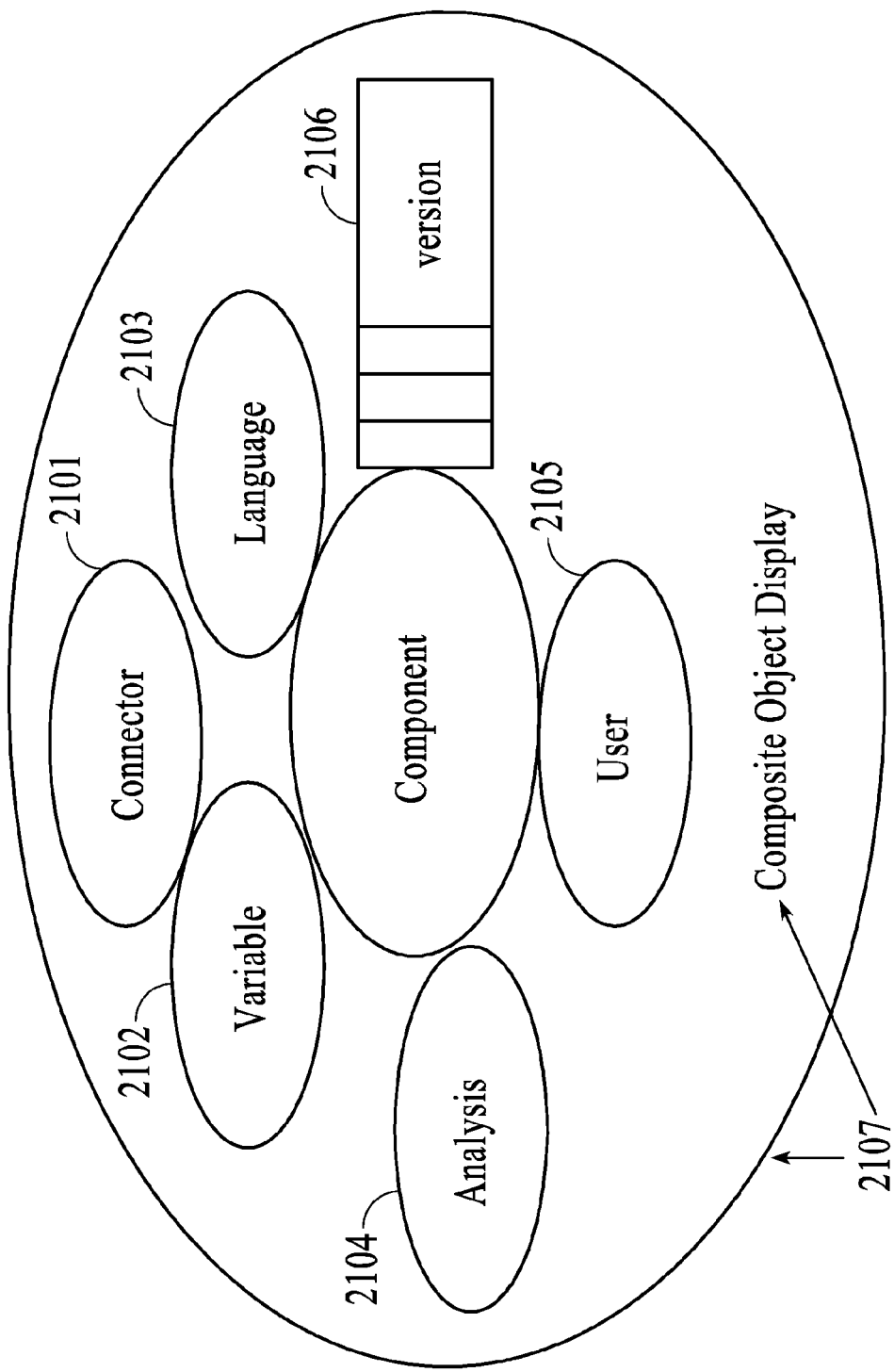
FIG. 21 is a drawing of the software invention and design of a Composite Object Displayed showing the elements constituting the Composite Object.

FIG. 21 is a diagram showing one example of the components of a Composite object according to the invention. As shown, the components include Connector 2101, Variable 2102, Language 2103, Analysis 2104, User 2105, and Version 21106 A Composite Object display 2112 can be formed from these components.

Figure 22:
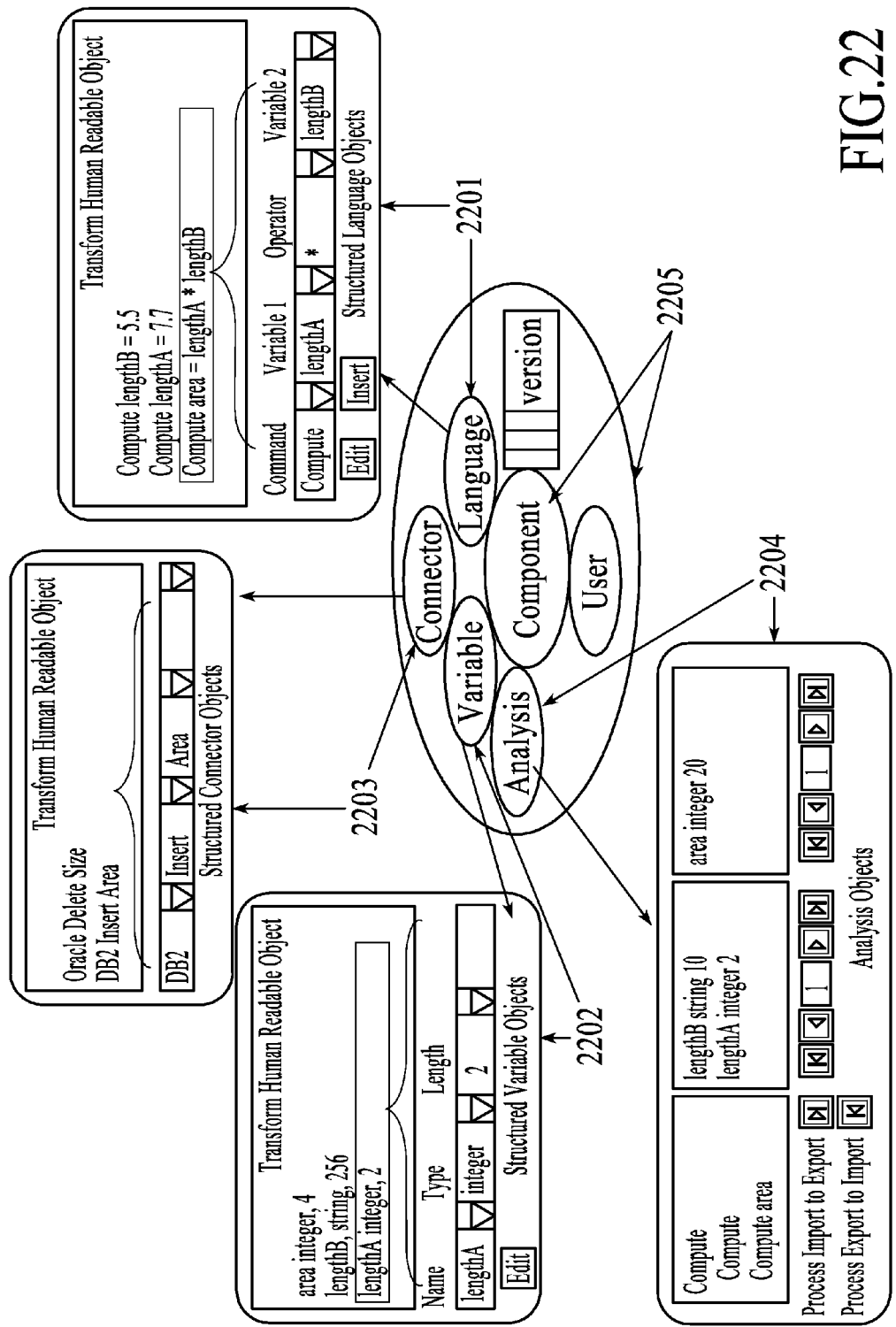
FIG. 22 is a drawing of the software design and invention of a Composite Object Reference Link to Level 4.2 Zoom functionality

FIG. 22 is a diagram illustrating one example of a second level of detail for selected version of a language 2201, variable 2202, connector 2203, and analysis object 2204. This diagram also illustrates an example of a corresponding Composite Object Reference Link Zoom display for each of the selected components.

Figure 23:
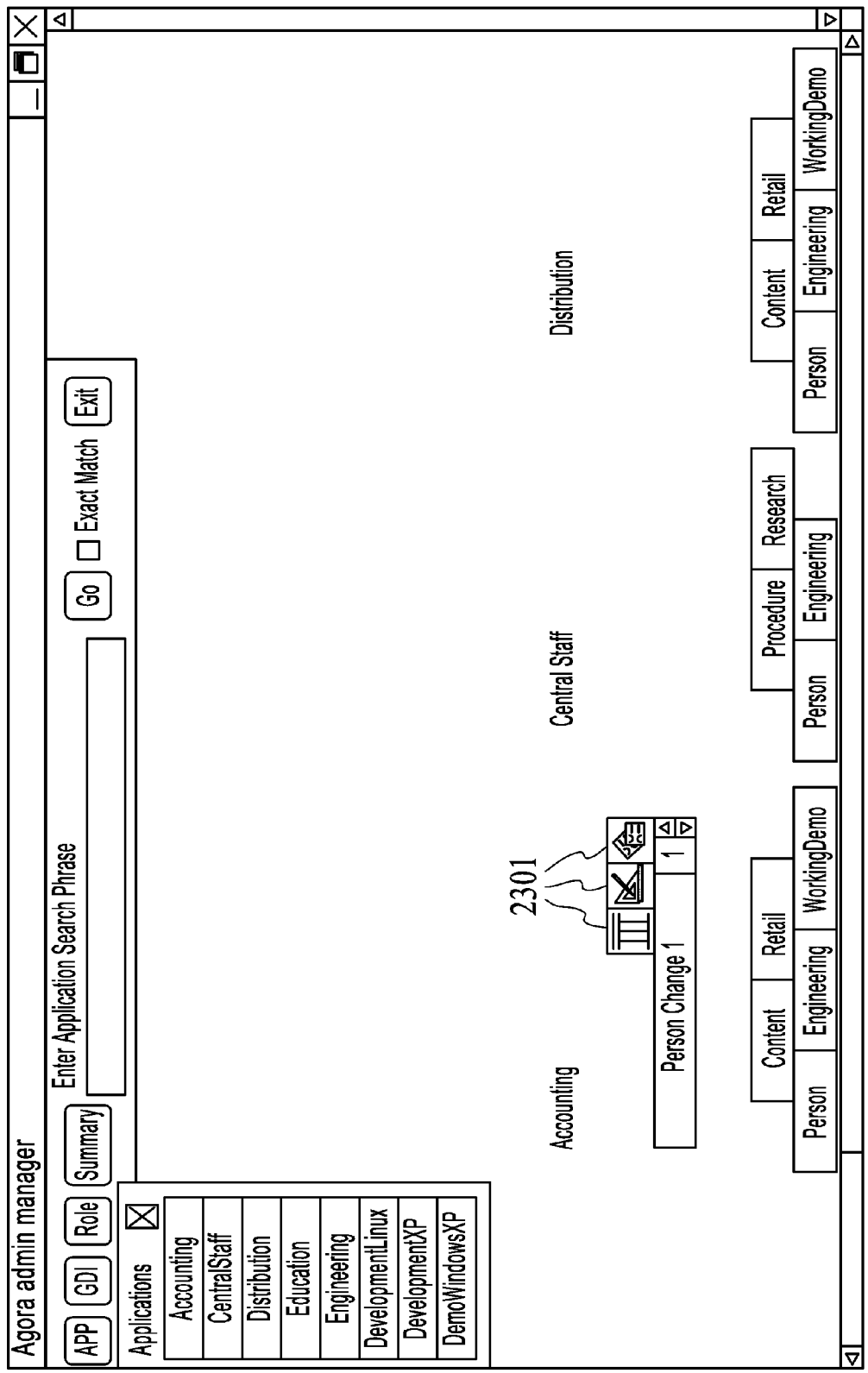
FIG. 23 is a drawing of an example of a Composite Object (Data Integration Application) displaying the three modes of action: Evaluate (Browse), Edit, and Manage Mode tabs

FIG. 23 is a screenshot illustrating one example implementation of a data integration application 2301 in accordance with an embodiment of the invention design of a Composite Object. There are three design elements associated with drawing 2301 of Rule (Language), Schema (Variable), and Object (Connector) objects. A user can zoom in or out on these objects to get full definitions of the Composite (DIA) being reviewed or edited versus the enterprise wide screen level of viewing Composites (DIA) as Cell graphical representations.

Figure 46:
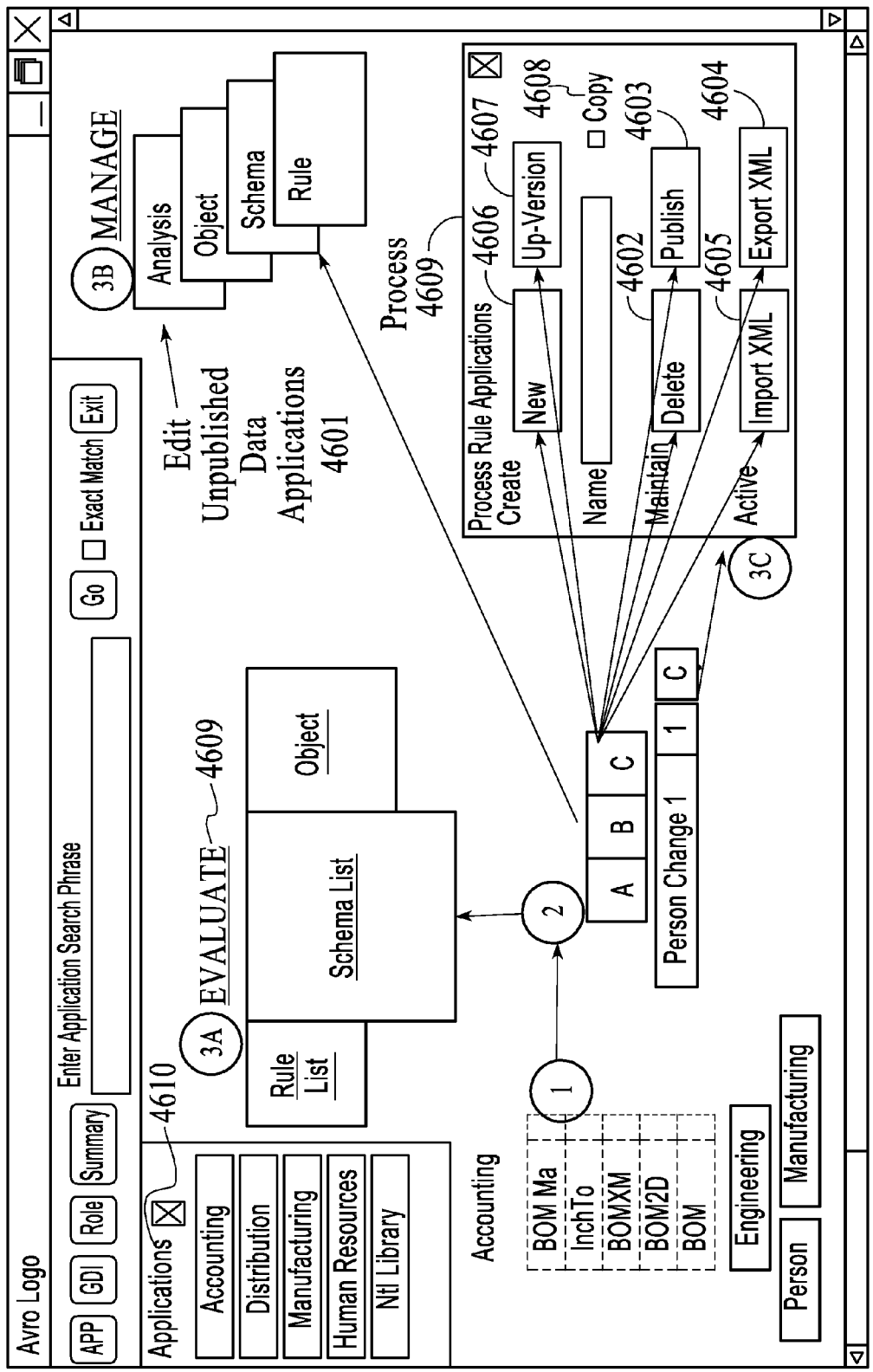
FIG. 46 is a drawing of the software invention and design for the Level 4.2 and Level 2.3 Interface for the Multi-Tier interface.
Figure 47:
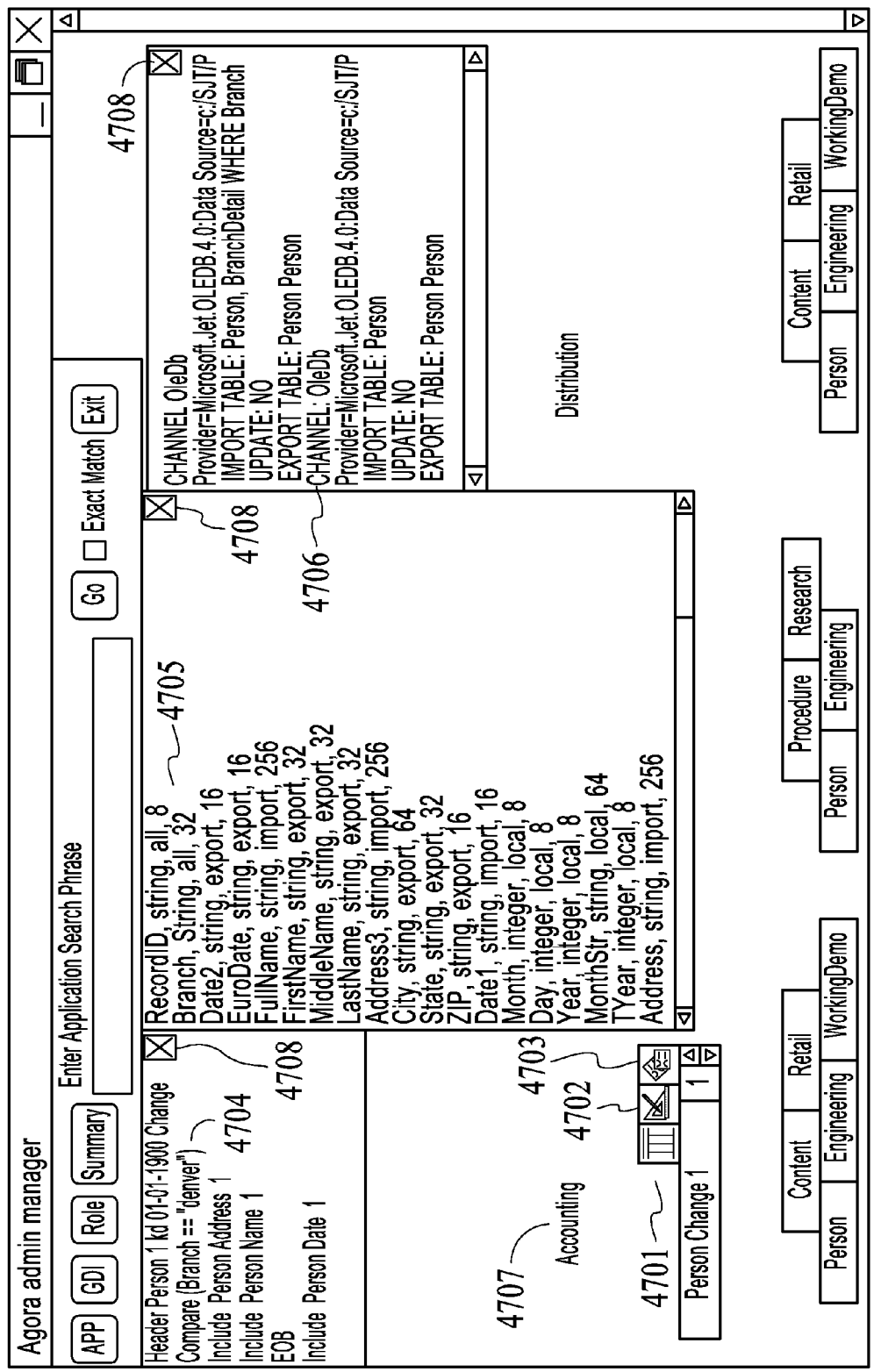
FIG. 47 is an example drawing of the Evaluation (Browse) mode displayed on the Level 4.2 interface.
Figure 48:
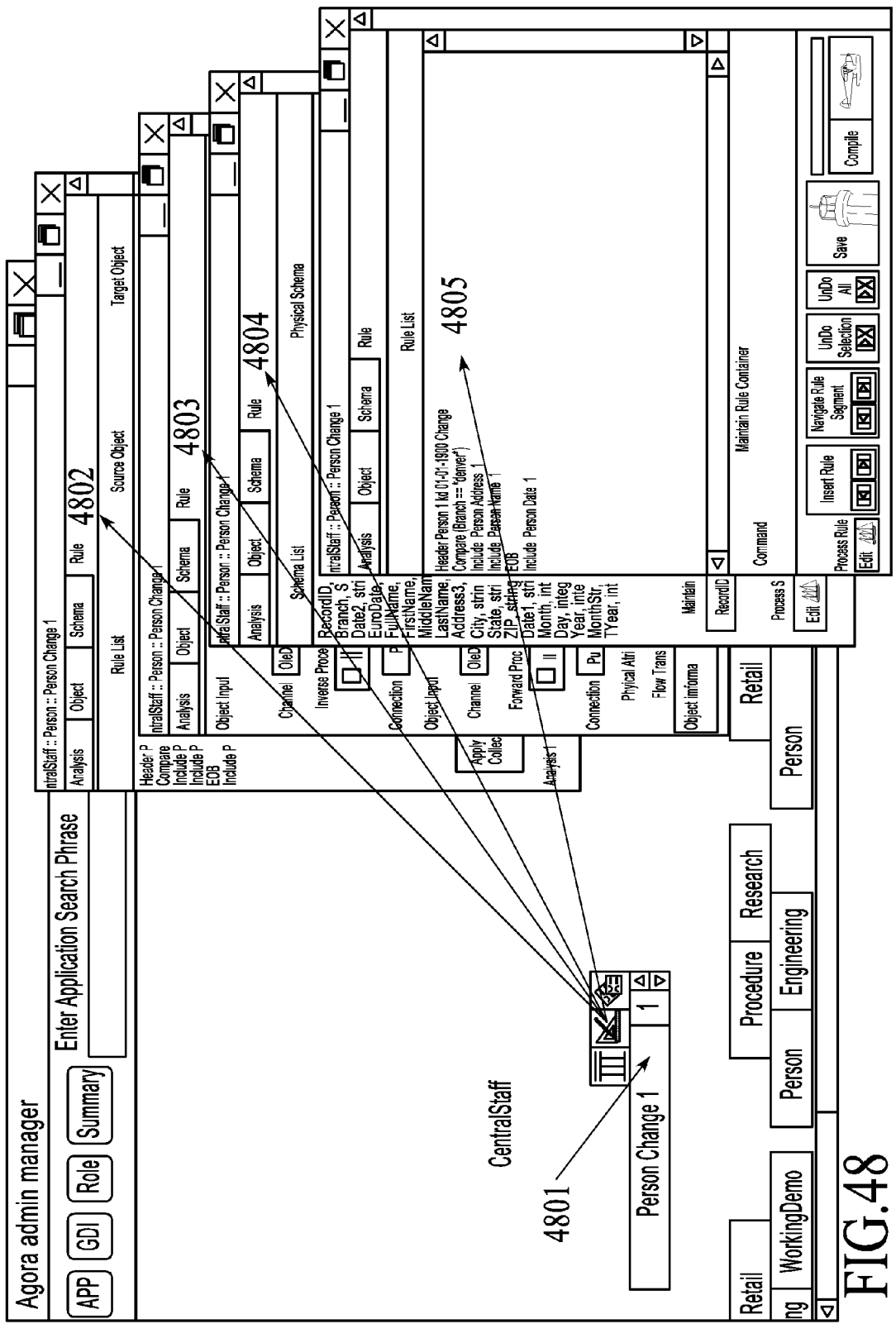
FIG. 48 is an example drawing of the Edit mode and the four screens involved in the edit process—Schema (Variable Object), Rule (Language Object), Object (Connector Object), and Analysis to complete the processing of an unpublished Composite object.
Figure 60:
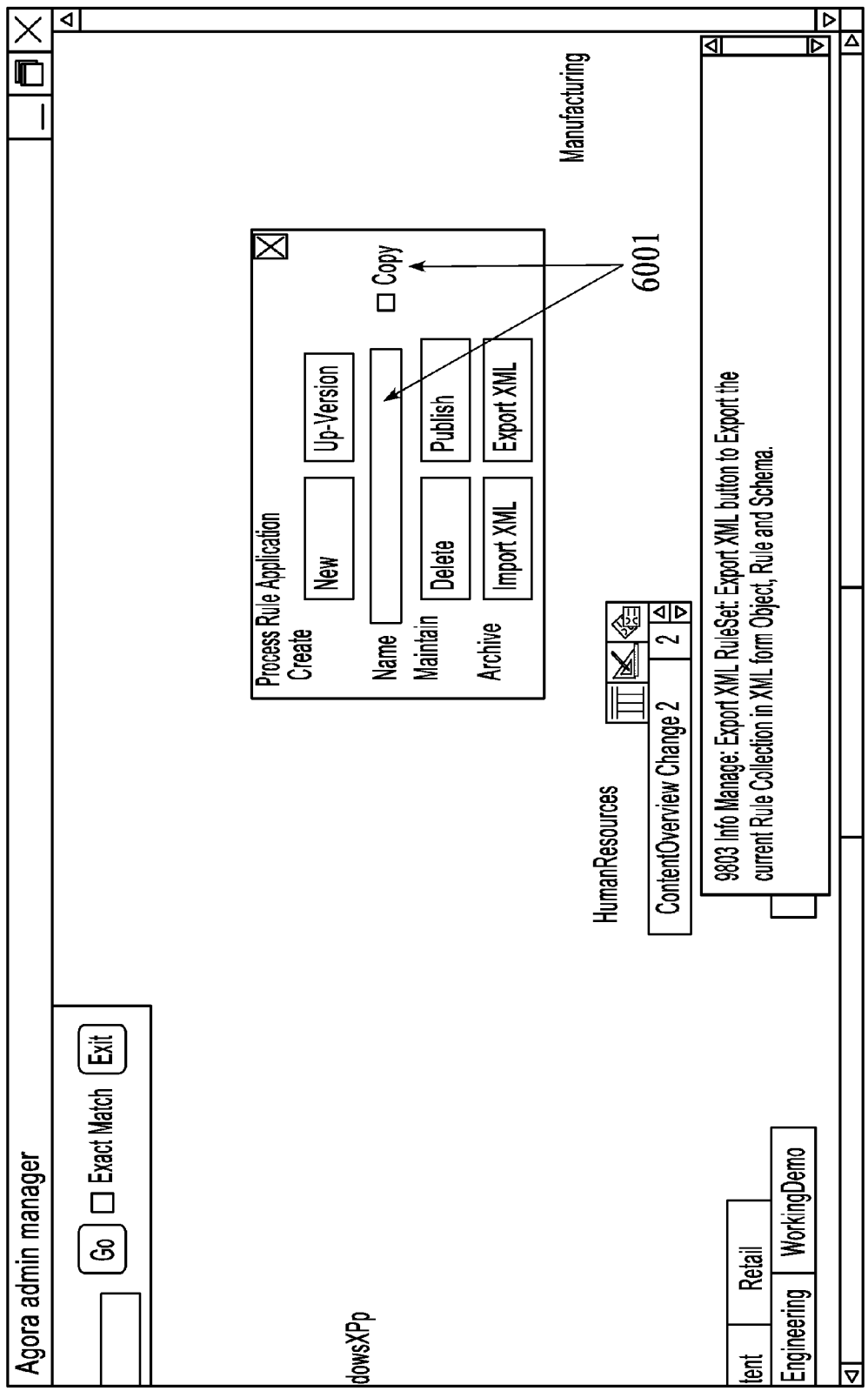
FIG. 60 is an example drawing of the copy function in Manage Mode screen

Example embodiments of the Multi-Tier interface according to the invention are outlined in several screen shots and diagram. For example, FIG. 46 illustrates the Multi-Tier design form, FIG. 47 illustrates the Evaluate mode, FIG. 48 illustrates the Edit Mode, and FIG. 60 illustrates the Manage Mode. Together, the diagrams showing examples of the major components of the Multi-Tier Interface according to certain aspects of the invention.

Figure 24:
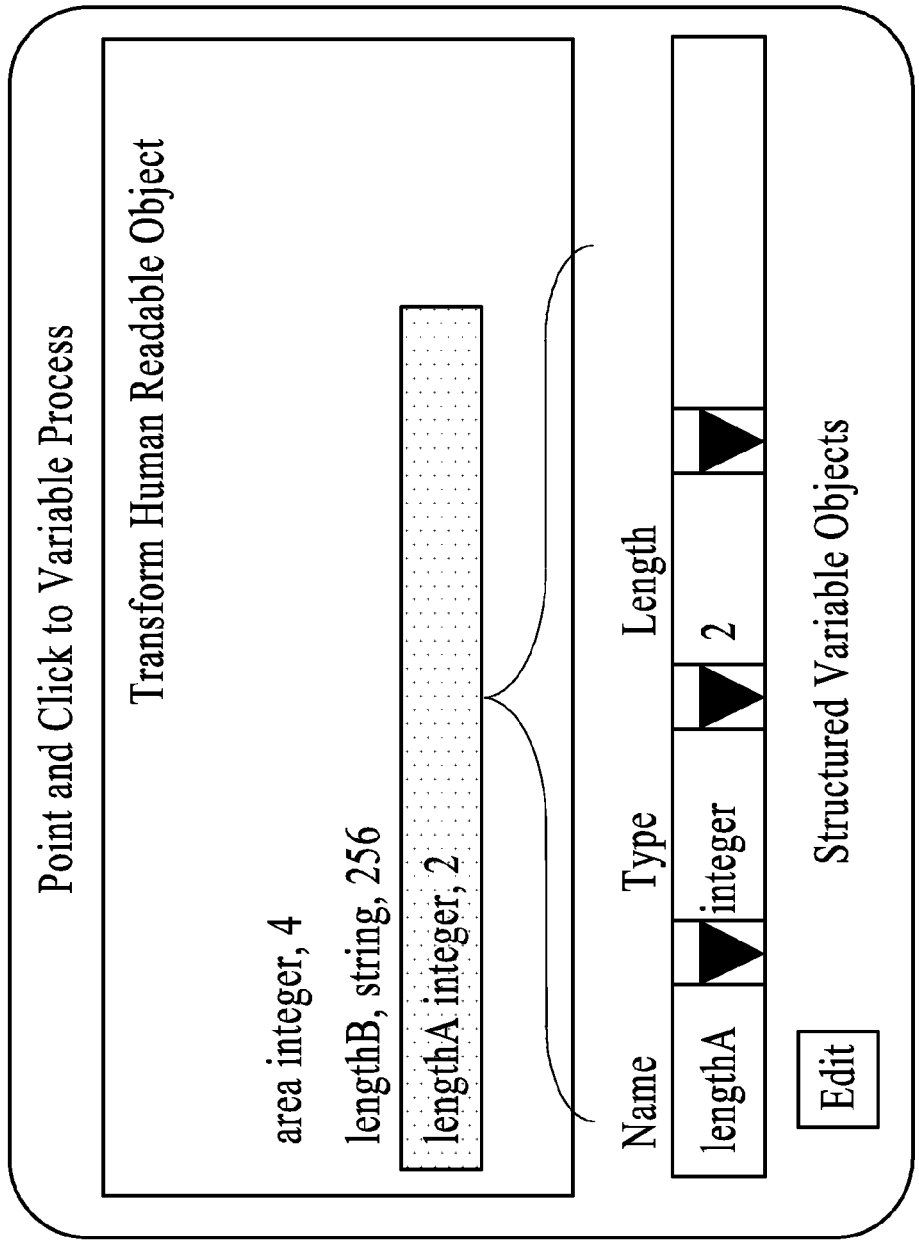
FIG. 24 is a drawing showing software design and invention for the Point and Click Variable Process Object for Schema screen

FIG. 24 provides a more detailed view of zooming on the Variable object according to example embodiments of the invention. It illustrates the uniqueness of a point and click process that results in a human readable text line. AVRO retains the object as a structure and not as text. The human readable text is always generated on the fly. This is a point and click to a Variable Process.

Figure 25:
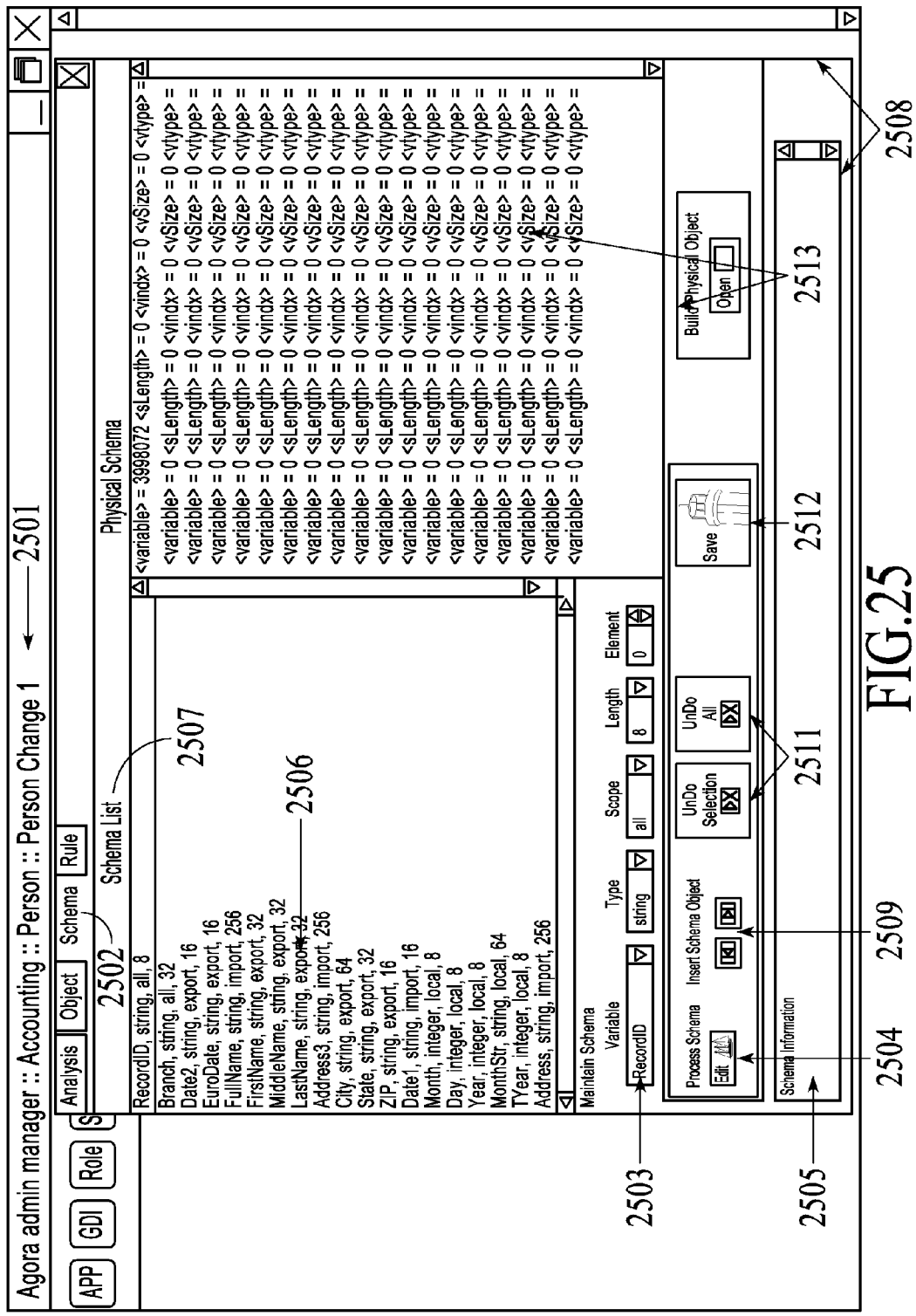
FIG. 25 is a drawing of example for the Variable Object (Schema) as deployed in the Schema screen for the Edit mode operation and the key tabs and command lines within the screen design.

FIG. 25 is a screenshot illustrating one example implementation of displaying the Schema Object (i.e. Variable Object) according to embodiments of the invention. Display is both the Schema detail data source and targets 2506 but also the Physical Schema 2513 programming support and information. The Maintain Schema 2503 command line adds or deletes source and target structured data definitions. The Process Commands 2504 execute the edited function defined in the command line above 2503.

Figure 26:
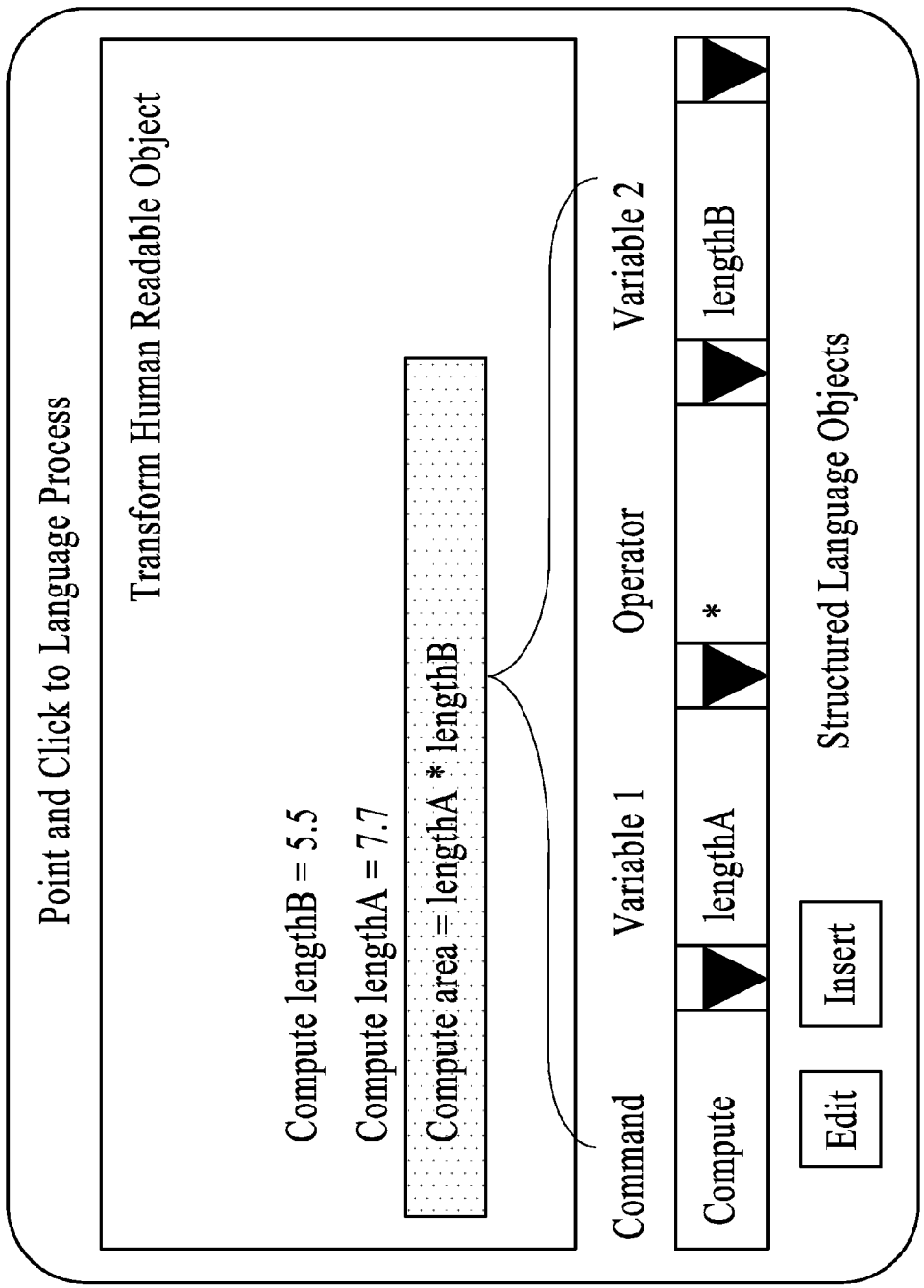
FIG. 26 is a drawing of the software design and invention of Point and Click to the Language Process Object for Rule screen

FIG. 26 provides a more detailed view of zooming on the Language object according to example embodiments of the invention. It illustrates the uniqueness of a point and click process that results in a human readable text line. AVRO retains object as a structure and not as text. Human readable text is always generated on the fly. It should be noted that the human readable lines can be selected and edited by a point and click method or used to create new command lines or delete command lines. This is a point and click to Language Process.

Figure 27:
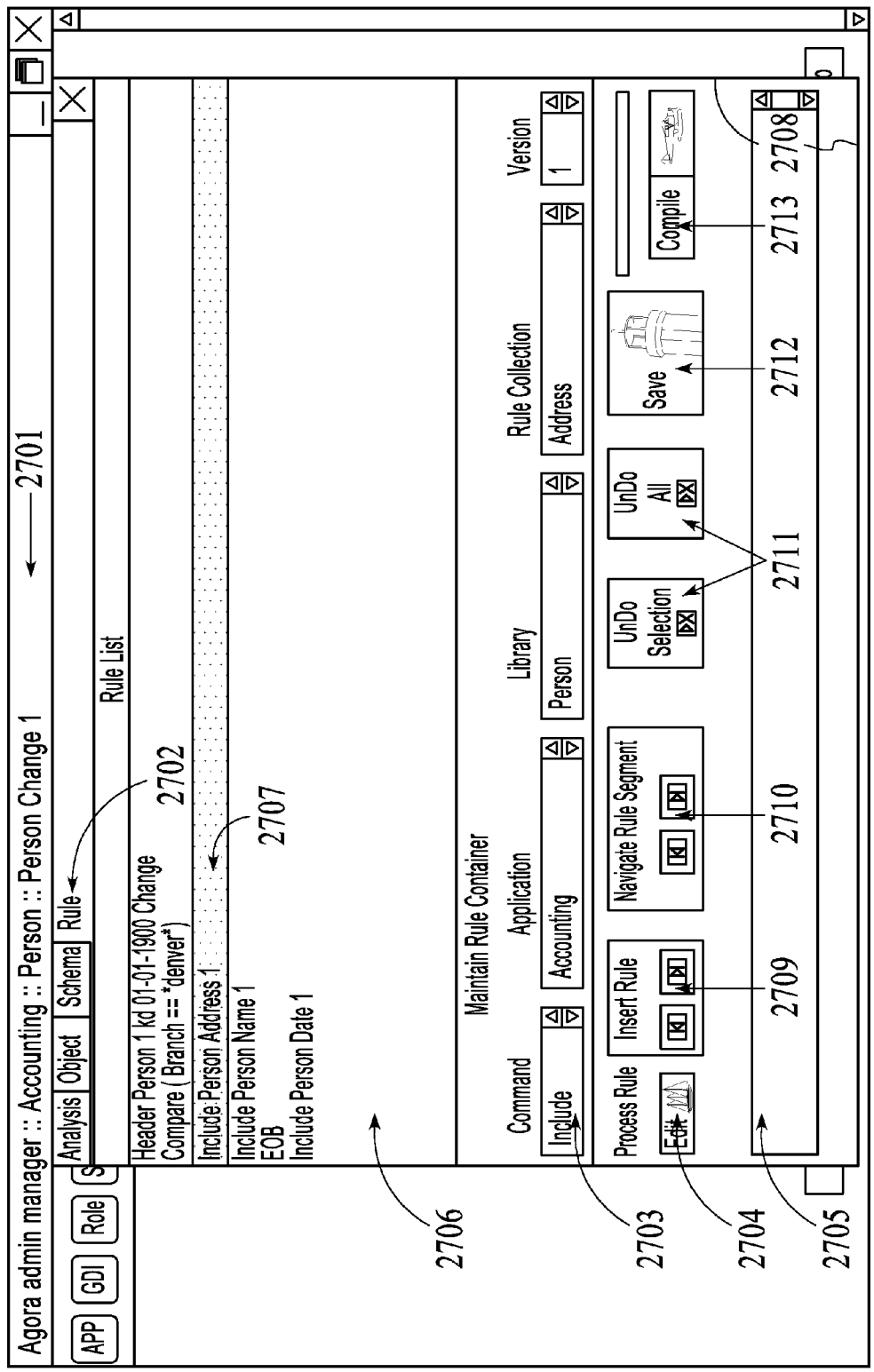
FIG. 27 is a drawing example of a Language Process Object in applied state by the Edit mode Rule commands object. Rule Screen is the applied embodiment of the invention and design. The display outlines the command and tab structure for the Rule object.

FIG. 27 is a screenshot illustrating one example implementation of displaying and/or editing human text generated 2701 for the Language Object of the Composite Object (Variable+Language+Connector Objects) according to embodiments of the invention. Creation of function aspect is done at command level with command options and spread sheet level program principles. This provides the user with expanded processes for data integration application function against direct access of structured data for source(s) and target(s). Sources and targets can be multiple occurrences.

Figure 28:
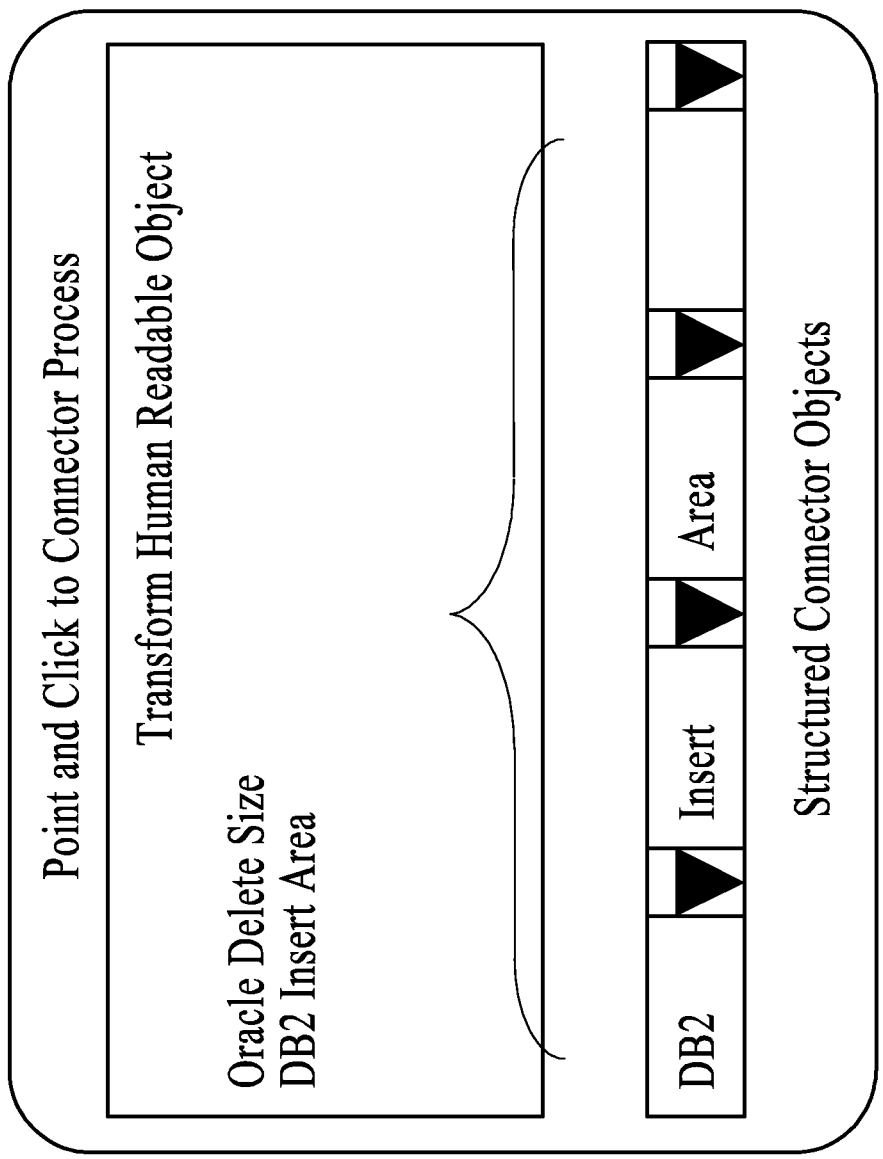
FIG. 28 is a drawing of the software design and invention of Point and Click to Connector Process Object for the Object Screen.
Figure 29:
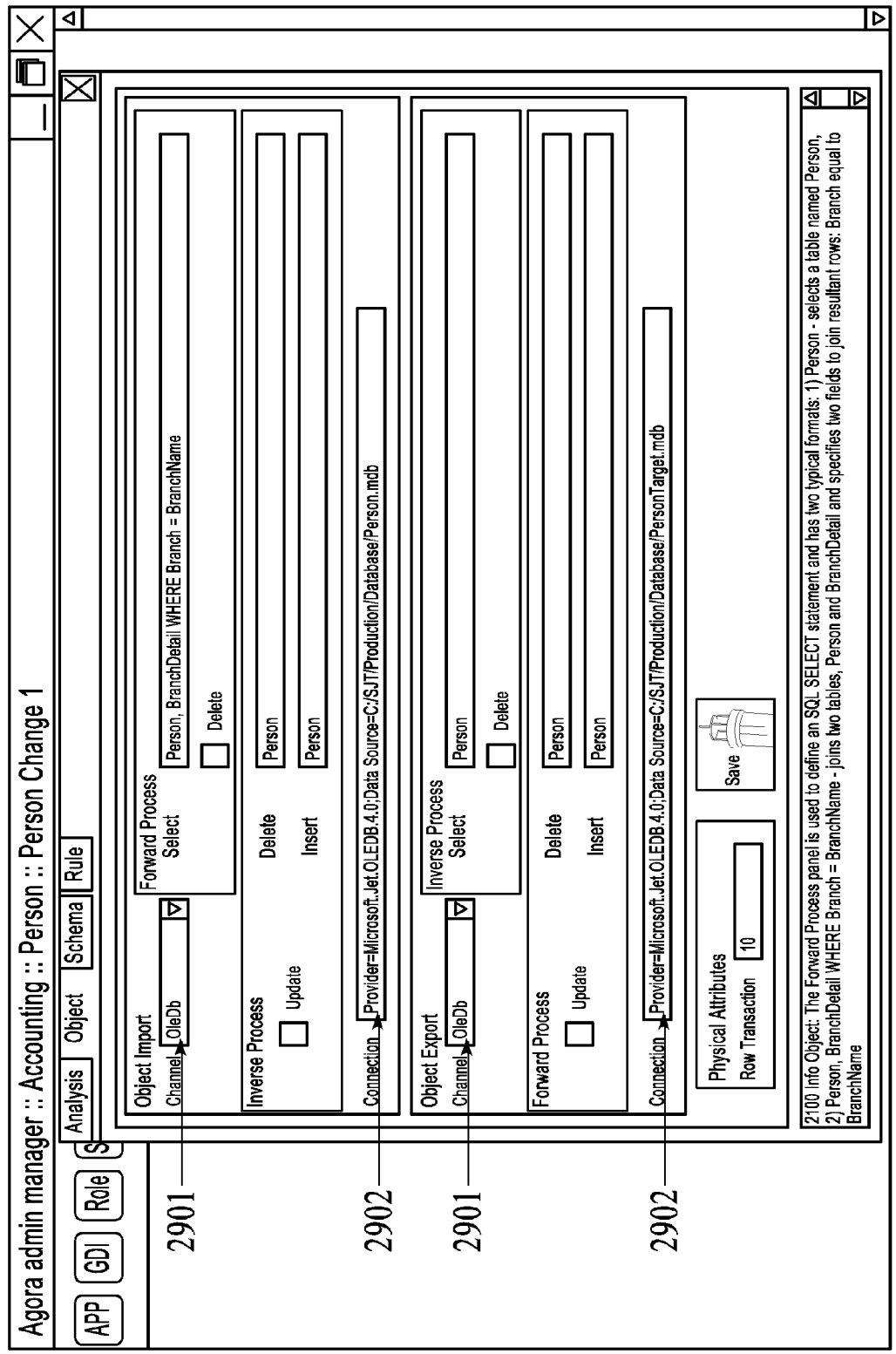
FIG. 29 is an example drawing of the Connector Process Object embodiment of the applied Object screen design for the Edit mode command line and tab options for direct connect to structured data sources.

FIG. 28 provides a more detailed view of zooming on the Connector object according to example embodiments of the invention. The Connector object connects sources and targets as specified in the human text readable area. It notes the uniqueness of a point and click process that results in a human readable text line. The present invention and design retains the object as a structure and not as text. The human readable text is always generated on the fly. This is a point and click to Connector Process FIG. 29 is a screenshot illustrating one example implementation of displaying connections between the data source and target locations for the Data Integration Application (Composite Object) use according to embodiments of the invention. Source type 2901 and location or data access path 2902 to the data source(s) and target(s); as defined by IT and/or the responsible Data Base Administrator (DBA).

Figure 30:
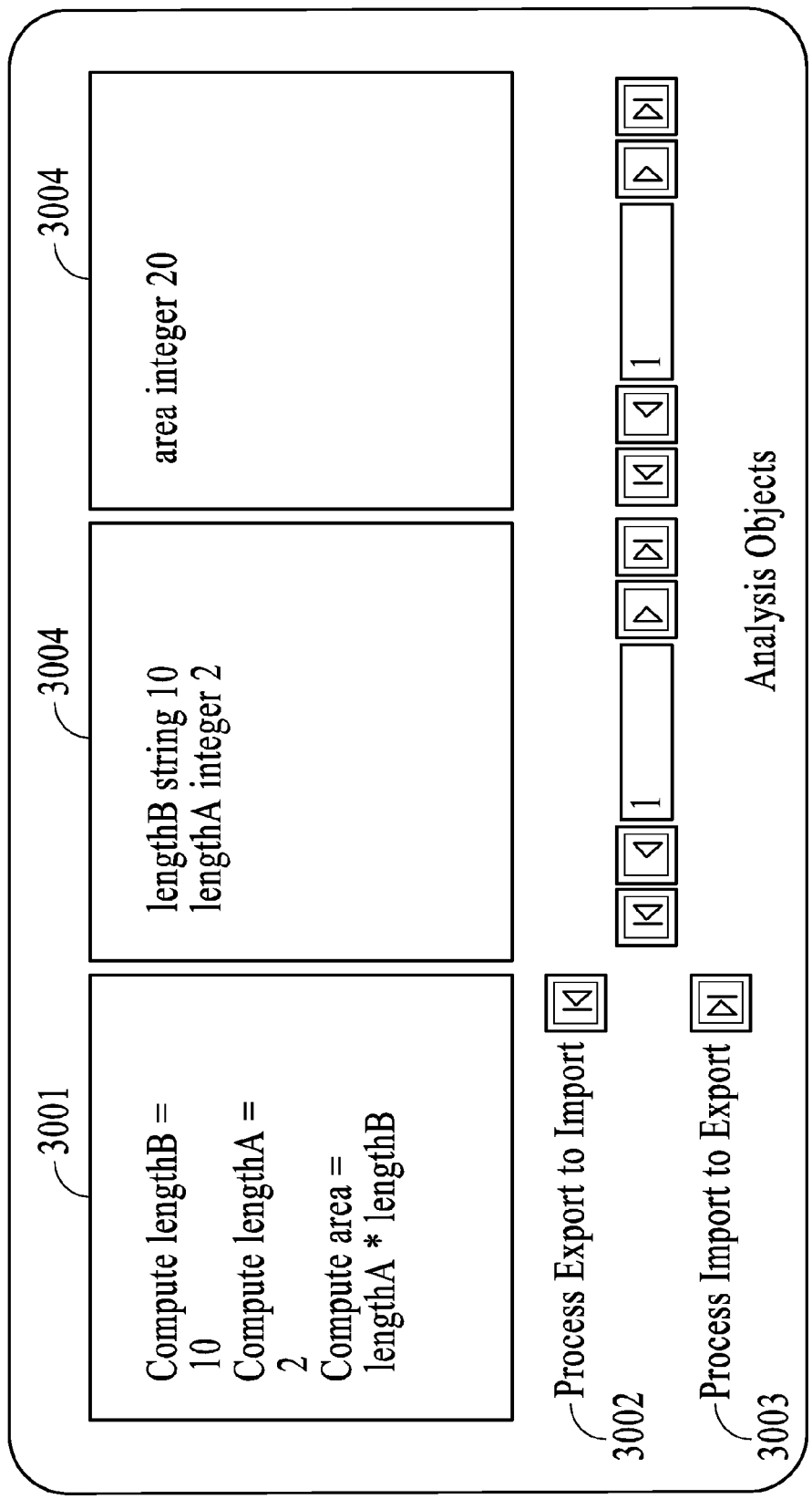
FIG. 30 is a drawing of the software design and invention of the Analysis Objects Analysis mode and key tabs and command lines within the screen and functionality

FIG. 30 provides a more detailed view of zooming on the Analysis object according to example embodiments of the invention. The analysis object shows the current language definition 3001 and a user can test the language object either source to target 3002 or target 3003 to source. The user can browse the results of either the source or target processes 3004. This is a method to verify that the language object is transforming the source to target as required.

Figure 31:
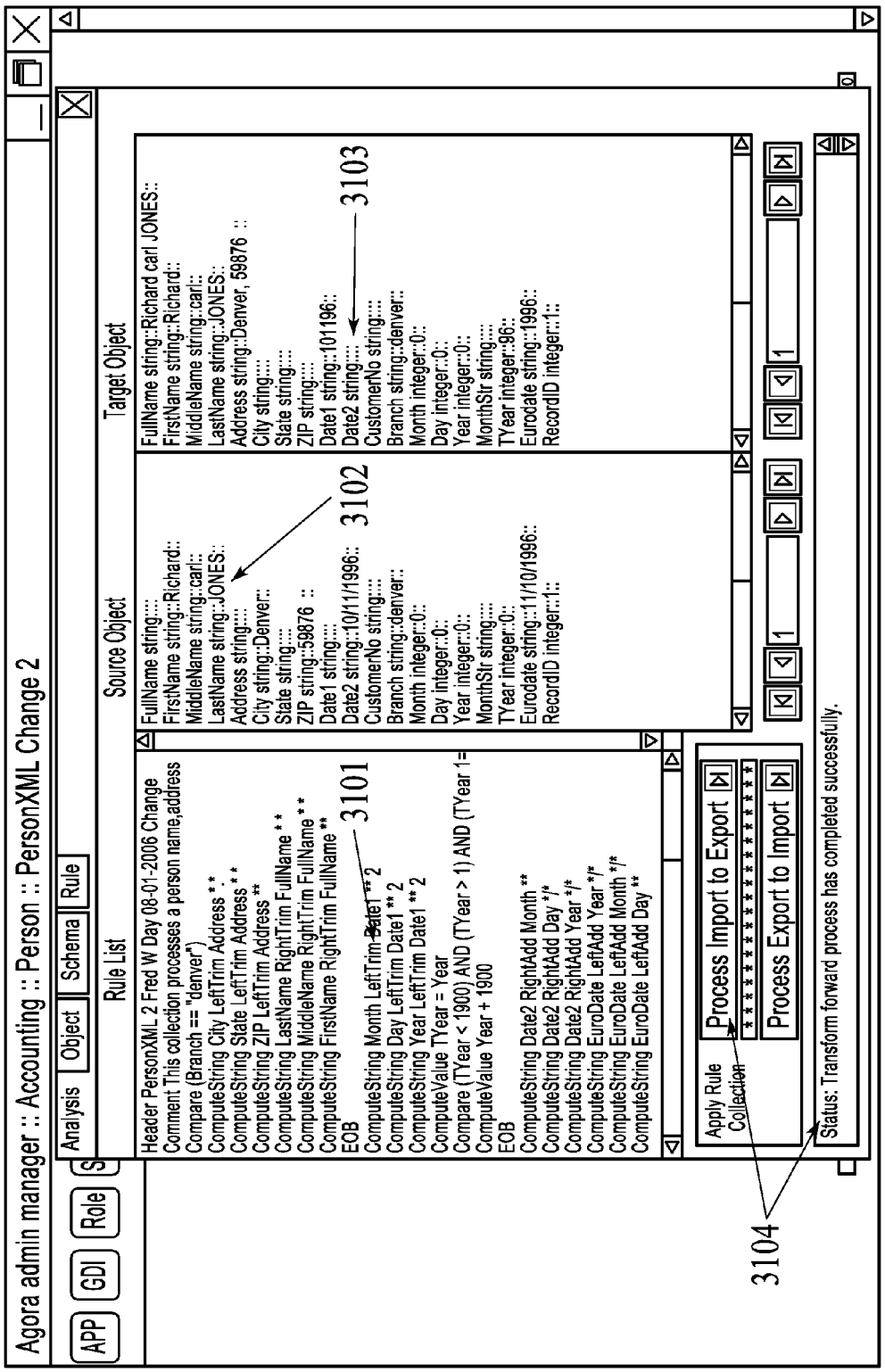
FIG. 31 is an example drawing of an Analysis Objects screen showing a test in process against structured data sources using a Composite object (Data Integration Application).

FIG. 31 is a screenshot illustrating one example implementation of displaying analysis objects according to embodiments of the invention. In this displayed example, the analysis object screen or test screen is a bi-directional source 3102 and target 3103 path test 3104 to confirm the selected data segments/elements are transitioning properly. It should be noted that the Analysis Object can be run directly against live data or copied and test analysis then conducted. An aspect of the invention is rapid test and validation prior to publishing (compiling) of Composite Object (Data Integration Application) for production in company IT and data environment.

Figure 32:
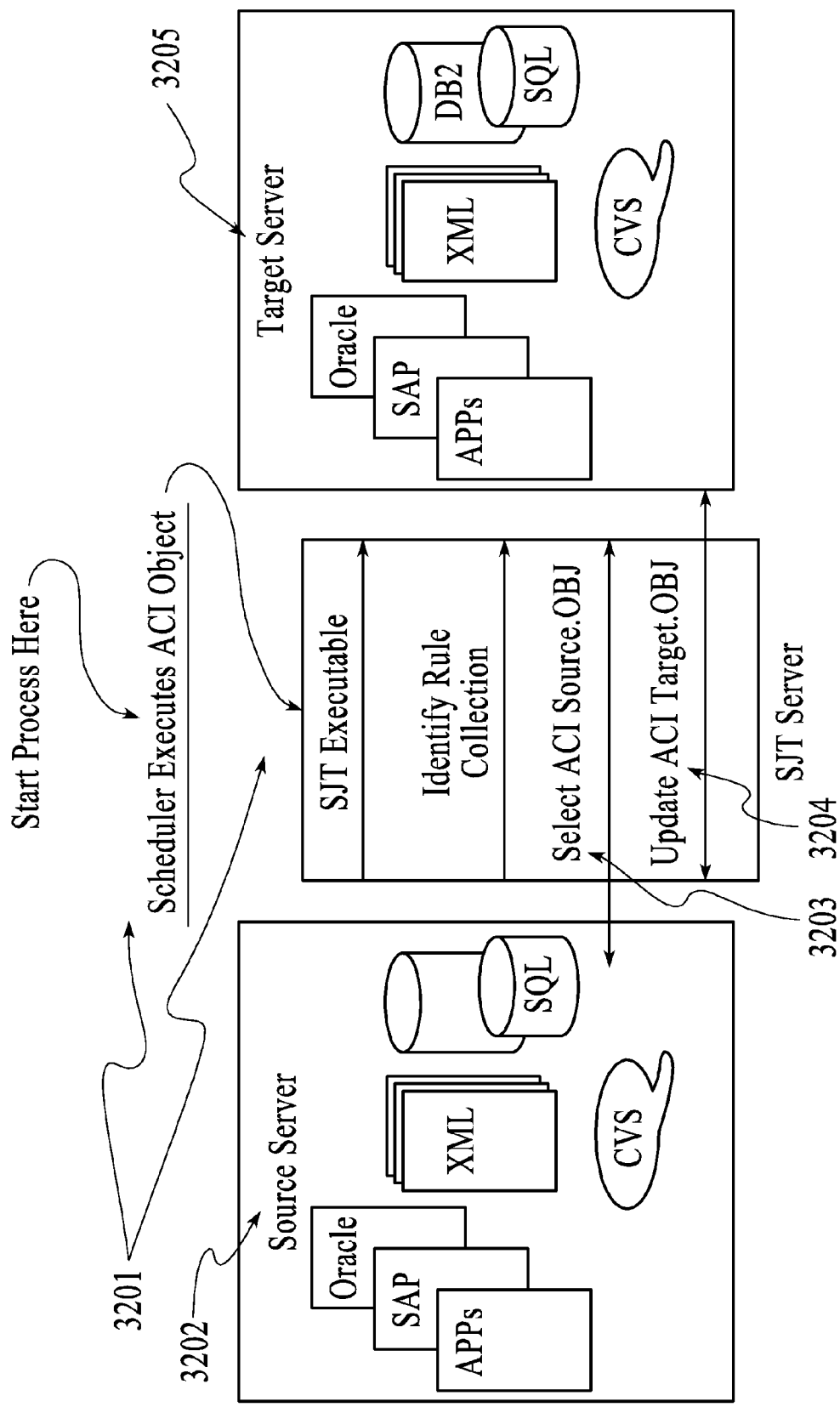
FIG. 32 is a drawing of the software invention and design of the execution sequence of an Object within the software design and architecture in source to target processes for Composite Object
Figure 33:
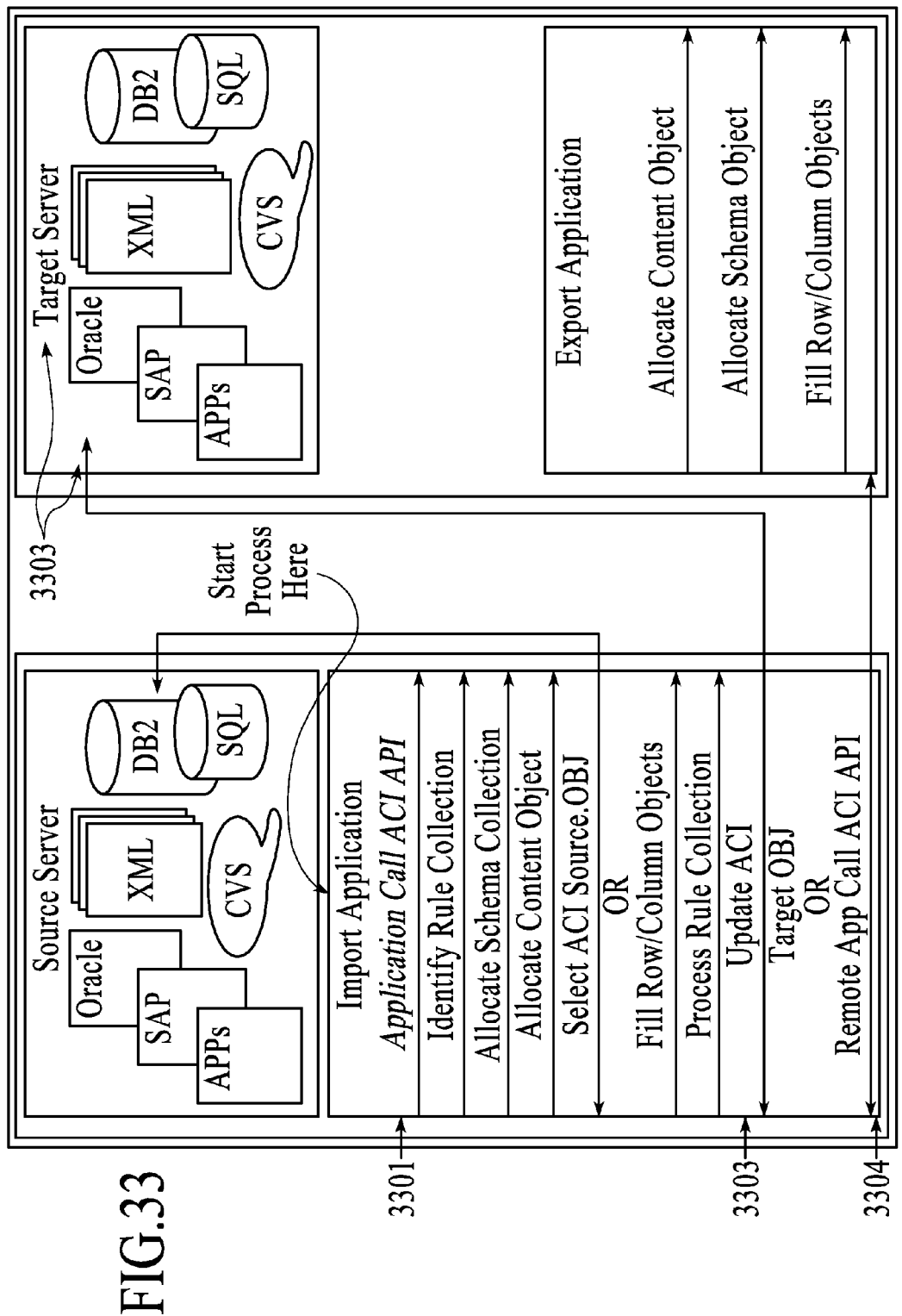
FIG. 33 is a drawing of the software invention and design with application launches software executable transforming the source object using Composite Object

FIG. 32 is a flow diagram illustrating one example implementation of embodiments of the invention. In this example shown in FIG. 32, an external job scheduler launches an AGORA software executable 3201. The AGORA software executable transforms a source object to the target object using AGORA software Rule, Schema, and Connector objects (3202). The result updates the target server object (3203). Any object including data bases, files, XML, and binary files but no limited to, these can be either the source 3204 or target server 3205. An AGORA software executable requires the linking of a client source and target adapter to access the client server technology FIG. 33 is a flow diagram illustrating another example implementation of embodiments of the invention. In this example, the AGORA executable is linked to source server application 3301 using the AGORA API. The source application launches the AGORA executable. AGORA executable transforms the source object using the AGORA Rule, Schema, and Connector objects (3302). The result object is updated on the target server 3303 or executed in a target server application 3304. An AGORA executable requires the linking of client source and target adapters to access the client-server technology.

Figure 34:
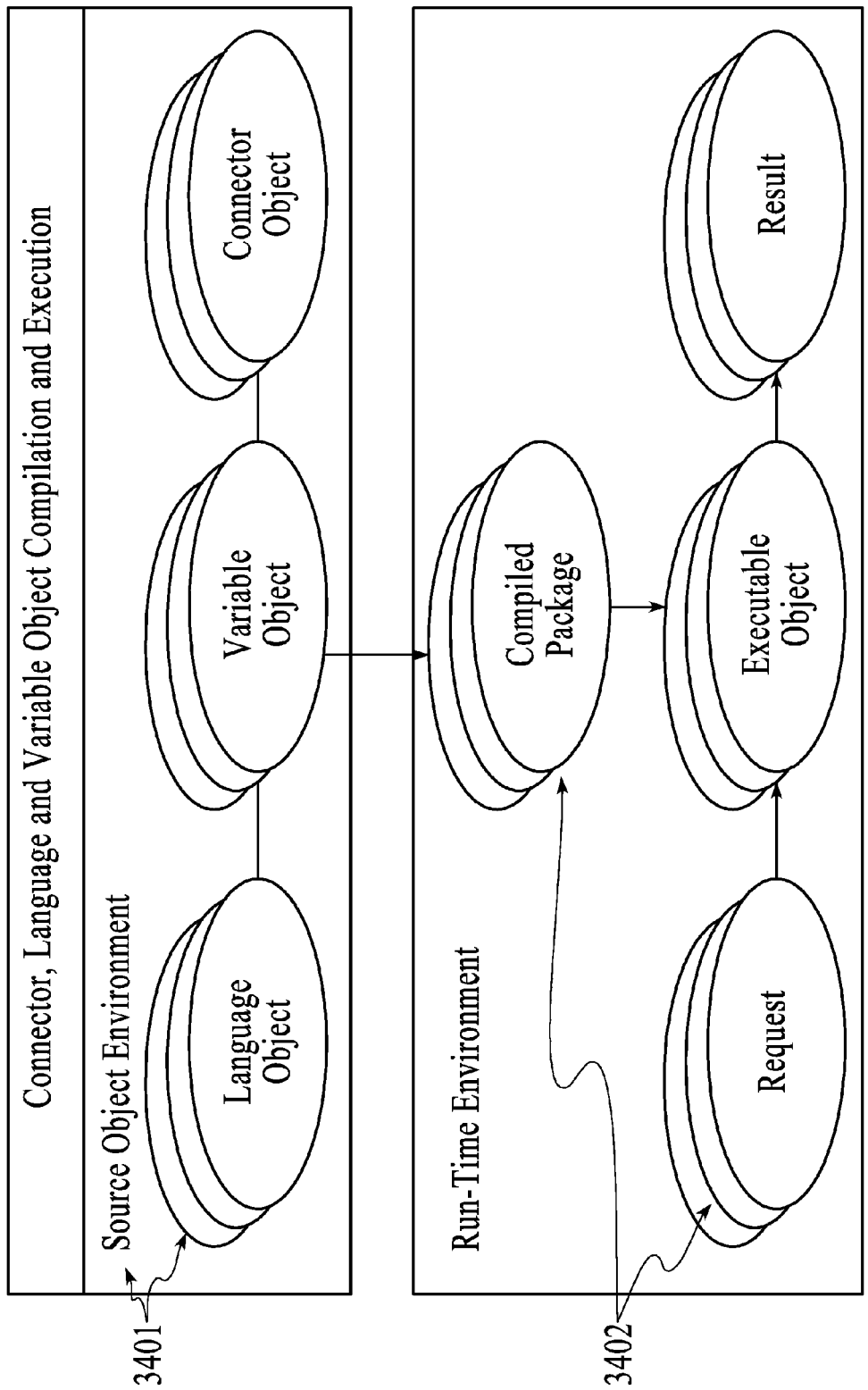
FIG. 34 is a drawing of the software invention showing the Language, Variable, and Connector objects compile process to be run independently in another run time environment

FIG. 34 is a block diagram illustrating an example of Connector, Language and Variable Object Compilation and Execution according to certain embodiments of the invention. More particularly, FIG. 34 shows an example implementation wherein AGORA Language, Variable, and Connector objects 3401 are compiled as a machine-independent compiled package to be executed on some other run time environment 3402.

Figure 35:
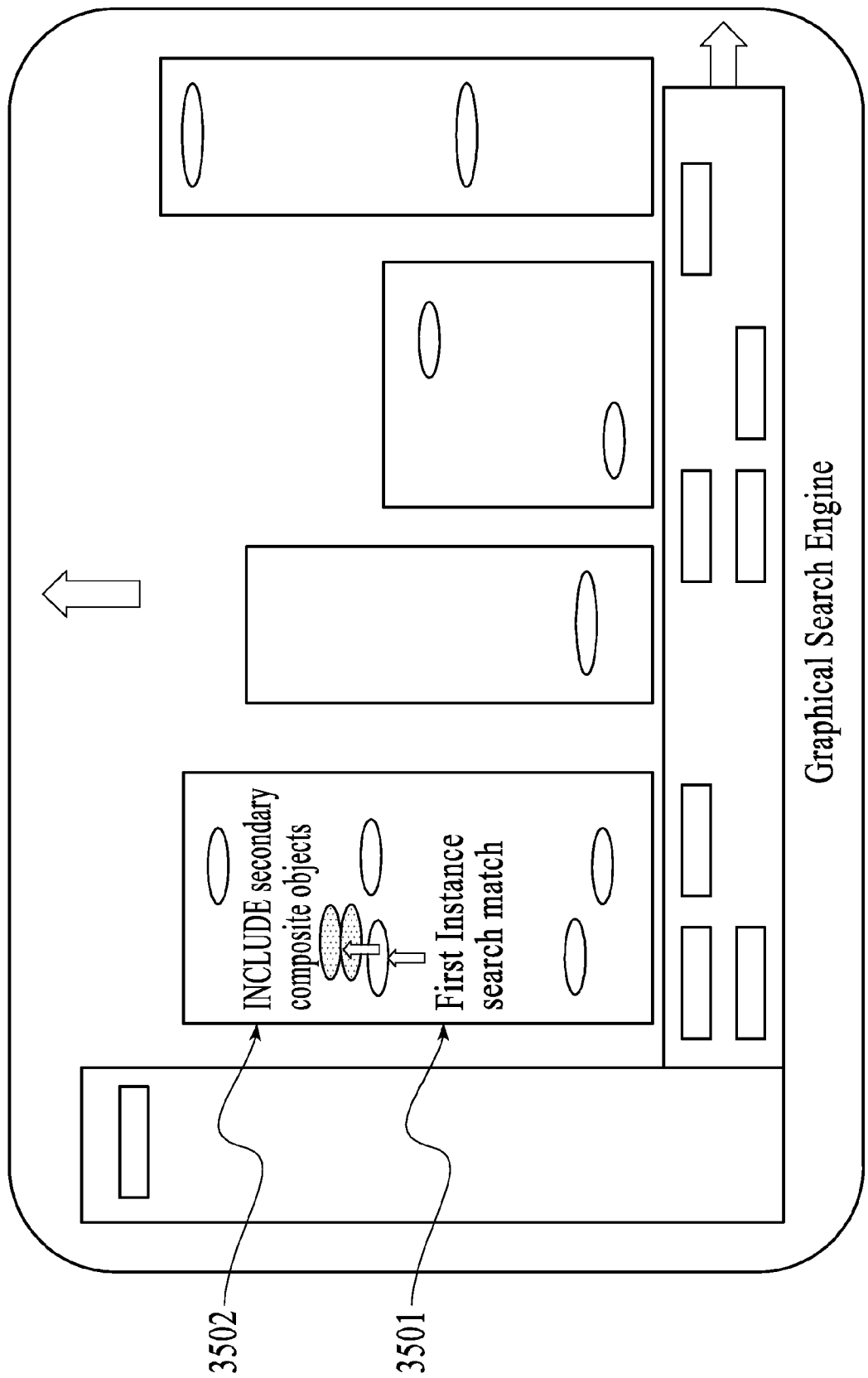
FIG. 35 is a drawing of a Graphical Search Engine using Level 4.2 Interface as the display mechanism for the user.

FIG. 35 provides a more detailed view a graphical Search engine according to example embodiments of the invention. In embodiments, AGORA has a Search method that will display the match 3501 from any term (such as "inch") and display all matches in the Application, Library, and Composite object stack. The Search provides navigation to look at includes and includes within includes as a secondary Composite objects 3502.

Figure 36:
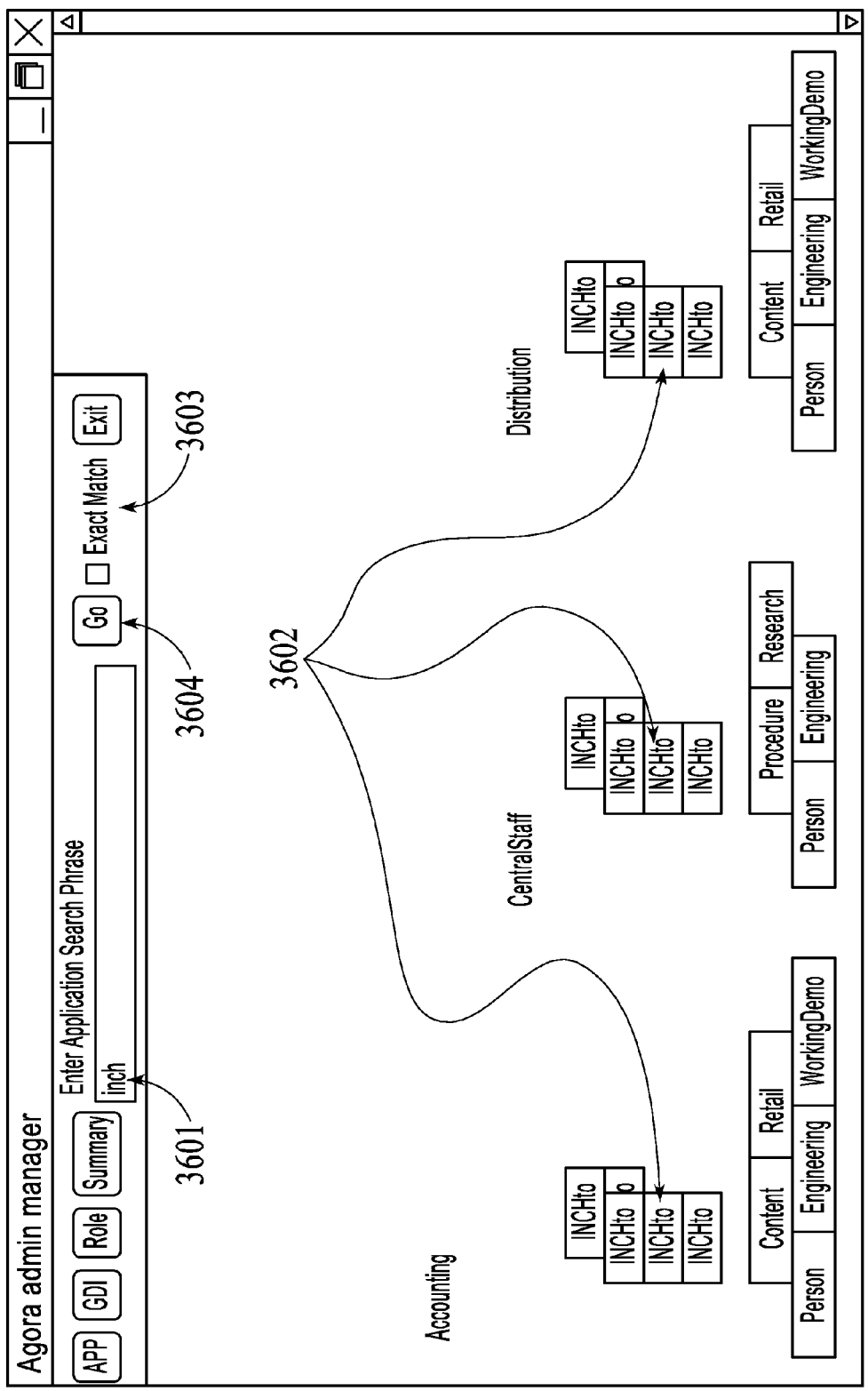
FIG. 36 is an example drawing of display of Composite Objects and Include nested Composite Objects from graphical Search Engine processes using word search term of "inch" example.

FIG. 36 is a screenshot illustrating one example implementation of entering search terms and displaying search results and corresponding objects according to embodiments of the invention. In this example, a Search with "inch" being the search term is entered in search status 3601. The Search Engine function FIG. 35 can be specific match or general search criteria. The Search result displays the Composites or Data Integration Applications published or unpublished matching the search argument. Each Library will display all Composites (yellow) 3602 or nested objects (green) that meet the criterion. Search conducted at name level of the Composite Object (DIA) and not inside of an Object at this stage of the software's invention and design.

Figure 37:
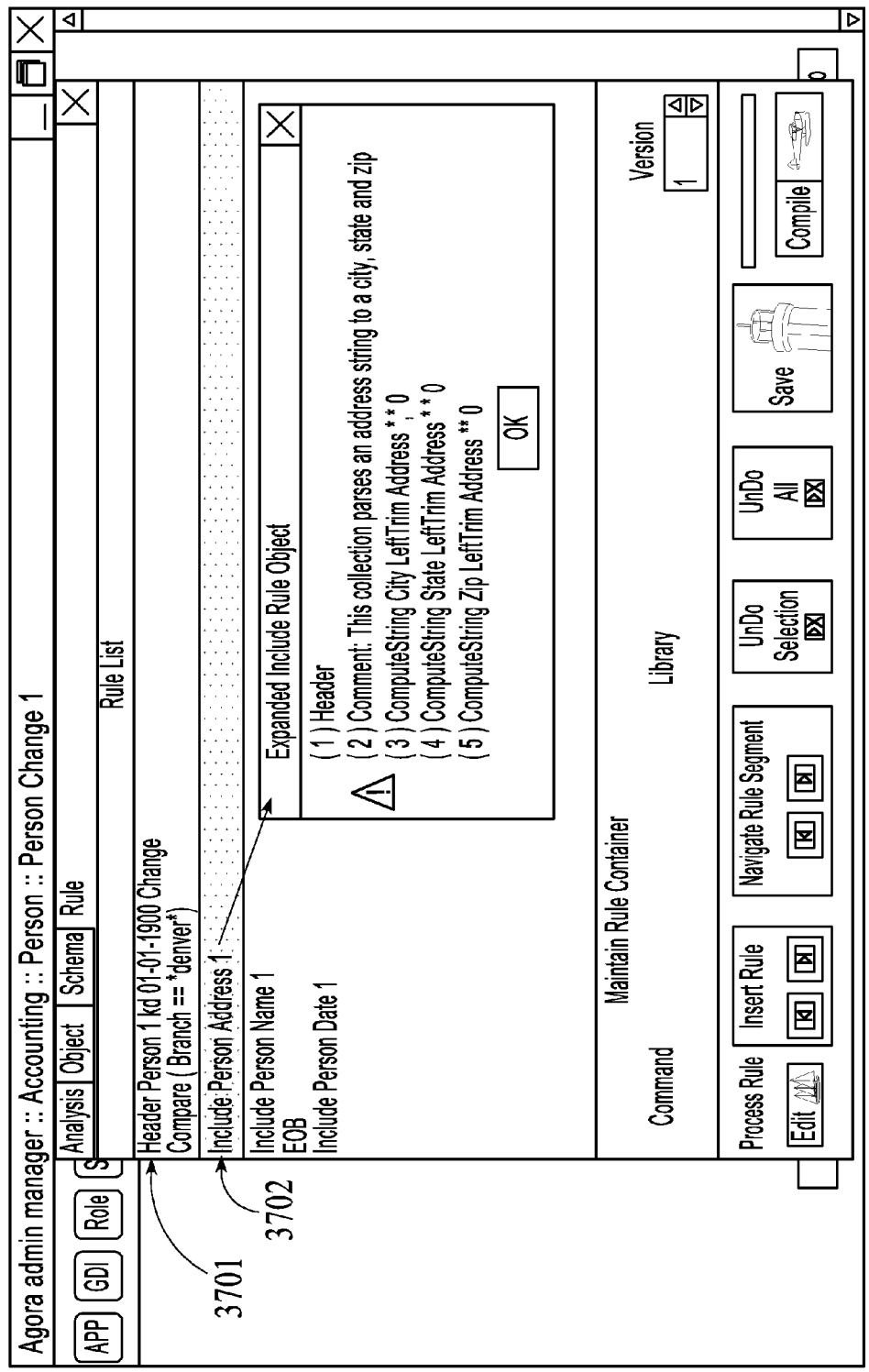
FIG. 37 is an example drawing of the program for an INCLUDE based Composite Object displayed per the software invention and design functionality. Can also display the entire Composite Object command program.

FIG. 37 is a screenshot illustrating one example implementation of displaying rule objects according to embodiments of the invention. The auto documentation created for the language (Rule Object) 3701 will display for either the entire Rule Object FIG. 55 or a specific nested object Rule Object 3702. Capacity to direct print the Rule and Schema Object command/program content used to execute in Data Integration Application (Composite Objects).

Figure 38:
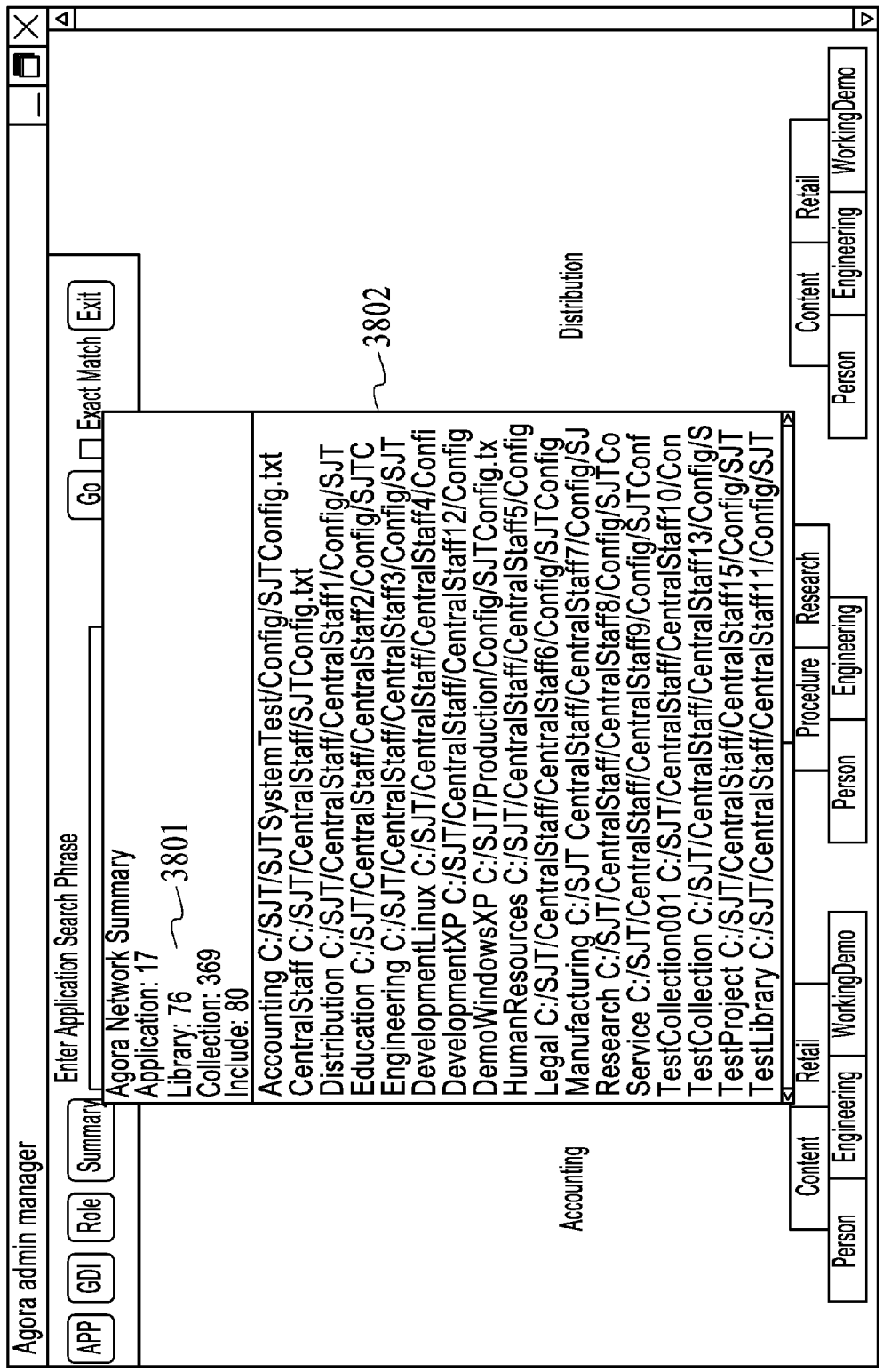
FIG. 38 is an example drawing of a Project-Enterprise Level details of the size and scope of the Libraries, Composite Objects, and nested objects in the entire Project.

FIG. 38 is a screenshot illustrating one example implementation of displaying certain summaries according to embodiments of the invention. According to certain aspects, the present invention and design automatically maintains the scope of the objects, Libraries, INCLUDE statements 3801, Applications and the primary paths to the Libraries 3802. Embodiments of the Multi-Tier interface displays the Summary tab content through tracking processes located in the software.

Figure 39:
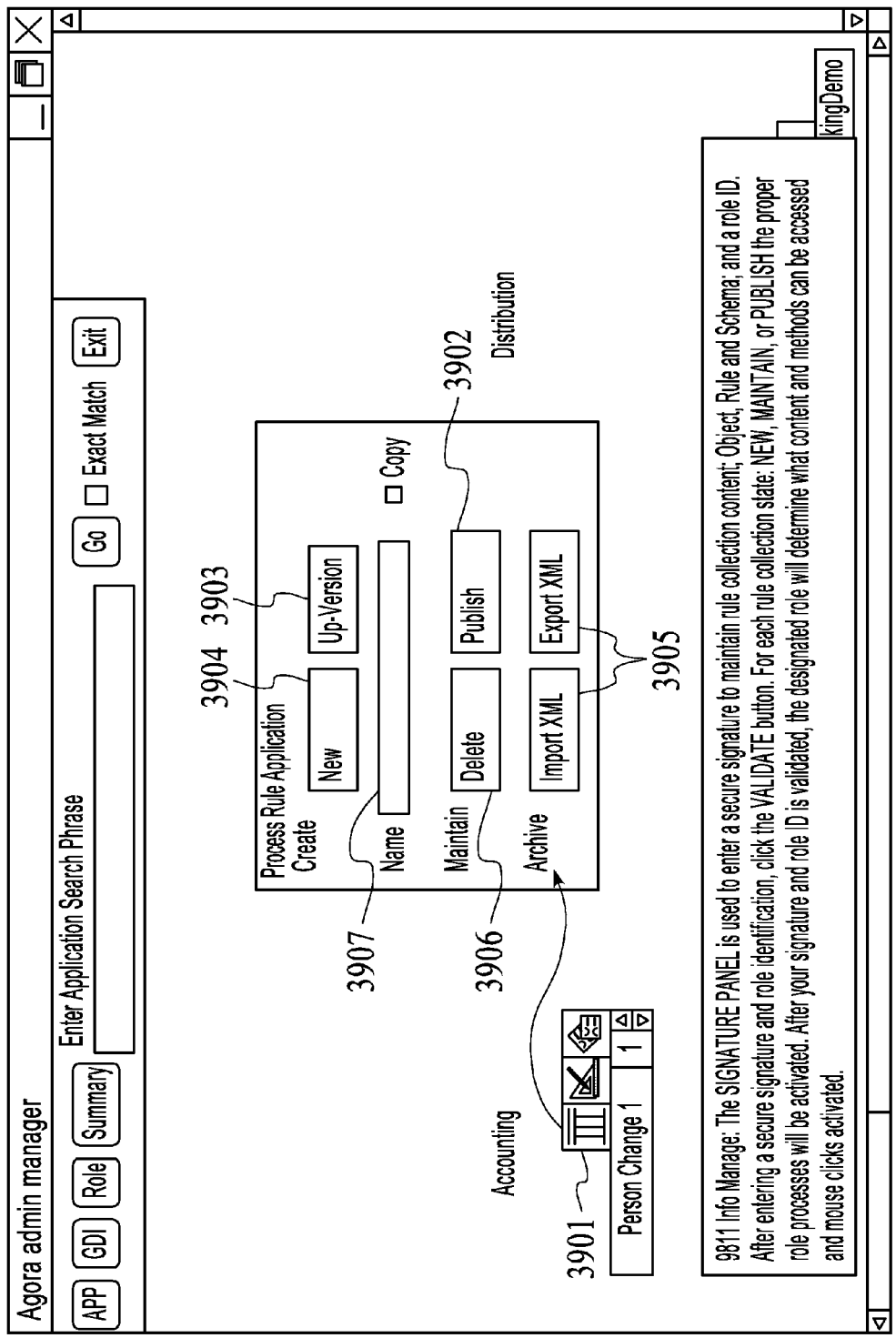
FIG. 39 is a drawing example of a Master Mode screen being activated for processing options.

FIG. 39 is a screenshot illustrating one example implementation of displaying certain rule related functions according to embodiments of the invention. In this example, the functions are provided in a Manage Mode FIG. 39 master screen Interface 3901. This screen has functions to Up Version 3903 Copy 3907, Create (New) 3904, Publish (compiled objects) 3902, Delete 3906, or Import/Export XML 3905 based files of the Composites Objects (Data Integration Applications). The process actions on a Composite Object's Rule Object, Schema Object and Object are defined at this part of the software's invention and design. The actions are beyond initialization (Create, Up-Version) are final actions taken in the processing of a Composite Object within embodiments of the present invention and design.

According to certain aspects, the invention includes Data Integration Application development, which refers to the function, inventions and processes used to create, edit, test, publish (compile), and delete versions of AGORA data integration applications (Composites). The following descriptions will show the primary capabilities and inventions. There are a significant number of commands and process options that are available beyond what is found in this document. The focus of this section is a preferred embodiment including a multi-tiered GUI (sometimes referred to herein as Level 4.2) and software functionality (sometimes referred as AGORA). Another possible embodiment (sometimes referred to herein as The Level 2.3 option) is present in the content but may not be fully described in the following explanations.

Embodiments of software according to the invention are designed to create and support applications built specifically to work directly with structured data sources. It does this by an architecture using compiled Composite Objects through commands and spread sheet application functionality principles. It is a horizontal, open data platform interfacing to any structured data source independent of data software vendor. The software is not Business Intelligence, CRM, Data Warehouse application software. The focus is Extract, Transform, Load (ETL), data quality, and functional application actions to modify and utilize data to the requirements of the user. AGORA software is designed for Subject Matter Expert Users and IT user. Its priority is the Subject Matter Expert users working in de-centralized organizations or organizations having incompatible data sources due to acquisitions, reorganizations, and a common situation of disparate vendor software that has accumulated over extended periods of time—decades.

The reality is the data environment is complex and chaotic due to the historical financial reality no company can economically or quickly convert to a new vendor or implement a single data software strategy without high costs and very high technical risks. This is because structured data being the most important asset a company owns. The present invention's software is designed to work in this structured data complexity and chaos within the limited financial and technical resources available to the user organization. The present inventors recognize that there are average to slightly above average user computer skill sets acquired through the experience of working with office suite software, financial software packages, and the industry-job skills expertise acquired through computing processing during the user's career. One objective is to leverage those skills sets as they exist through limited additional training in parallel with a simple, straight forward GUI design specifically for data integration requirements. The GUI and the software designs are not re-design of software elements from existing vendor software components or open source code.

According to certain aspects, the present invention uses application and data criteria to leverage an organization's structured data. This is defined as a Data Integration Application design. The extensive internal compiled object processes leverage a simple, human level logic GUI to enable Subject Matter Expert users' direct access and processing of structured data to support their organizations operational requirements. The design point is to internalize the complexity and chaos associated with data and contains the impacts it generates.

The purpose of this content is to outline the processes available to an authorized user in order to bridge the multiple, incompatible structured data source designs found in a Global 2000 size company to small business groups. This bridging includes incompatible structured data sources of the multiple versions of data software solutions from the same vendor. An example is the numerous versions/releases of database software Oracle, IBM, Microsoft, and others have produced over time. There is no indication future trends will resolve the data version incompatibility issues.

Embodiments of the present invention include a Multi-Tier Interface (sometimes referred to herein as Level 4.2 and Level 2.3) with screen designs structured to enable Subject Matter Expert users and IT users the capacity to effectively utilize, transform, and conduct data quality functions at a group level without the requirement of a massive IT infrastructure support. Embodiments of the invention provide software with three base levels of operation; Evaluation Mode—access to only Composites by all users; and Edit mode—the authority to edit and Composite Objects (Data Integration Applications) by Subject Matter Expert and IT users and Manage Mode to create, delete, up-version and publish (compile) Composite Objects by authorized users.

The Multi-Tier interface displays at the Composite Object level down to specific Composite components: its Variable, Connector, and Language objects. In the Data Integration Application applied view these are the components of Schema (Variable) Object (Connector), and Rule (Language). The interface design flexibility permits revisions and updates to the Multi-Tier Interface levels in the future. The underlying software design and coding structure of the architecture sections can be independently developed because the core principles for future development of the software and Multi-Tier Interface is at the internal software design and code levels. Unlike icon-pop up screen designed software that impact both the GUI and software design levels in parallel.

The Evaluation mode is the browse option for the software invention. Users are authorized to review and use the Published (compiled) Composite Objects (Data Integration Applications) for their business application requirements via standard application software access processes of the company; such as using a CALL statement from an application to retrieve the needed data. It should be noted that only Published Composite Objects can be deployed for production use. The objective is to provide a wider access of the Published and when appropriate unpublished Composite Objects (Data Integration Applications) to users that need the structured data for their requirements. This mode does not permit any of the Edit or Manage mode functions to be used (Create, Publish, Up-Version, Delete, or Copy). This option also permits users in and/or outside the company to access and view published and unpublished Composite Objects based upon their individual security access profile.

The second operation mode is the Edit mode where an existing unpublished Composite Object (Data Integration Application) can be further processed for eventually being Published (compiled object). There are 4 elements to the Edit mode: Rule Object (Language), Schema Object (Variable), Object (Connector) and Analysis. These are the applied version of the software invention and design or the Rule Screen, Schema Screen, Object Screen, and Analysis Screen (see FIG. 46. below and corresponding descriptions).

The Rule Screen's purpose is to create the function and processes to be conducted with the structured data. It is where the spread sheet functionality principles are applied by the user. It is required by design to use the variables created in the Schema Screen's data profiles.

The Schema Screen's purpose is to create a structured data profile from the user directly entering the information regards the structured target and source data sources. Existing metadata can be used to assist.

The Object Screen's purpose is to provide the type of connection and the connection path to accessing, retrieving, and placing data where needed.

The Analysis Screen's purpose is to test the Data Integration Application (Composite Object) before being published (compiled object). (see FIG. 30 and corresponding descriptions for example).

The Edit mode enables the users to review and revise the Composite Object's content. The invention permits Subject Matter Expert Users to leverage their particular expertise via direct source data access by processes that permit testing of the application prior to production. —a ROI productivity and quality invention aspect.

The third operation mode is the Manage Mode. It provides the capability to Delete, Publish (compile), Create(NEW) Composites (DIA), Up Version, Copy and Import/Export XML files. The Subject Matter Expert users access the unpublished or published (compiled) Composite Objects (DIA) and determine how to handle incompatible, disparate data formats. Second, allows Subject Matter Expert users and IT users to create paths to the data sources for their use independent of other user's requirements. The user exercises one of these options to move the Composite Objects from development to compiled object, a new Composite Object, or a new version of the Composite (X+1). This mode does not permit the edit function to be active state. It is an action level set of processes.

When a user is in Evaluation, Edit, or Manage Mode, they can only access one Composite Object Cell for process work. This is a control design and is structured to work at the users compute skills sets. It should be noted that security authorization assignment levels can be performed by a Principal Administrator. In embodiments, they determine the edit options, AGORA Application List, Libraries and Composite Object level of access and use authority. AGORA software security processes utilize the company's IT security processes as a base for access to the structured data sources via the DBA or senior systems staff. Based on the company's security access matrix, a user will be granted their access scope authority to the software. Each user is assigned authority via a Role based access processes in the AGORA invention and design through the Principal Administrator.

The following screenshots outline example implementations of how the AGORA software and Multi-Tier Interface function and/or are utilized according to embodiments of invention.

Figure 40:
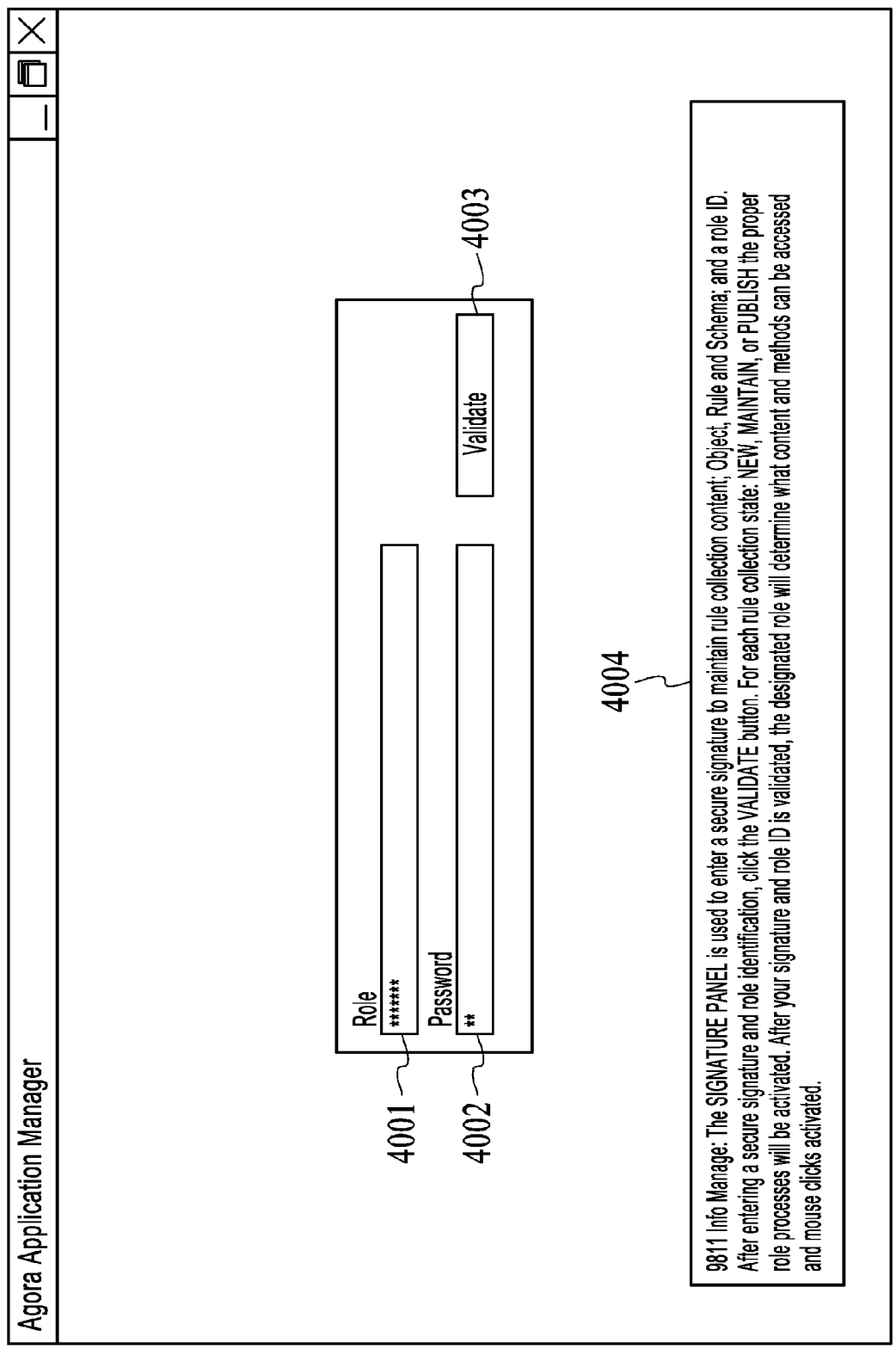
FIG. 40 is an example drawing of the two level sign on processes and edit authority sign on for Level 4.2 interface.

Users sign-on from the master screen FIG. 40 of the Multi-Tier Interface. The sign on is a two level process. A first level is the Role 4001 which are options available to users as defined by the Principal Administrator for each user. The Role simplifies through defined standards the users' security profiles. The second level of sign on is the Password 4002 for a user's authority levels to conduct edit and manage mode processes. Second level sign on is based upon the alpha, numeric and special characters permitted by the operating system. It can be encrypted either at the computing system level or through the AGORA software (up to 128 characters)

The Information and Error Message 4004 sub-panel is located at the bottom of the sign-on screen. It provides user information on the use of the screen and will display errors with error message description of the problem as it relates to the AGORA software. The user clicks the Validate tab 4003 activating the Project List (master screen), as described in connection with FIG. 11. If sign on is not valid an error message appears in the error message sub panel 4004 and the user must reenter their Role and/or password. As described previously, FIG. 11 is the Project Screen for "L" stack, the default screen first screen after sign on. It should be noted that a user can right click on GDI tab and Project Screen is configured as "T" stack version of the Composite Cells (see FIG. 14.) Embodiments of the software are designed with access options for the users through the Applications 1101 library access or through the "L" stack Library 1102 or "T" stack 1401 Library formats. The Control Line 1110 holds the mode of the screen format display and the Search engine access 1107 and Exit tabs 1109. The APP tab 1101 displays all the authorized Application Lists a user can access. The Graphical Data Interface (GDI) tab 1103 has three functions currently. The default display on initiation is the "L" stack 1102 and 1112 Library level display. The right click on the tab will shift the "L" Stack/Library Cell display to a "T" Stack/Library Cell display. Right click again returns the screen to a "L" stack configuration. The third function is a left click on the GDI 1103 tab that closes all but the application tab located on the left side of the screen. A second left click on the GDI tab will return to the "T" Library display. The number of Libraries and Composite Object Cells that can be displayed is unlimited. If the number of libraries to display exceeds the monitor screen display area, the user can scroll with horizontal and vertical 1111 scroll bars that appear automatically to reach the Library or Composite Object.

The Role Tab 1104 displays the user names and roles, as defined by the Principal Administrator, define what access levels and edit authority of the user. The Summary Tab 1105 contains the total number of libraries, sub-libraries, Composites and nest objects (Include object) found in the system as described in connection with FIG. 38. It uses referenced to the key internal tracking information processes of the total content and type of the Project (enterprise) level content. It is not subject to options by the users, IT staff, or the Principal Administrator.

The Search function has two modes. The general search from the terms in the Application Process box 1106; and the exact match option checkbox 1108. The search is conducted at the name level of the objects in the library metadata. The search does not search within the objects. The execution of the Search command will via the GO tab 1107 display or highlight in color those data integration application cells meeting the search criteria. See FIG. 36 for an example of a search result 3602. The search function executes the same processes for the "T" Stack configuration. The final command is the Exit tab 1109. Clicking on this tab causes the user to exit the AGORA software.

Figure 41:
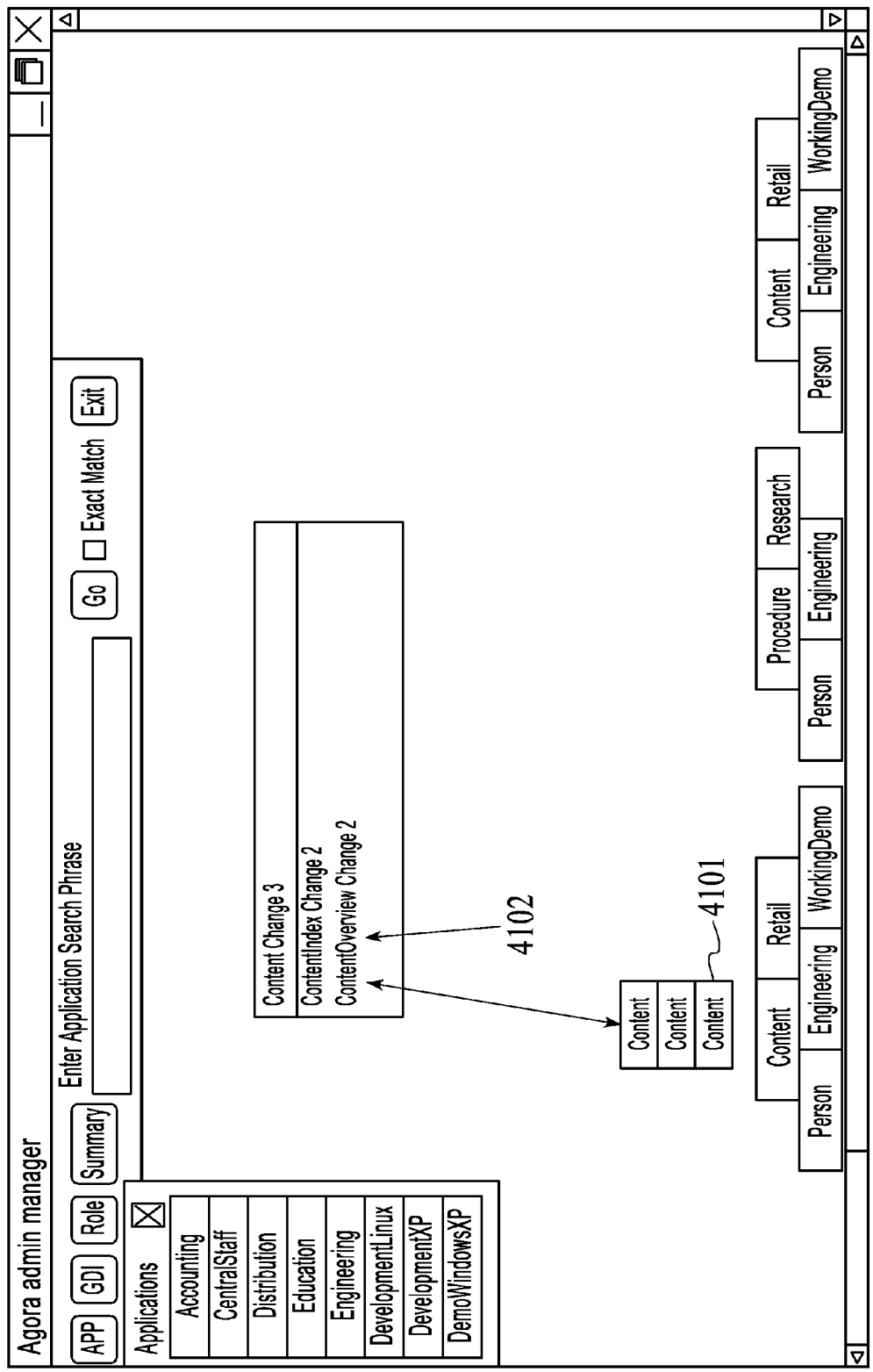
FIG. 41 is a drawing example for a display of full Data Integration Application title for all Composite objects published or unpublished in the Content Library.

FIG. 41 is an admin manager screen according to aspects of the invention. As shown, it displays the Composite objects (DIA) by left clicking once on the Library Content Cell 4101, opening the library to show all the Cells within this library. The naming convention for all Libraries, Nested Objects, and Composite Objects (DIA) Cells are defined by the customer to match their processes for data management using the AGORA software. Through out the design and functionality of the software there are minimum definitions to provide the user with the initial reference point to begin their work. They are not intended to provide a default set of naming conventions. In FIG. 41 each library was defined via the Principal Administrator to meet the user group's definitions of data integration application functionality. Again an aspect of the invention is to position data integration functionality principles at the Subject Matter Expert user compute skills to enable them applying their subject matter expertise versus the current tech centric processes used by the major software vendors.

The Library and Composite Object Cells can (zoom-in FIG. 18 for additional naming detail or future invention defined information in FIG. 22.) assist the user in finding the Composite (DIA) Cells 4101 to be accessed. The second current option to display additional information of the Composite cells is the user right clicks on the Content Library Cell on the "L" Stack to display the Composite Objects full Cell names and status 4102, i.e. Content Change 3 means this is the third version of Content Change and the prior two versions have been Published (compiled). The Composite (application) names do have an AGORA convention structure of user chosen name, status (change or published), and version level 1204. The interface supports from several to tens of thousands of data integration applications across an enterprise, a supply chain, for compliance-audit integration programs, or several divisions of a company. The macro level supervision process enables these large scale application processes to control the complexity and chaos found in other data integration software solutions.

To summarize the Sign On process: From the Project Master Screen FIG. 11, FIG. 13 a user accesses through the Applications list level, through to the Library Level to a Composite Object (DIA) in one of two states: Change (unpublished) or Published status. The status is located on the Composite Cell 1203 along with version level 1204 of the Composite Object. FIG. 12. In future, the elements, fields of the data cell can be further and independently developed The user can from the cell left clicks on the cell and the tabs for Evaluate, Edit, and Manage Mode 1205 appear for the user to work with the designated Composite Object. The software invention permits only one Composite Object to be in active state of Evaluate, Edit or Manage Mode per user. Multiple users can individually access different Composite Object cells.

In embodiments, the Evaluation Error Box is active on every screen of the software. If a message appears there, a list of error messages is found in the software documentation. A brief explanation appears in the Error Box. It is possible an application or accessed data source has a problem incurring second order impacts to the remainder of the application/data chain processes in the computing environment not caused by the software. Therefore, the software error messages provided only reflects what occurs within the AGORA software. Additional command and display options will be outlined in the discussion below.

FIG. 17 is an example of the full display of multiple libraries data integration application cells in the "L" graphical display mode. This full display of all application cells 1704 is accomplished by clicking in the upper left corner of the black background under the command control line. This will automatically generate the display of every Composite Object (DIA) Cells within the user's access authority. The Principal Administrator level will display every application cell in the Project Master Screen level.

FIG. 15 shows the "T" version of the display of all Composite Objects (DIA) of the Central Staff 1501 and Accounting 1502 cells. The cells are stacked vertically above and below the center line of the screen where the library cell level is located FIG. 13. The scroll bars 1503 are active if the number of cells exceeds the vertical and/or the horizontal space of the monitor screen. Libraries are displayed in Alphanumeric order automatically.

Figure 42:
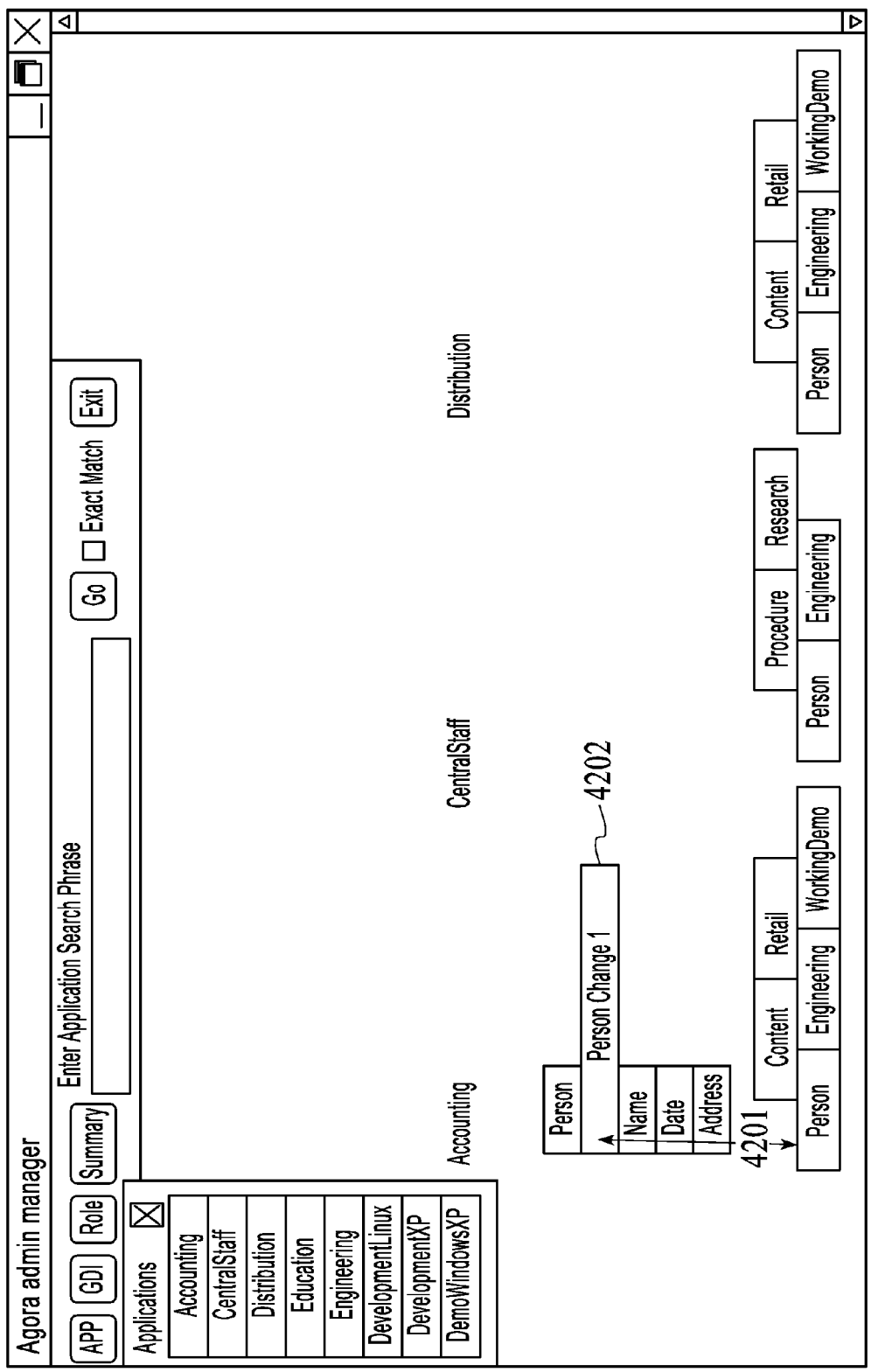
FIG. 42 is an example drawing of a Composite Object (Data Integration Application) selection for additional steps by the user but prior to initiating edit, browse, or manage mode operations

FIG. 42 illustrates how the GUI allows accessing certain functionality according to aspects of the invention. As shown, when the user clicks on a data integration application cell—Person Change 1 expanding the cell to the Composite Object tab 4201. The cell's expansion provides the full naming of that cell and positions the Composite on the graphical screen for easy access 4202 to the next level of processing options (Evaluate, Edit, and Manage Mode Processes) for the Composite Cell. It should be noted that the Library Tab in the upper left corner of the screen can be closed by clicking on the "X" in order to expand the screen workspace for the user.

Figure 43:
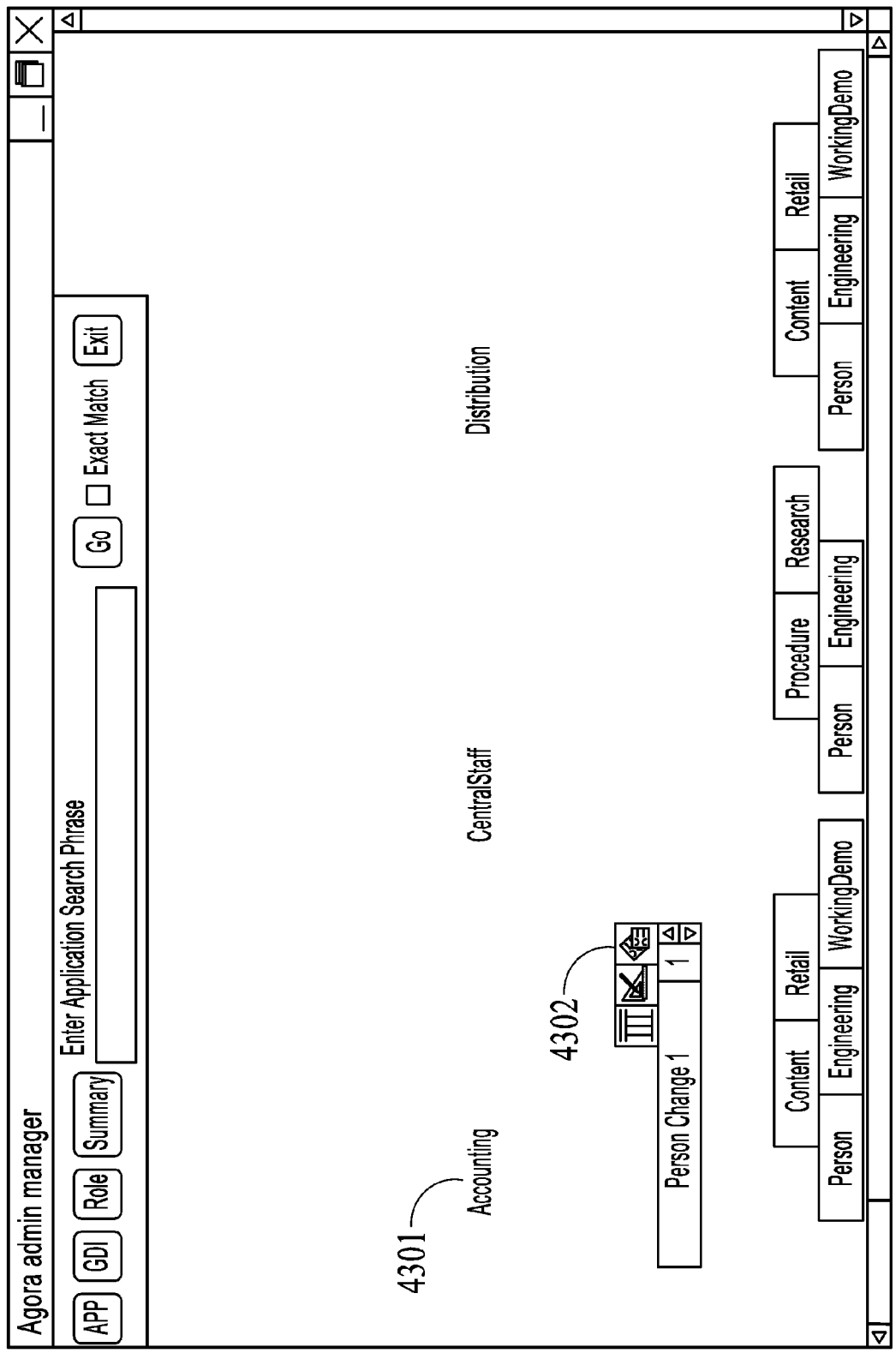
FIG. 43 is an example drawing of the embodiment of the expansion of a Composite Object cell to three options of Browse, Edit, and Manage Mode tabs.

As shown in FIG. 43, if a user clicks on the Person Change 1 and the cell expands 4301 displaying 3 tabs (Evaluate, Edit, Manage) and the Version Level of the Composite (Data Integration Application) 4302. The Composite cell is unpublished because it does not have "Publish" word as part of the cell title. When an unpublished (uncompiled) Composite cell is viewed it will have the naming convention designated by the company standards 4301 with the term "Change X" as the designation of being unpublished (uncompiled—see FIG. 21.) This provides a fast and reliable tracking process for the Subject Matter Expert Users in determining viewing the cell the status of the application. This part of the software design is to simplify the processes used in data integration software but still provide full ETL, data quality functionality by placing the complexity and chaos of managing data inside the AGORA software objects.

The expanded data cell shows the version level of the Data Integration Application 4302. The Person Change 1 is at Version 1; there are no prior versions of this named Composite Object. This is a component of the AGORA software data version control process being displayed. Once a Composite Object is Published, the invention's version control design manages the follow on Composites created or up versioned from this first instance.

Figure 44:
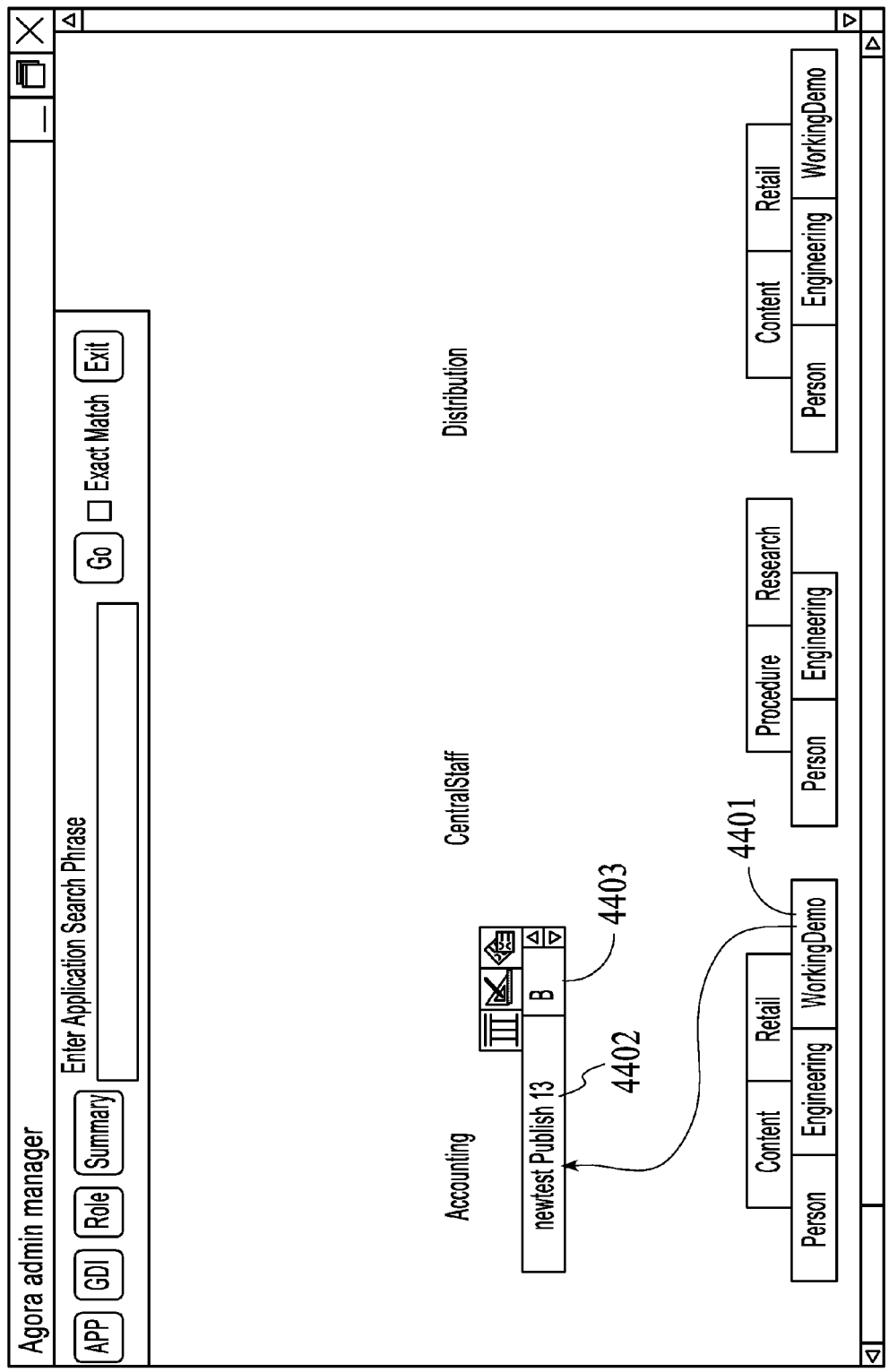
FIG. 44 is a drawing example of the embodiment of the 3rd dimension design and invention aspects of the Level 4.2 Interface when viewing earlier compiled Composite Object versions.
Figure 59:
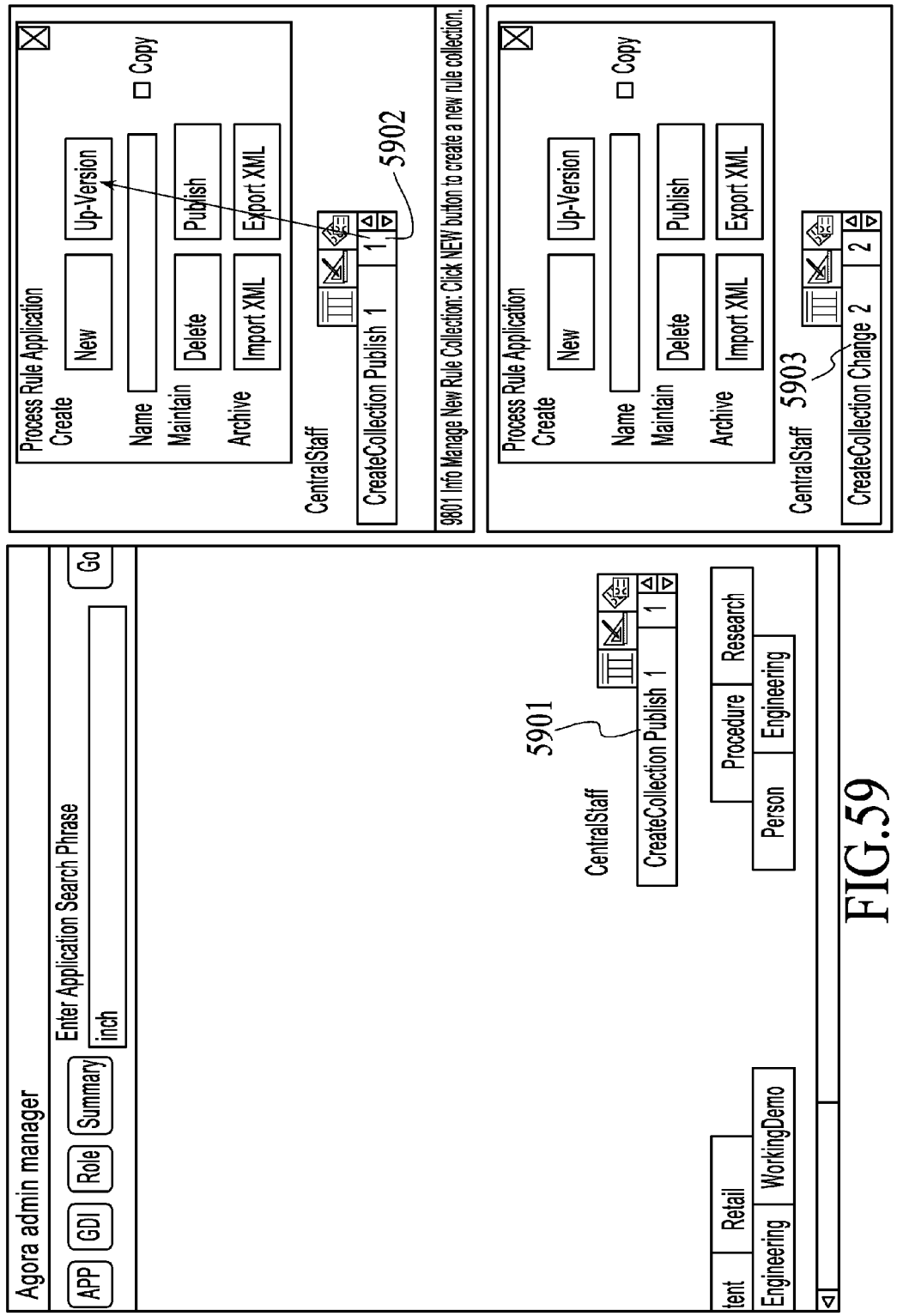
FIG. 59 is an example drawing of an Up-Version Composite object being generated post publishing a prior Composite object.

FIG. 44 shows the design of a Published Component Object (Data Integration Application) named Newtest Publish 13 cell, 4402 version 13 4401. This indicates the cell has twelve prior and one current published (13 versions in all) version 4403. Because the DIA has Published in the Cell title, this means there is no current unpublished DIA for this Composite. A Version Level 14 as a Change status Composite can be activated through the Manager Mode Screen's Up Version tab (see FIG. 59. below and corresponding descriptions, for example). The invention provides through Composites (DIA) the direct means for Subject Matter Expert users to work with large and complex data sources with a clear set of processes and commands generated and managed by the AGORA software invention and design.

The version control process is designed to provide the IT group the ability to track all uses of data sources by user and by applications the data has been applied. The up and down clicker to the right 4403 of the version number provides the ability for the user to go back through each prior version of that specific Composite Object (DIA) chain; permitting the user or IT supervision to review each Rule, Schema, Object and Analysis.object in its original as compiled detail.

Figure 45:
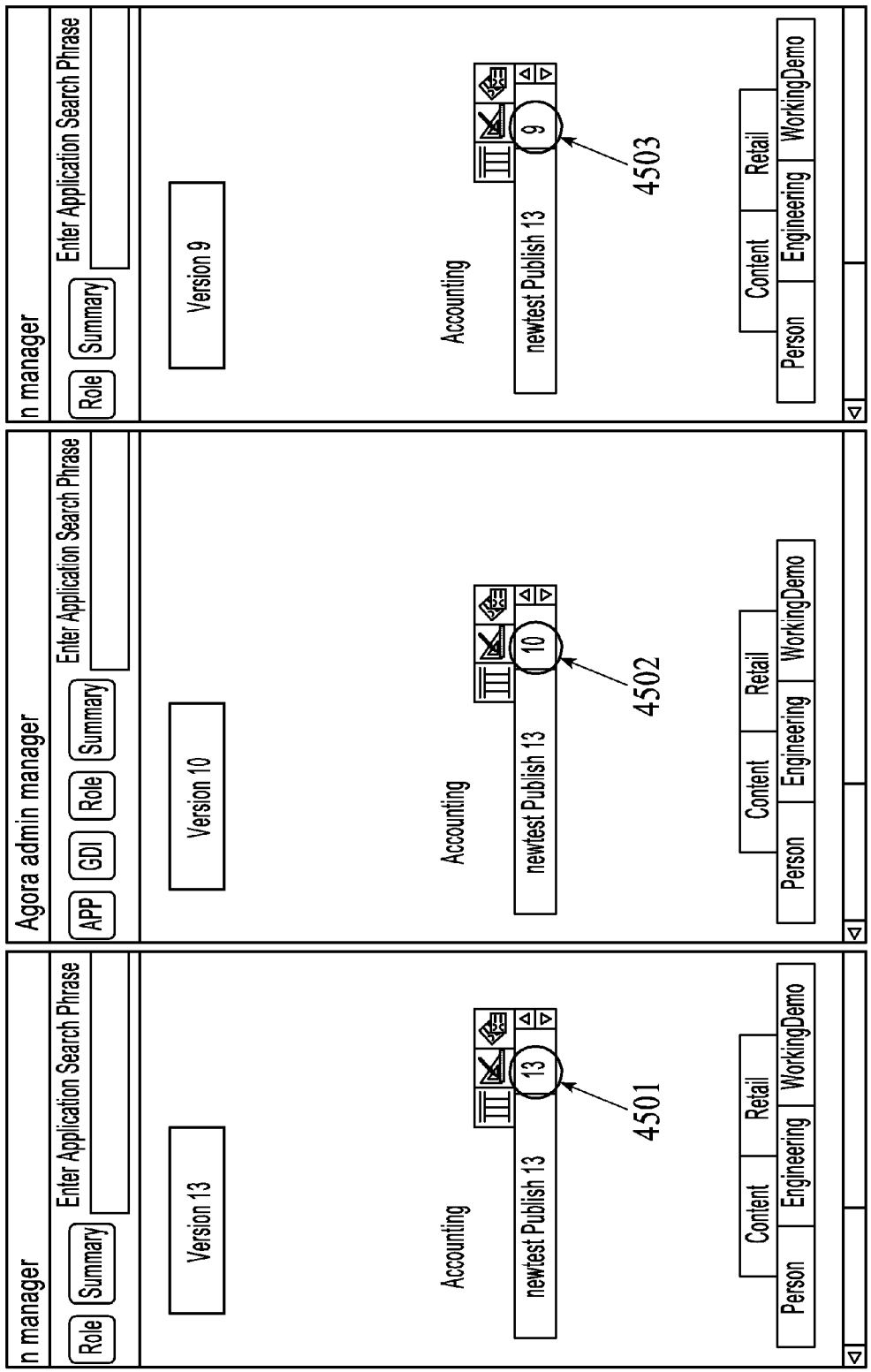
FIG. 45 is a drawing example of three Composite Objects versions being retrieved by version level on the Level 4.2 Multi-Tier interface.

The Newtest example cell has 13 published versions including the current version being accessed. As shown in FIG. 45, by clicking on the down tab the user goes from Version 13—4501 to Version 10—4502 and then to Version 9—4503. Embodiments of the present invention provide software that also supports the compliance-data integration data tracking processes because the auditors are able to trace all actions regarding data sources involved in the process. The Version Level function is automatically updated and managed by the AGORA software invention. The user cannot modify Version content other than creating or deleting the Composite versions (DIA).

Returning to FIG. 43, the expansion of the Composite cell 4301 displays three tabs—Evaluate, Edit, and Manage modes along with the version level of the Composite. A second purpose to the version tab that has higher and lower version click capability so the user may review earlier versions of published (Component Objects) Composites. User when viewing earlier versions of the application can review the Schema, Rule and Object components that have been compiled. A copy of the compiled Composite can be used under another Cell name designation. This is done to provide version tracking and control for IT, audit, and compliance purposes. The Cell display structure is an integrated design of the Multi-Tier Interface and the AGORA software invention. The software tracks every version of a published and unpublished Composite Cell across the enterprise. It can be positioned to track all Composites (DIA) with security authorization across a global supply chain or be the audit master application used to conduct internal and external audit or compliance criterion by a national accounting firm in their clients' audits and internal testing procedures.

As shown in FIG. 47, if the user clicks on the first tab, the Evaluate Mode Tab 4701 for Person Change 1 and the Evaluation or browse mode of the Composite Object (DIA), unpublished is displayed. Whether a Composite object is published or unpublished the Rule (Language) Object 4704 element of Composite Object the Schema (Variable) Object 4705 and the Connector Object 4706 (data connection or channel) is displayed. There is no edit capability in the Evaluate Mode. The Evaluate screen display is closed by clicking on any of the three red X's inside the sub screen space. This mode enables Subject Matter Expert Users who do not have edit or create permission to review Composite Objects (DIA's) to determine their applicability in the business applications they are using or developing for direct access data sources.

The screen shown in FIG. 47 has two additional mode tabs. The middle tab 4702 is the Edit Mode and the far right tab 4703 is the Manage mode for Create, Publish, Delete, Copy, UP Version, and Import/Export functions. The AGORA software design supports the Multi-Tier interfaces whether at Level 4.2 or Level 2.3 options. The Version control and tracking, the various modes, composites, objects, etc are contained within the software design. The processes are repeatable and predictable sequences enabling the Subject Matter Expert users to have a rapid learning curve without getting impacted by the traditional $4^{th}$ GL language data software design complexity.

The lack of icons, pop up screens, workflow processes and IE folders allows the screen design to contain the software and data source functions (on a single screen—see FIG. 46) the users need to direct access data sources, transform, allocate, copy or use in support of web based transactions. Embodiments of the present invention are designed to support the extensive and flexible function options for direct data source access to support direct structured data access use and business applications within the operating processes of the company. It positions additions to the software design in future.

Any option you intend to exercise within the application begins at this screen FIG. 46 with the Library Master Tab and the "L" Stack or "T" Stack Libraries as the point of entry. The user can select the path described in FIG. 46 drawing by proceeding through a "L" Level Library display above; or they can access the Composites through a second option (see FIG. 20 for example) by the user clicking on the Project path Master Library Tab located in the left top corner of the 4.2 Level Screen. 2001. This is a second screen path option to reach the Evaluation, Edit, and Manage Mode tab 4707 for a user through the Project or Application Lists 2001. In this example the user selects a Application List Library by clicking on 2001 DemoWindowXP. The action causes the DemoWindows XP Library Level to Display as a tab 2002. The user process then clicks on a Library to display the all the Composites authorized for the user to display 2003. The last step is to click on a specific Composite, in this example Person Change 1 2004 to activate the three modes of operation—Evaluation, Edit, and Manage (see FIG. 39. and corresponding descriptions for example). The content following will use the Level 4.2 Interface to present the AGORA software and design aspects.

The sequence of screens from this point until the first Composite is opened is outlined in the following content. Additional function options will be displayed in the panels across the screen. These additional panels, libraries, and cells are activated based on the actions and the user's level of authorized access. If a specific action is not available for the user's level of access when activation is attempted, an error message will appear in the Evaluation Error Box (yellow panel). Panel also serves as information panel with details regarding the software function for the screen currently displayed. The security level and job requirements are the basis for the level functionality granted you.

It should be noted that FIG. 47 is an example of a screen management processes for leveraging the valuable monitor real estate. The design has management options to maximize the screen being available for the Composite processes. Removing the Applications List tab, for example, can be closed by clicking on the "X" tab located at the top of the Library stack in the upper left hand corner of FIG. 11 Level 4.2 screen 1112. Furthermore, only one application per user is open and one function set cell within the application is open for processing or review by a user. This is to minimize the unnecessary complexity for the Subject Matter Expert user and to maintain a quality process when working with the sensitive company asset of structured data while providing IT a supervisory and control of data access role. The control and supervision of AGORA's direct structured data access design provides IT with information, activities and limits to what a Subject Matter Expert user can do. This supervision level challenge is compounded when the users are several hundred in a global organization versus the traditional data integration software where the user population is less than 25 people. The scale of the ROI, the number of potential users being in the hundreds to thousands requires options be available to IT for extended data management.

Returning to FIG. 46, the master mode in preferred embodiments (i.e. Level 4.2) has three modes. First, a browse capacity (Evaluation Mode) for reviewing 4609 published and unpublished Composites (DIA) for Rule, Schema, and Object objects. Second, an edit of existing unpublished 4601 (not yet compiled) Composites. Third, a Process Panel 4609 for New/Create 4606, Copy 4608, Publish 4603, Up Version of a published Composite 4607, Delete 4602 and transfer a Composites via XML Import AGORA 4605 or Export 4604.

The Composite layers of Language (Rule), Variable (Schema), and Connector (Object) are found in the Edit mode as Rule (Language), Schema (Variable) Object (Connector), and Analysis screens. These are part of the six core screens (Schema, Rule, Object, Analysis, Search, Manage) forming the access and modification of a Data Integration Application being designed and used by a Subject Matter Expert User. The functional code complexity of embodiments of the invention is behind the Multi-Tier Interface Level 2.3 and Level 4.2 designs. The small number of screen formats is supported by extensive, consistent processes, Command and spread sheet functionality.

Simplicity drives the access and formulation of the applications. The design is structured for future enhancement that will occur primarily inside the software design and the Multi-Tier Interface design according to embodiments of the invention. The users will see small external changes; all done to reduce the complexity and chaos with the applied use of structured data sources directly by a large group of moderately skilled computer users.

In the Evaluate mode, for example as shown in FIG. 47, the display of Person Change 1's from the Person library. Evaluate mode (Browse mode) 4701 that can be seen include the Rule (Language) 4704, Schema (Variable) 4705, and Object process (Connector) to data source and target connection 4706 with a scroll function to display the entire Composite Object (DIA). The user cannot edit, copy or publish (compile) in this mode. In this operation the Composite Objects (Rule objects) can be viewed by users who are not authorized to work in Manage mode for this Library or subject area but might be using the Published (compiled) Composite Objects (DIA) from issuing CALL statements from their business application programs. Also programmers who are using the Composite (DIA) via a CALL statement can analyze field segments, name, type, and lengths to account for what they will use to support the data function being executed prior to reaching the application processing. The user can also determine if running the application as a stand alone web based or batch production run is appropriate. This decision is in the hands of IT and application management. The Composite is a compiled, self contained application in its own element that supports a business application's specific structured data requirements or the AGORA compiled data integration application can run as an independent/stand alone program. The Evaluate screens are closed by clicking on any of the Red X's located in the upper right part of each screen 4708 Rule, Schema, or Object screen.

The Evaluate (Browse) mode is intended to extend the functional capacity of the AGORA software within the security and programming processes in place at the company. This is an example of where the AGORA invention will utilize the existing processes and compute/storage environment in order to minimize the IT footprint impact to management, Subject Matter Expert user, and IT resources. Many users that are not authorized for Edit processing can leverage the open horizontal data platform Composites (DIA) with minimal IT supervision.

The Edit Mode Panels shown in FIG. 48 permit the edit 4801 of an unpublished, (uncompiled) Composite Object (DIA). There are four screen objects—processes: Schema—Variable 4804, Rule—Language 4805, Object—Connector 4803, and Analysis—Test the data application 4802. Once a Composite is published, the user can reuse the content of that Composite as a new version by creating an Up Version (Version X+1) in order to add or edit the content for new requirements. The user can access one or all of the screens for Edit Mode (Rule, Schema, Object, Analysis) changes to the processes or connections to structured data sources for the New Up version of a Composite (DIA).

The Edit tab 4801 utilizes the Level 2.3 Multi-Tier interface design aspect with Level 4.2 interface base design for the Edit mode processes. At this level the user can modify an existing Rule (Language), Schema (Variable), and Object (Connector) content that is unpublished. A published version for an edited Person Change 1 4802 through 4805 requires accessing the Manage Mode Screen shown in FIG. 39. Post the publish action the user can create a new Version level through invoking the Up Version 3903 Panel to Create Person Change 2 which then is available to being edited. Edits are based on the user's authorized access assigned by the Principal Administrator.

FIG. 25 is an Example of the Schema Screen in the Edit Mode. The screens for the AGORA software invention and design have a significant number of common screen elements and screen tab placement of the functionality that may have different roles depending on the Edit role screen being used. The Schema screen FIG. 25 example for Person Change 1 is organized and displays the commands, programming and details via a logical, easy to follow content structure processes to manage and exit the Schema process.

It should be noted that there are examples of six screen types through out the Drawings. FIG. 25 points out the key elements of the Schema design and includes: Information Bar 2501: located at the top of the screen showing the Composite Name (Person Change 1), the Application List, Library (Accounting) and the status of user (Admin manager role). The Operation Command 2502 of Maintain Schema: indicates which of the four edit screens the user is in (Schema). The Function Screen Panel 2506: area which commands and spread sheet function is coded into the Schema Object in Schema List Panel 2507. The Command Program Line (Maintain Schema) 2503: Contains the base commands developed through a series of variables and fields that automatically produce pull down tabs with options for the user to insert. Each command has its own fields and they vary between the commands. The Process Rule Line 2504: Has the commands to execute the program command to insert, undo, save and if appropriate conduct the compile process from this screen. It is faster than using the traditional spread sheet download of data or programming. It includes the functions:

The Edit Schema Tab 2504 shown in FIG. 25 initiates the EDIT process, which includes the following functions.

Insert Schema Object—adds the Maintain schema command line generated into the position of the Schema before or after the target line in the Schema List Panel. The content in this panel describing source or target data segment definitions and types or field 2509

Undo Selection/Undo All—Reverse out an individual program Schema line or an entire group 2511 entered in the current edit session SAVE Places the changes into the AGORA library until Published as uncompiled code 2512

Build Physical Object Schema the opening a modifying of the physical attributes of the data. Use is for IT skilled users 2513

The Error Message 2505 panel at the bottom of the screen will display error messages and prevent the command driven program line from being inserted into the rule list panel. This improves the ease of use for non-IT users.

FIGS. 49 to 53 are a series of screenshots that illustrate an example of processes using the screen's sequence and process options from the AGORA software invention and design used to edit. The Level 2.3 screen imbedded in the Level 4.2 structure provides the same format as seen in the Rule screen FIG. 25 The programming panel is called the Schema List FIG. 49. It shows the Schema structured data for source and target locations. This in conjunction with the Object Screen provides the access to the data sources. The Schema screen FIG. 24 enables the user to enter the current Schema of the source and target data sources or use the existing target and source. The Schema provides the structured data sources relationships in connecting data sources on a one to one basis, a one to many, many to one, and many to many formats within the structured data sources via a command structure line 4902. This includes picking a select number of the data fields versus the entire source data locations and merging the disparate data sources into a single target data file. The Physical Schema Panel 2513 is intended for very technical analysis and normally is used by IT resources rather than Subject Matter Expert users. The Maintain Schema 4902 program line outlines the source and target data maps for Person Change 1. When the cursor is placed over a Schema list 2506 the Schema command and Variable tabs process are occupied by the highlighted line 4902 and at the point of the cursor. The Schema Object is one of the elements forming a Composite (Data Integration Application).

Figure 49:
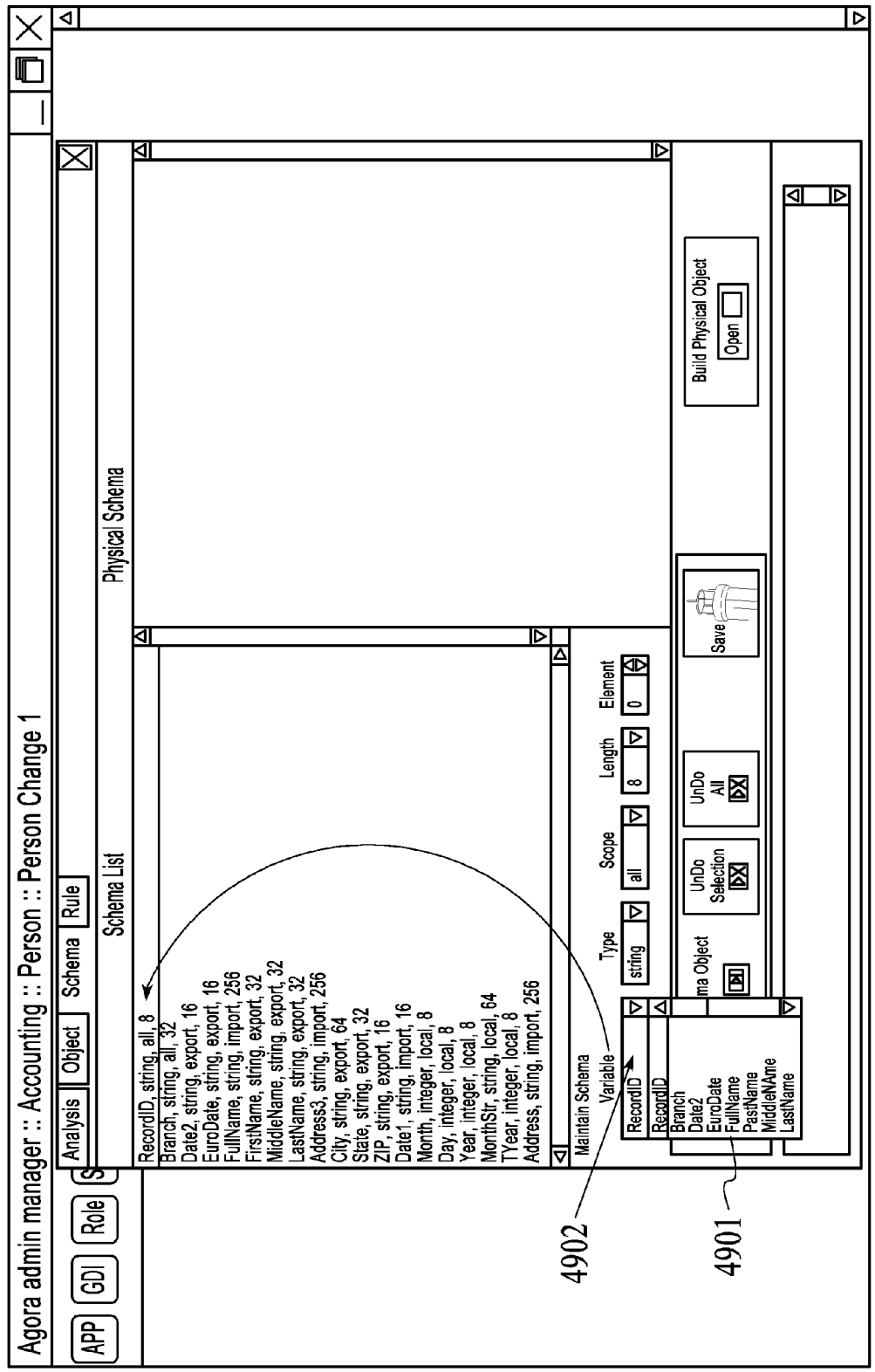
FIG. 49 is an example drawing of the Schema screen and the command line first variable display and options

FIG. 49 is the first pull down tab of this Schema data definition or command example. The user selects an existing or new variable name/field for edit, delete or to add a new variable to the list. The list of this tab is as extensive 4901 as required by the user. The extent of Schema List commands can go beyond one screen using the scroll bar design of the Multi-Tier interface. The level of complexity and scope is user dependent. Similar to the way spread sheet software permits simple to complex financial programs. Its size is determined by the number of variables in the source and target Schema Lists invoked by the user or the user group. The example is an edit of the Person Change 1 Schema Object. The insert tabs below the Schema will position the new source and/or target definitions or eliminate them per the user's requirements above or below the line with the cursor highlighted in color. Each tab is pulled down format 4901 and 5001. The screen design does not have expert entry process. The goal with the high risks of poor data quality plus the widely user skill set variance calls for designs that prevents as many technical and technical data issues as possible with data integration be employing a clear disciplined command build process. It should be noted that the Variable tab consists of the segment names from source or target data locations. These variable names are the only qualified Variables for the Rule Screen to use for its command line processes. Again the software design is also to maintain data quality and consistency while preventing the Subject Matter User Experts from getting caught up in the data environment's complex and chaotic, disparate standards.

Figure 50:
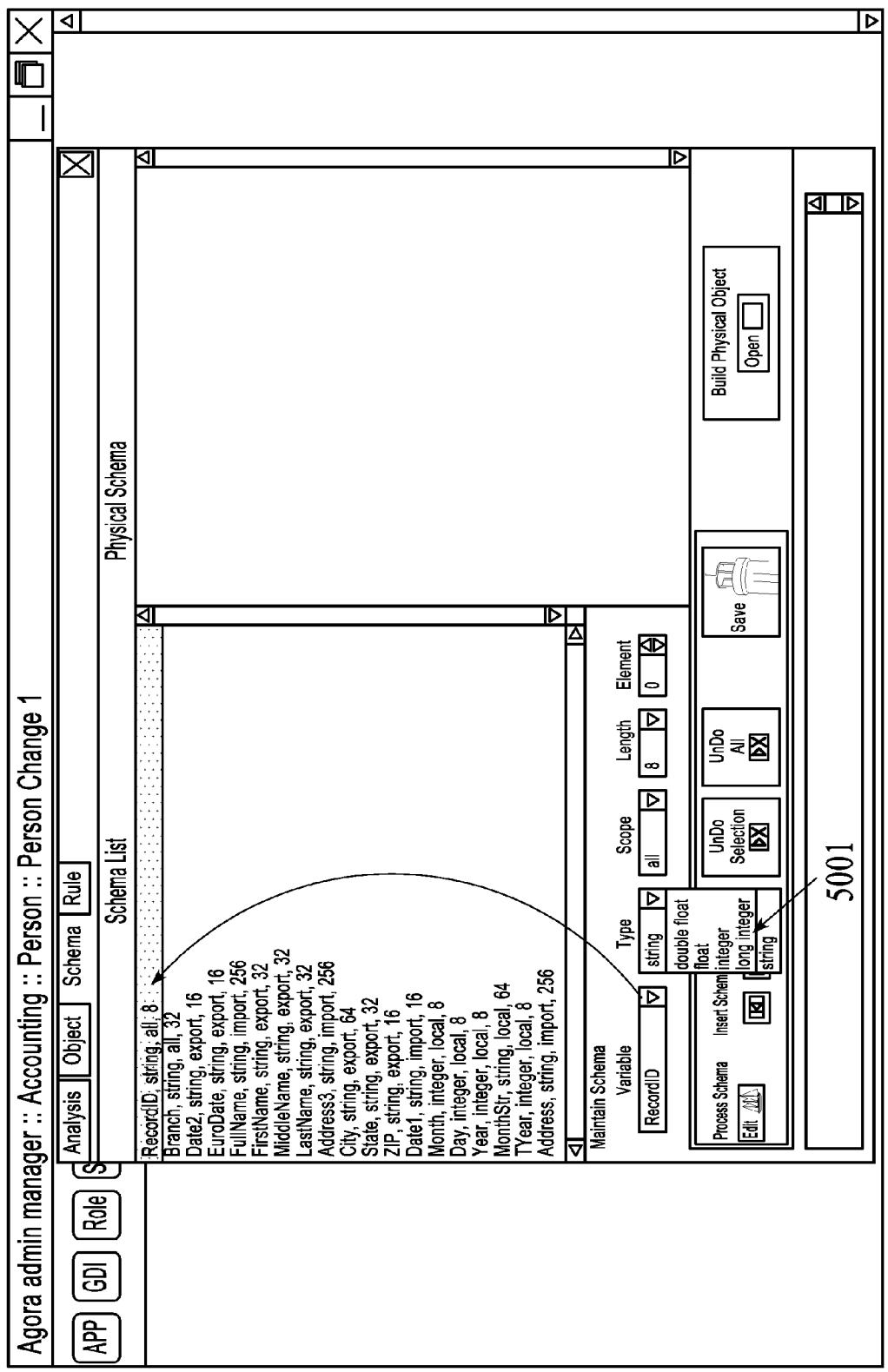
FIG. 50 is an example drawing of the Schema screen and the command line second variable display and options

FIG. 50 is the next pull down field tab of Type for the type of structured data the variable is described to be doing. In the example Type 5001 of data is the option (such as string, float, double float, and integer). This field has a number of data format options on the pull down tab. The AGORA design and invention easily permits additional data types to be added in the future.

The user selects one of the options for type of data. In many cases there is existing documentation via the company's Data Base Administrators (DBA's), systems analysts regarding the data layout and profile within the organization or the support IT group. Such data source and target information can be utilized in building the Schema List Panel 2506 program. The existing data definitions or data modeling documentation and software information will speed up the Schema definition process. It also reduces errors in setting up the Schema (Variable) and doing it in less time and with higher quality than a traditional technique of a spread sheet load of the requirements. The invention uses as much standard structured data content organization versus designing a complex load process. The design philosophy is a design point in the software processes for Subject Matter Expert User skills and computing knowledge.

Figure 51:
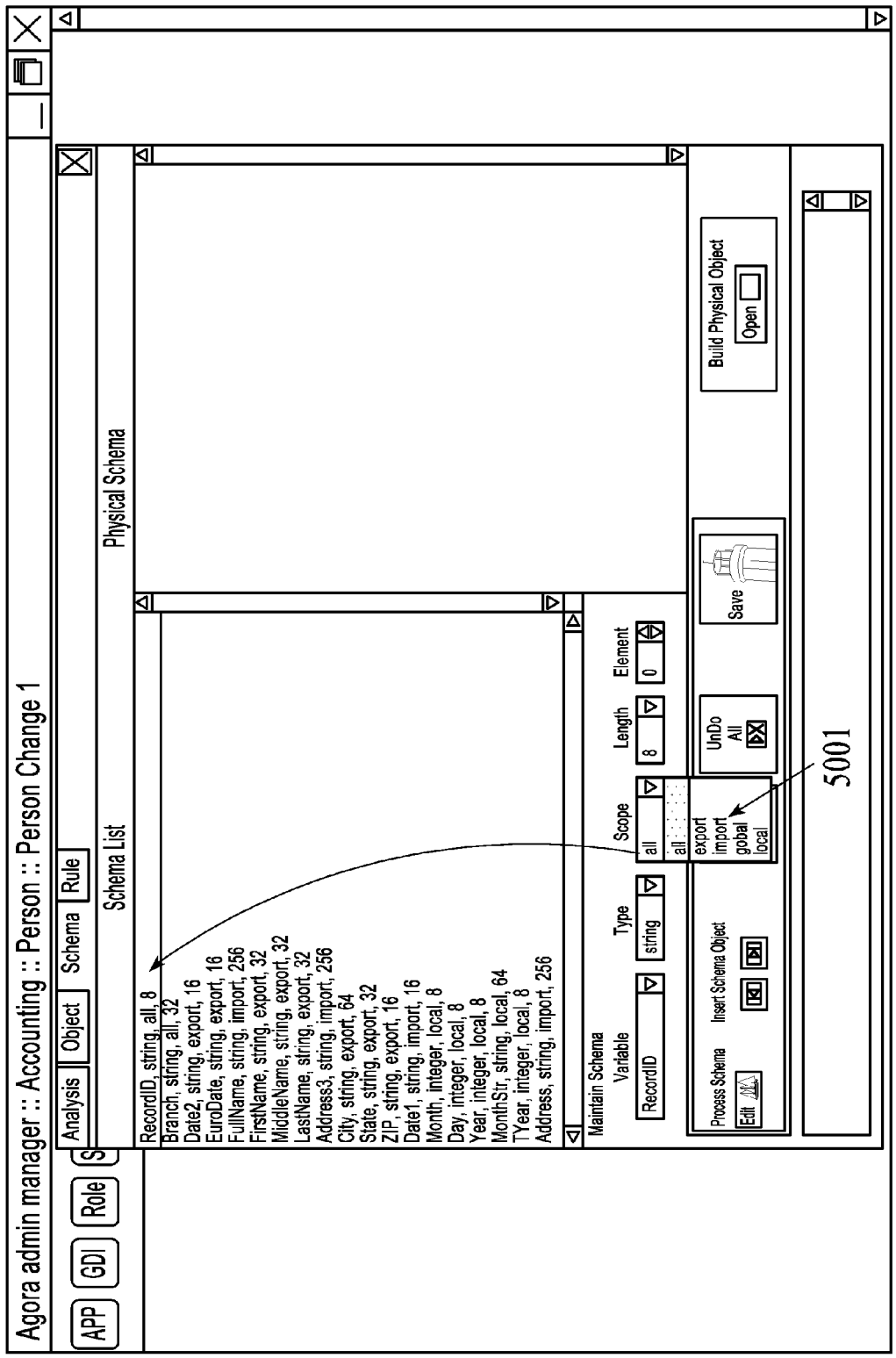
FIG. 51 is an example drawing of the Schema screen and the command line third variable display and the current available options

FIG. 51 the pattern of the first two tab fields continues as AGORA's internal design point for consistency in how the software and the Multi-Tier Interface use the same design discipline through out the commands, options and programming for each of the screens. 5001 is the third pull down tab. The Scope tab 5001 defines a list of options not subject to amendment or addition by a user to the AGORA software design. The Scope field can be expanded as requirements dictate via the AGORA software invention development process. Again Scope tab has a listing of standard data parameters to simplify the processes. The Scope field defines whether the data is being imported to a target data structure and/or exported from a source. Additional command options are all meaning the variable is both a source and target Schema. Local meaning it is a variable created only for the purposes of this Composite (data integration application. Each term is defined in software user documentation without icons, pop-up screens or workflows being required. NOTE: No additional special programming such as script programming is required.

Figure 52:
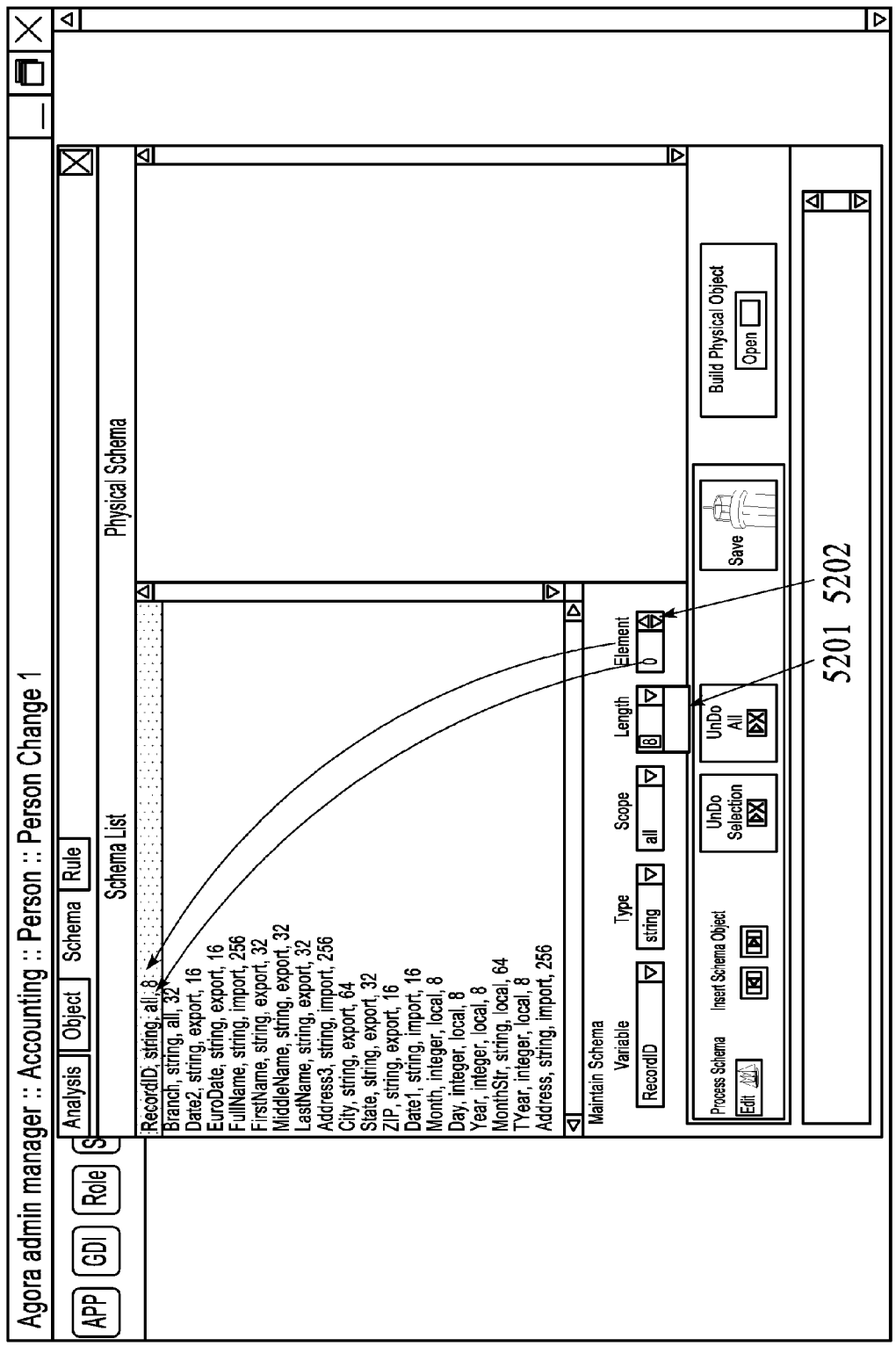
FIG. 52 is an example drawing of the Schema screen and the command line fourth and fifth variable displays and options

FIG. 52 is the fourth Length tab and fifth Element field that have the length of the data segment defined 5201 and the fifth segment 5202, the Element field. By entering commands this continues the design process to reduce the error rate for creating the Rule, Schema and Object components of the Composite Object (DIA). The AGORA software design leverages programming without requiring the Subject Matter Expert users developing technical programming skills any more than a user building PC based spread programs requires beyond a minimal level of introduction training.

Figure 53:
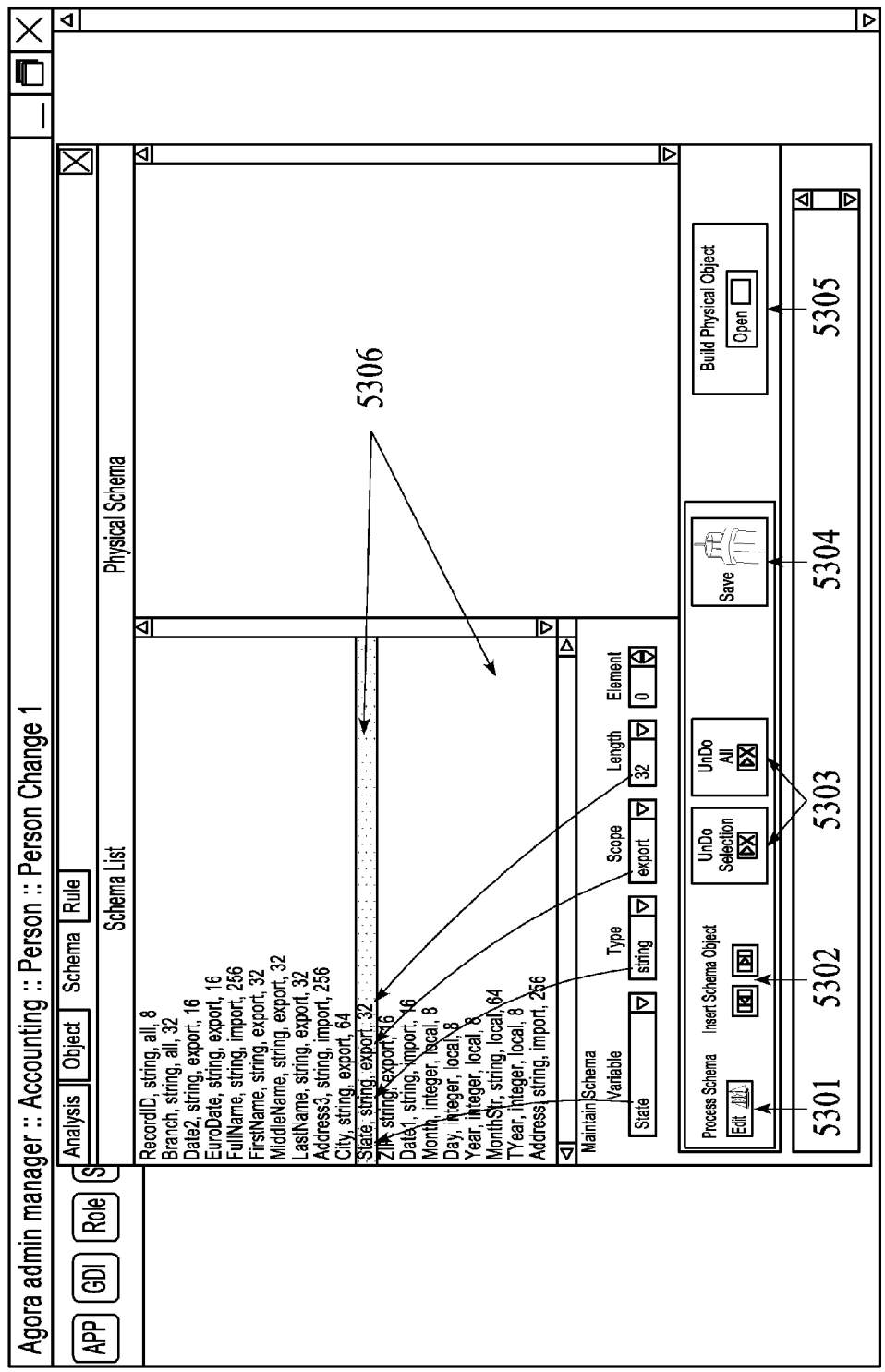
FIG. 53 is an example drawing of the embodiment of the Schema screen command implementation by a user and the Process Schema command line

FIG. 53 shows that a Schema line has been created and the user next determines where the new command line is to be inserted or be a modification of an existing programmed command or be reversed out. The user selects from Process Command line the disposition of the command:

Edit: Utilized when changing an existing program line in the Schema 5301

Insert Schema: Once the elements have been created, edited or changed, click on Insert Schema tab to place the changes or new rule information into the Schema Object on the Schema Screen. 5302

UnDo Selection: Reverse changes made to the Composite 5303

UnDo All: Deletes the entire Composite in order to restart or start the edit function over 5303

Save Tab: To Save the Composite Edit. This is the last step prior to another edit of this Composite prior to the publishing of the Schema, Rule and Object into a complete Collection or data application 5304

Build Physical Object: is clicked to review the Physical Schema Object List content and that the parameter settings agree with the logical Schema Object list definition. This option is intended primarily for the technical expert level primarily in the data management aspects 5305. When the Schema work requires an assessment of the physical and logical data levels, this is part of the analysis process FIG. 30.

The Schema command processes are specific field format in order to provide consistent, easy to read formats between various users. The issues with current design are there are too many variations, options, and individual programming choices for the profile of the source and target structured data sources. It directly causes inconsistent data model formatting leading to complexity of design and chaos in execution; and increases the cost and time of maintenance of the data profile processes and programs over time. Therefore the present invention and design preferably has a consistent data profile and definition process that will support the core data source to target process requirements for the Schema Object. The software invention's initial version of command language has been placed in the software design in order to have core ETL functionality with repeatable, predictable data commands.

Examples of the consistency and logic of the command design using Person Change 1's Schema Object:

| Schema List | Description |
|---|---|
| Full Name, string, import, 256 | Full Name = full name of person for the data segment<br>String = type of data<br>Import = what is the data scope of the requesting source<br>256 = 256 bytes of information. Not direct correlation to number of characters |
| FirstName, string, export, 64 | FirstName = name of data segment coming from represents the first name of person<br>String = type of data<br>Export = scope of what being sent by target data source<br>64 = 64 bytes of information. Not direct correlation to number of characters |
| MiddleName, string, export, 64 | MiddleName = name of data segment coming from represents the middle name of person<br>String = type of data<br>Export = scope what is being sent by the target data source<br>64 = 64 bytes of information. Not direct correlation to number of characters |
| LastName, string, export, 64 | Last Name = name of data segment coming from represents the last name of person<br>String = type of data in a variable not fixed length format<br>Export = scope what is being sent by the target data source<br>64 = 64 bytes of information. Not direct correlation to number of characters |
| MiddleName, string, export, 64 | MiddleName = name of data segment coming from represents the middle name of person<br>String = type of data |

Examine the MiddleName, string, export, 64. The command line is a variable name from a source structured data. We know it is source because of the Export (Scope Tab) is from a source. String indicates a fixed segment size versus floating. Export tells us it is coming from a structured data location; and the 64 indicates the segment has 64 bytes (not characters) in length meaning there is more than 64 characters in the content. The simplicity of the process is meant for efficient, consistent, and effective structured data processes. These are criteria for keeping high data quality and minimizing complexity and chaos. The example command is created at a Subject Matter Expert user skill set. Is taught quickly unlike options such as script programming and personnel turnover's impact is virtually eliminated.

This is the design process; to standardize the approach to data organization processes in order to make the usage of the sources and targets more productive, less error prone with designed processes providing flexibility and programming consistency. The criterion for this design is the commands used for data integration software has a core group of commands efficiently supporting the data formats and ETL processes needed for source and target data requirements. The commands outlined in FIG. 25 drawings are designed to support IT and Subject Matter Expert users.

FIG. 48 illustrates four objects (Schema, Rule, Object, and Analysis) in the Edit mode process for embodiments of the present invention. The Rule Object's role (see FIG. 26) is to perform the application functions required between the structured data source to target objects. The current commands are described FIG. 54 in the current Rule commands. They form the basis for program based actions to modify, compute, or re-position structured data sources. Based upon the data profiled in the Schema object, the AGORA software provides the Subject Matter Expert user and IT user with both command and spread sheet programming options to transform, conduct mathematical calculations, and nest unpublished or published data integration applications in a different DIA implementation.

The design point for the Rule and Schema commands is they eliminate the icon command process, pop-up screen functions, workflow objects, and IE file folder design combined with an interface using a Microsoft form of GUI/interface to support the large software vendor's data integration solutions.

One aspect of the present invention design is to standardize through commands, the access and processing of structured data at a lesser technical skill set thereby increasing the audience and the ROI Potential. The design can generate a level of duplicate data but those issues already exist with the central control design. This is because users have historically circumvented this type of control. The extensive deployment of department level servers, compute storage, and software confirm the reason why data will continue to be duplicated.

The Multi-Tier interface Level 4.2 and Level 2.3 aspects are incorporated in the Rule screens and commands in the same design processes as the Schema. FIG. 25 has the same format for the options and commands as the Rule screen format FIG. 27. The components designs are very similar for the following elements: Header Control Line 2701; Operation command line 2702; Function Screen tile is Rule List vs. Schema List 2707; The Program Panel for Rules 2706; Process Role Line 2704; Error Message/Information Panel 2705.

There are two exceptions between the screen content. The Schema has a split program panel for the Physical build object, due to structured data's profile. The Command program lines are different commands and options 2703. The Rule commands are computing and process the data being used in the Composite Object (Data Integration Application). The Rule Command line 2703 is same AGORA software design invention criteria as the Schema command; repeatable, consistent programming. Focusing on the core ETL, data quality, and data management processes. The capability to add new commands, such as the INCLUDE command added in the last design of the software only required modification of the Command Line fields and variables by adding one word to the Multi-Tier interface. The execution of the INCLUDE command—the capacity to take other data integration applications and place them as objects inside of another Rule program. It is a complex design but it is contained into the software invention and design.

Figure 54:
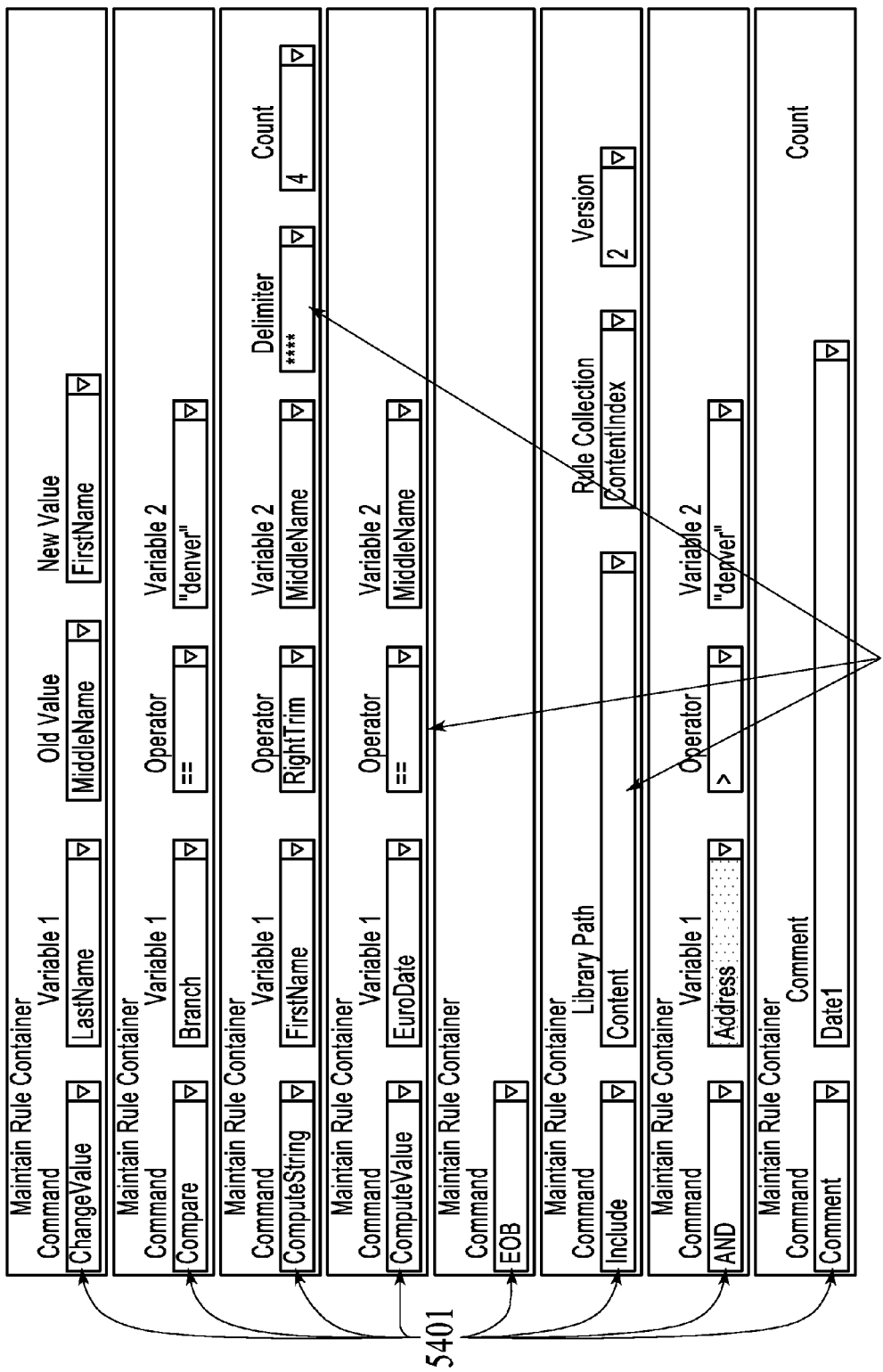
FIG. 54 is an example of the to date available commands for Rule Screen (Language Object) and their fields options for user in the Rule command processes
Figure 56:
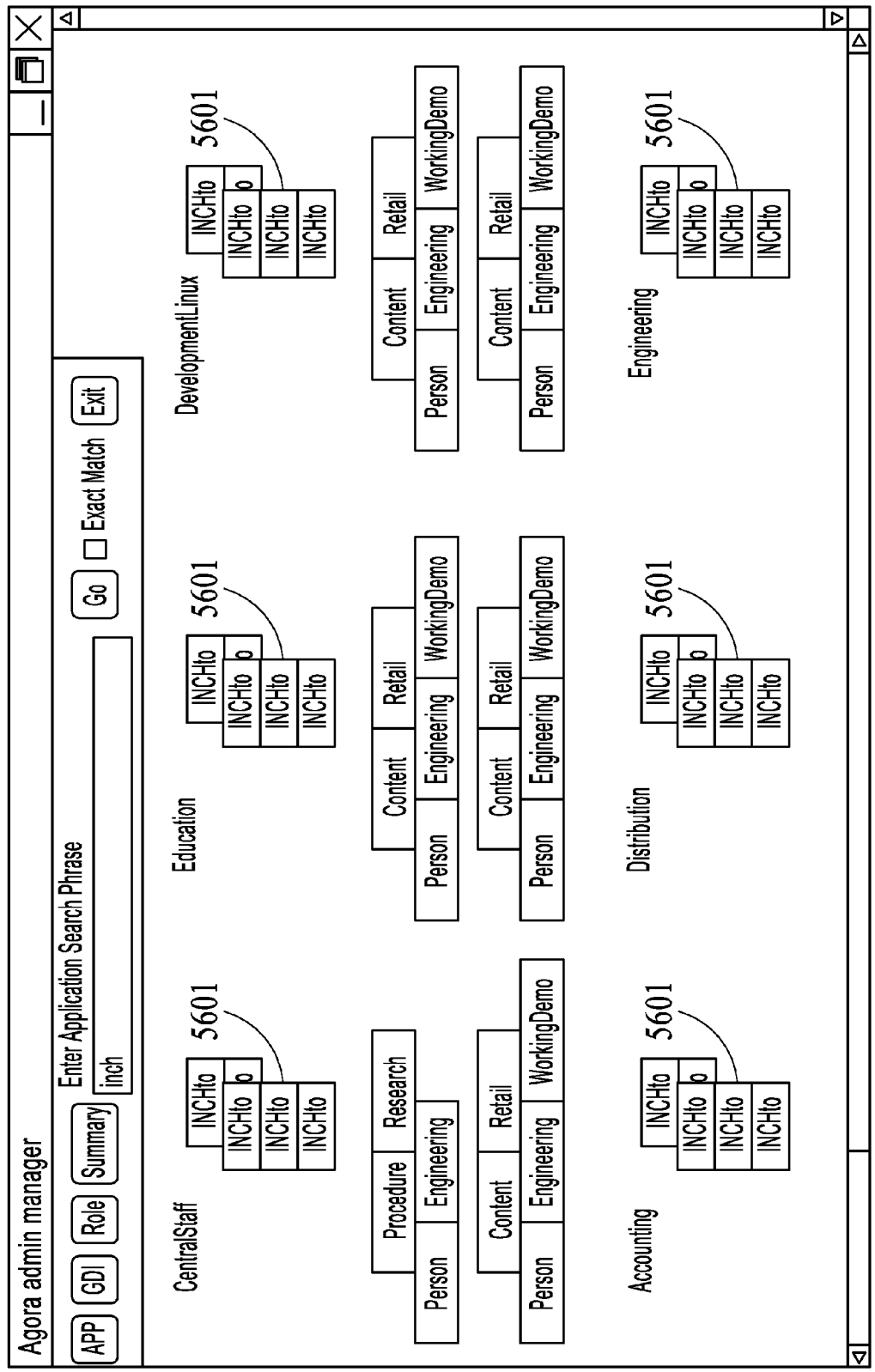
FIG. 56 is a drawing example of the Search engine in a "T" stack display with Level 4.2 Interface where a search will provide locations of all matching Composite objects and INCLUDE nested objects meeting the search criteria.

The Rule commands are interactive design base that adjusts the requirements to the command being developed by automatically prompting the FIG. 54 fields, tabs and variable options needed to complete a program line. This does not impact the user's ability to add spread sheet like function to the Rule panel program in order to support a data integration requirement. The spread sheet function can be simple or very complex design. That is determined by the user's subject matter expertise more than it is programming skills. Because the AGORA design does not require or use script programming—a common design support requirement. The invention supports eight rule commands currently defined FIG. 54 but not limited to this list:

Change Value: replaces a variable with another
Compare: compares two values. Also can use the And command. (NOTE: the And command is used as a component of this command)
Compute String: Performs specified operator: Left Trim, Right Trim, Left Add, Right Add
Compute Value: Perform specified operator (+, /, −, =, *)
End of Block—EOB: Denotes end of Compare block
Or: Compares variable 1 to a variable 2
Include: permits a data integration application to be nested or inserted into another data application.
And: connect statement
Comment: place remarks into the program that are not executables Programming beyond these commands is the decision of the users and IT processes. Data is a large and complex design. It requires flexibility in programs that access and use structured data for business requirements. The use of spread sheet function principles will continue to be added to the design in the future.

The Rule object has error messaging that if a command does not meet the requirements, the command will be prevented from insertion in the Rule Object until corrected. The software design is using a command structure but is also editing that structure as it is created. Again the initial variable comes from the Schema Object.

The INCLUDE command permits adding programming from existing Composite Objects (DIA) published or unpublished. When an INCLUDE statement is in a DIA, the Rule, Schema, and Object are included in the merged process. This invention is a full integration with only for requirements of Command, Library Path, Rule and Version Level. There is no added programming required. Note: the Composite Objects' program documentation for the Rule Object is automatically updated to reflect an INCLUDE insertion.

New function additions such as the Include Command are only another line item in a pull down tab to the Subject Matter Expert User in the Rule Object following. The function and its complexity of a nested object is managed and controlled by the software invention design and not by the user. Their role is to leverage the commands and program function not get into the technical design data integration software vendors provide.

A documentation aspect of the present invention for user productivity is the automatic documentation process. FIG. 55 shows that by double clicking on the first line of the Rule panel, the entire programming associated with the Rule Object is displayed. This will display all INCLUDE command Rule content. A user can also automatically document a specific INCLUDE command's program content FIG. 37. When the programming for the Rule Object is opened, the user can keep a hard copy by printing of the screen itself. There are not multiple pages of objects, documents, flow charts, etc. common with $4^{th}$ GL written interpretive software. A user can print the screens for Rule, Schema, and Object to have complete documentation of the Composite or Data Integration Application.

Documentation and the program content can be taught quickly since it is based on a set of consistent standard processes and command structure. The invention is to have the complexity internal to the software invention and the external to be a flexible, Multi-Tier interface that can be revised or replaced without impacting the underlying software. The $4^{th}$ GL, interpretive data integration software's use of icons, pop-up screens, workflows, and IE folders is tightly bound to the underlying code. A recent example was the release of Microsoft VISTA operating system was such a significant change in the GUI design that ETL vendors deferred moving their software off the XP GUI because of how much code change was required in order to support the VISTA architecture.

Summary Schema and Rule Objects are illustrated in FIG. 22 The Schema commands like the Rule commands option can be expanded within the AGORA invention and design without changing the user interface beyond adding a new command to the list; versus the icon intensive design approach where adding icon commands impacts multiple parts of the data integration software. The structure command is consistent with structured data formats being very consistent in order to scale and for performance reasons. This process design is used in the Schema and in parallel the Rule Commands as well to be consistent, predictable and repeatable processes so the user focuses on the usage of the software versus its surface interface complexity.

Another aspect of the software invention is to provide the commands and options within a consistent design. Leaving the complexity of the Schema and Rule Objects to the AGORA software to manage and control. By removing the technical layers of icons, workflows, pop-up screens and folders, it simplifies the screens by placing that extensive level of design and function principles inside the AGORA software inventions and designs.

The Object screen shown in FIG. 29 is the connectivity path defining the target and source paths for accessing structured data from original data sources or copies. This is connectivity processes, not programming. The IT DBA's and system analysts will set the policies and access processes for the Subject Matter Expert users. The structured data needs to have the security and data integrity aspects maintained.

The Connection Import and Export Object specifies the required connection string specifications. This connection string is defined by the vendor and channel technology that is currently used: ODBC, OleDb, Oracle, XML, file and binary 2901.

The Channel Import and Export pane specifies the channel technology and query parameters. The query parameters are used to define SELECT, DELETE, INSERT and UPDATE statements for SQL-like transactions. For XML-based transactions, the XML Document and Element specifications are specified to encode/decode SJT XML documents.

The Connection Object is used to define connection to Source-Channel and Target-Channel pairs. The screen display in FIG. 29 shows an Import Connection used to establish an import process to the Source-Channel and the Export Connection used to establish an export process to the Target- Channel. The examples show OleDb for both connections. However, the Import Connection and Export Connection can be different connection technologies, for example, ODBC and Oracle.

Each query method contains a SELECT query specification usually to specify one Table Object name that is specified in the Select textbox. If multiple Table Objects are required, two or more Table Object names, separated by commas (,) and the appropriate SQL WHERE clause is specified in the Select textbox.

As shown in FIG. 29 an Update checkbox defines either a DELETE-INSERT query (Update checkbox unchecked) or an UPDATE query (Update checkbox checked). A DELETE-INSERT query is shown as an input query and an UPDATE query is shown as an export query. The textbox labels for the DELETE-INSERT and UPDATE queries are automatically changed as the Update checkbox is either checked or unchecked.

The Connection for the Object Import in FIG. 29 is a Microsoft Jet database (Access) 2901. The Connection for the Object Export is similarly a Microsoft Jet database. In the Person target data storage source path 2902. Both Connections use the OleDb connection needed for Microsoft.

Data base Channels include: BIN, DB2, File, Odbc, OleDb, Oracle, and XML. And finally the SAVE command in the bottom Panel will retain the connectivity information. The Error Message Panel is the final component of the screen. It should be noted that the Object screen preferably has IT input and use IT processes. This is a direct access path to the source data and therefore security processes will be used.

The fourth screen in the Edit Update Mode is the Analysis Screen. The Analysis FIG. 30 provides the testing option for the user to test their unpublished data integration application with sample or live data sources without requiring a massive programming exercise to set up. This mode is also adaptable to compliance-audit requirements for internal testing and testing for SEC audit reporting requirements (Sarbanes-Oxley). Because of the productivity design of the Rule and Schema Objects, a user can design and build a data integration application in a matter of hours and then conduct the Analysis testing. This capability is very useful asset in the Compliance and audit integration applications where auditors enter client environments that have very different and disparate IT profiles. Embodiments of the present invention reduce the ramp time to build the test programs and test the data for that requirement. The process activates the Composite Object access to source to target and can also run the reverse test of target to source to analyze consistency and accuracy of the data being move or transformed. The Analysis process also is excellent option for data quality testing by users prior to loading data into structured data centric business applications such as Business Intelligence, Customer Relationship Management, etc.

The process for using the Analysis screen is the user has the Rule Object automatically loads into the Rule List Panel 3101 via the Edit mode. The data sources are accessed by either directly against the live data or copies of the data sources. A second option is to build a test Channel and enter test data into a source and target database. The test is initiated for the Processes Import to Export in the Apply Composite Panel 3104. The rule object is initiated against live or test data and the user can walk through the row execution and see the data results map to the Schema object supporting the Rule Object used in this test. The user then can test the reverse data flow from the Export to the Import structured data sources.

A function that is used for search is not part of the Edit or Manage Modes, but is used with the Multi-Tier Level 4.2 interface to allow a user to find an application or an INCLUDE object rapidly across the enterprise or in a particular Library. The Search function is on the name level of the Composite (data integration application) and also search for the INCLUDE objects. The purpose of the search is to provide Search function support at the application level. The search within application Composite, into the command lines, is not supported by the software invention. Word or term searching requires different algorithms and processes not currently in the design. Therefore the Search capacity of the AGORA software invention is restricted to the names of applications, unpublished Composites and INCLUDEs.

The "L" stack and "T" stack use the command line appearing on all screens of Level 4.2 interface at the top. The option is to enter a word or phrase for Search. If a specific term search is required, the Exact Box 3603 is checked prior to clicking on the Search GO tab 3604. The Search results are based on the process invention of closing all cells of the Level 4.2 interface to display the DIA Cells and INCLUDE object cells that match the search argument. The search results display for the "L" stack 3602 and the "T" stack 5701 are similar except the search results are tied to the physical location on the GUI screen. NOTE: the Level 2.3 interface also can search by a path search process. The search screen is an independent screen with the specific and general search capability as in the Level 4.2 interface but it displays in specific fields on search mode screen.

The Manage Mode master screen FIG. 39 uses the Multi-Tier Level 4.2/Level 2.3 Interface to initiate its command execution options FIG. 34. The Manage panel is used to Access a file system, Create(New) 3904, Up Version 3903, Delete 3906, Publish 3902, Copy 3907, Import/Export 3905 in XML format, and Publish Composite Objects. The initial window is displayed when the Manager Mode is invoked. The processes are direct and simple in execution processes.

In embodiments of the invention, there are three primary control sets: Create, Maintain, and Archive. (see FIG. 39.) There are two controls available for Creating 3904 a Composite Object (Data Integration Application): New—create a new Composite Object because there is no Composite Object matching this Composite name. The Issue is assigned a value of 1. 3904; Up Version—Increment the last issue value by 1 and create a new Composite Object. The Composite Object Name, Owner and Date are retained for continuity with previous Composite Object issues. 3903.

There are three controls available for Maintaining a Composite Object: Copy—Creates a Copy 3907 of the content of the most current Composite Object that is not Published. 3907; Delete 3906—deletes the entire content of the most current Composite Object that is not Published. 3906; Publish 3902—publishes the most current Composite Object that has not yet been Published. 3902.

It should be noted that a published Composite Object cannot be changed. A Published Composite Object must be reissued to the next sequential issue number (X+1) to change the Composite Object content. There are two controls available for Archive: Import—import a Published Composite Object that is in XML form. 3905; Export—export a Published Composite Object that is in XML form. 3905.

Figure 57:
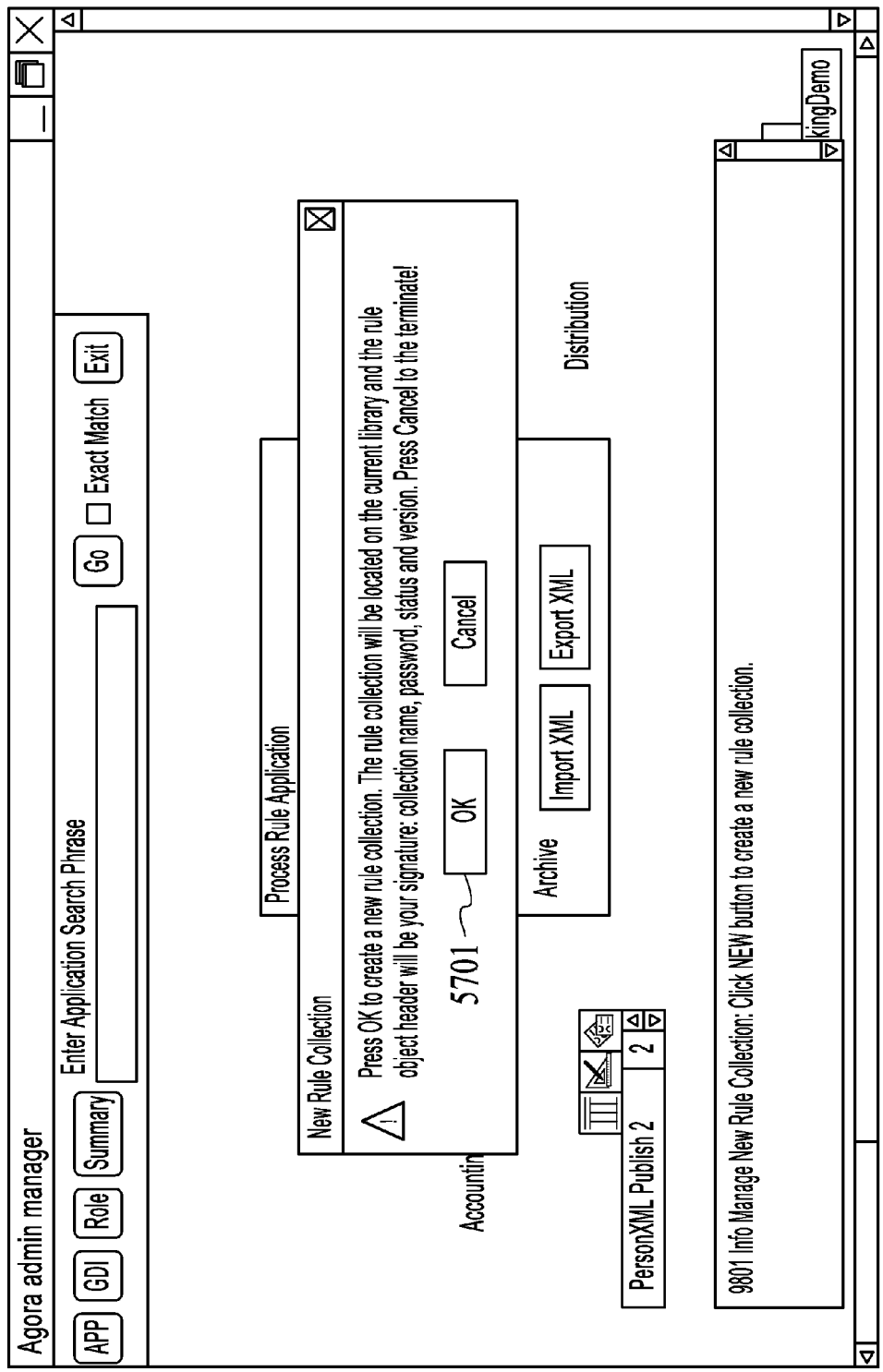
FIG. 57 is an example drawing of the screen to generate a new Composite Object with new name and yet to be defined Composite object. Is a Subject User Expert user responsibility to complete.

Creating Composite Object—has two states for creation. First is the creation of an entirely new Composite object with new name and no initial content for the Rule, Schema or Object screens. The process is initiated from the Manage Mode screen in FIG. 39 clicking on the New tab 3904 resulting in the Create screen FIG. 57 appears to either create or cancel new Composite object in unpublished state 5701. Click on the OK tab and the four base screens (Rule, Schema, Object, and Analysis) used to build a new Composite Object with a new name independent of existing version control. Therefore a new Composite Object name would be NewObject Change 1 Version 1 is created without content.

Figure 58:
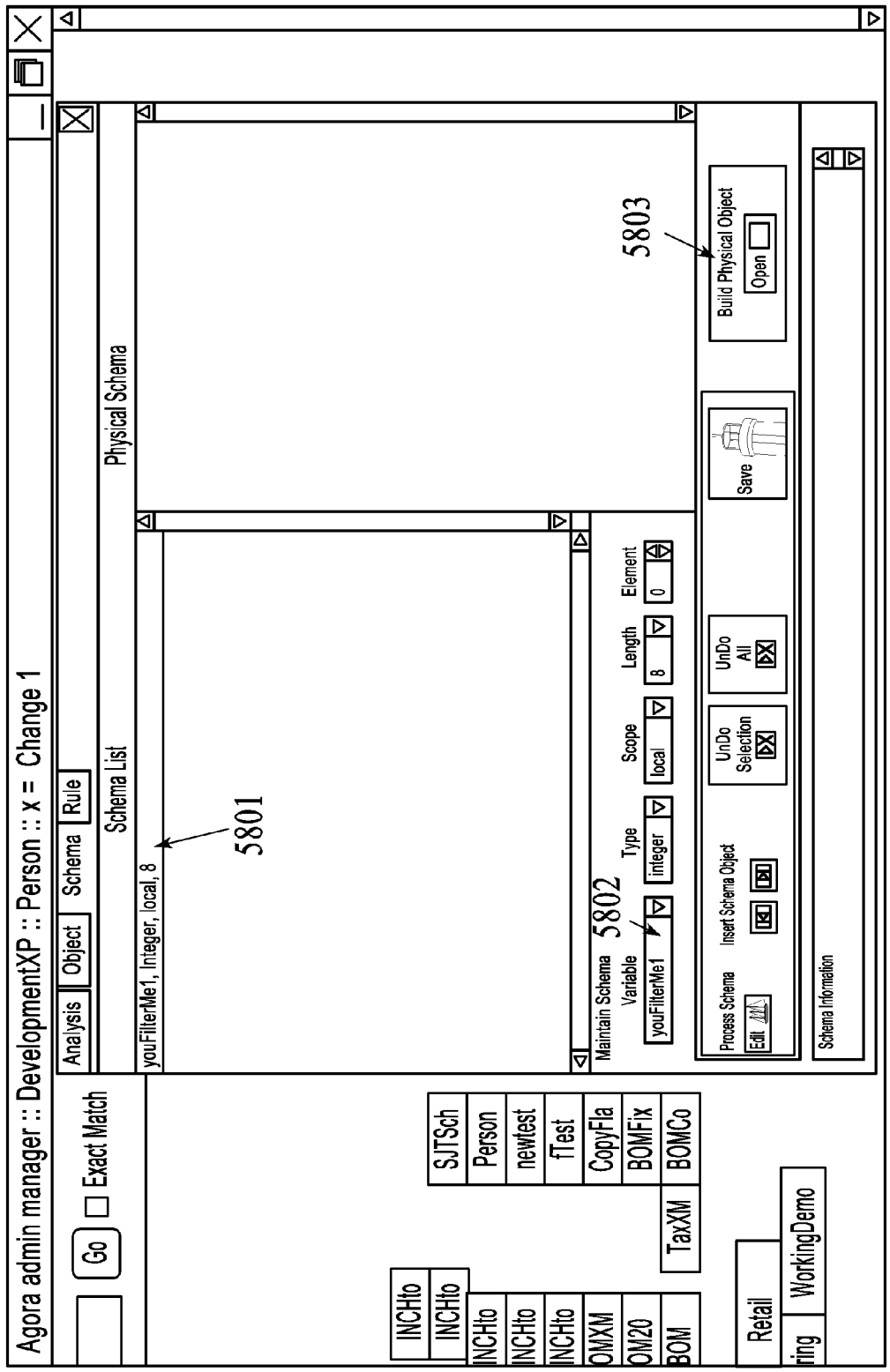
FIG. 58 is an example drawing of the Schema screen of a create command to initiate a new Composite Object (Data Integration Application) prior to commands process being initiated. Drawing shows the Schema screen of the four edit screens active for this Composite object.

An example of the Schema screen (FIG. 58) with only a general first line of the Schema List Panel is created as initial point of development 5801 in building the Schema (Variable) object via the command line entry 5802 by the Subject Matter Expert User or IT user. The user will create per our prior descriptions what is to be developed for the object. Similar steps are performed for the Rule and Object screens to create a complete unpublished Composite Object.

A second Option is an Up-Version of an existing Composite Object that has been published. The authorized user takes an existing published Composite and in Manage Mode screen (FIG. 59) clicks on the Up-Version Tab 5902 for CreateCollection Publish 1 Version 1 creating a new Change status 5903 version (X+1) CreateCollection Change 2 Version 2 from the published Composite Object 5903. The entire Composite Object Rule, Schema, and Object are copied under the new name and the user edits the objects for the new requirement. This also established version control and audit tracking information.

Three options supported by embodiments of the present invention are Copy 3907, Delete 3906, and Publish 3902 for Composite Objects.

Figure 61:
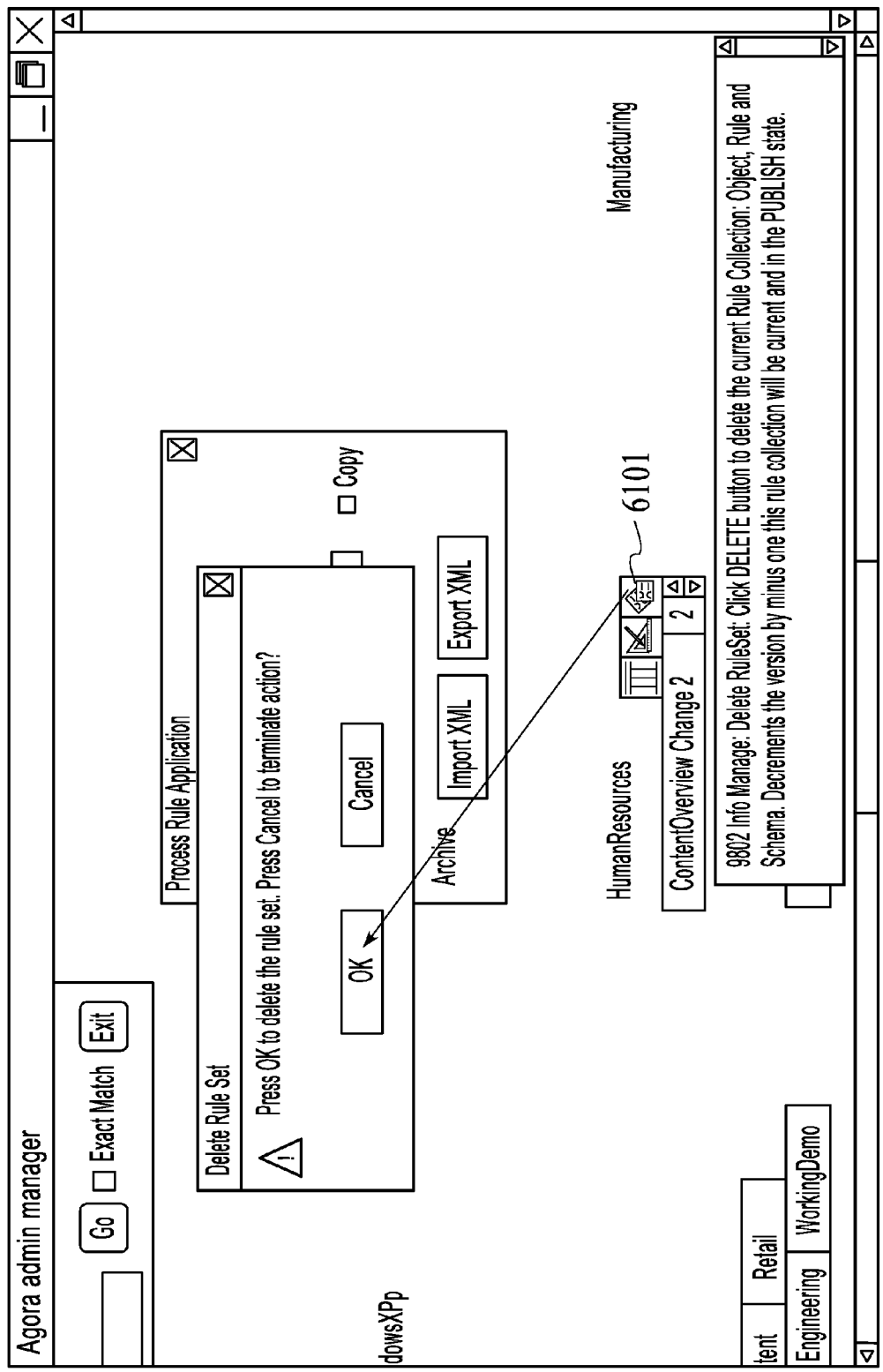
FIG. 61 is an example drawing of the delete function in Manage Mode screen

Copies of existing published Composites to be used as a source for new Composites (FIG. 60) to rapidly support new enterprise requirements. The copies are given different Composite Object Names 6001. These are new Composite Objects. This does not prevent a specific compiled Collection or Data Integration Application from being scheduled multiple times for a web based transaction system or for a VMware type system running in multiple partitions. Because DIA is a compiled object, it is designed for very high volume application and source structured data requirements Delete 3906 removes existing Published and Unpublished Composite Objects from the Library on a permanent basis as shown in FIG. 61. The Composite Object (Published or Unpublished status) when at a Composite Objects Master Mode Screen click on the Delete tab 6101 and user will be asked to click on OK or Cancel tabs to confirm or cancel the object deletion.

Figure 62:
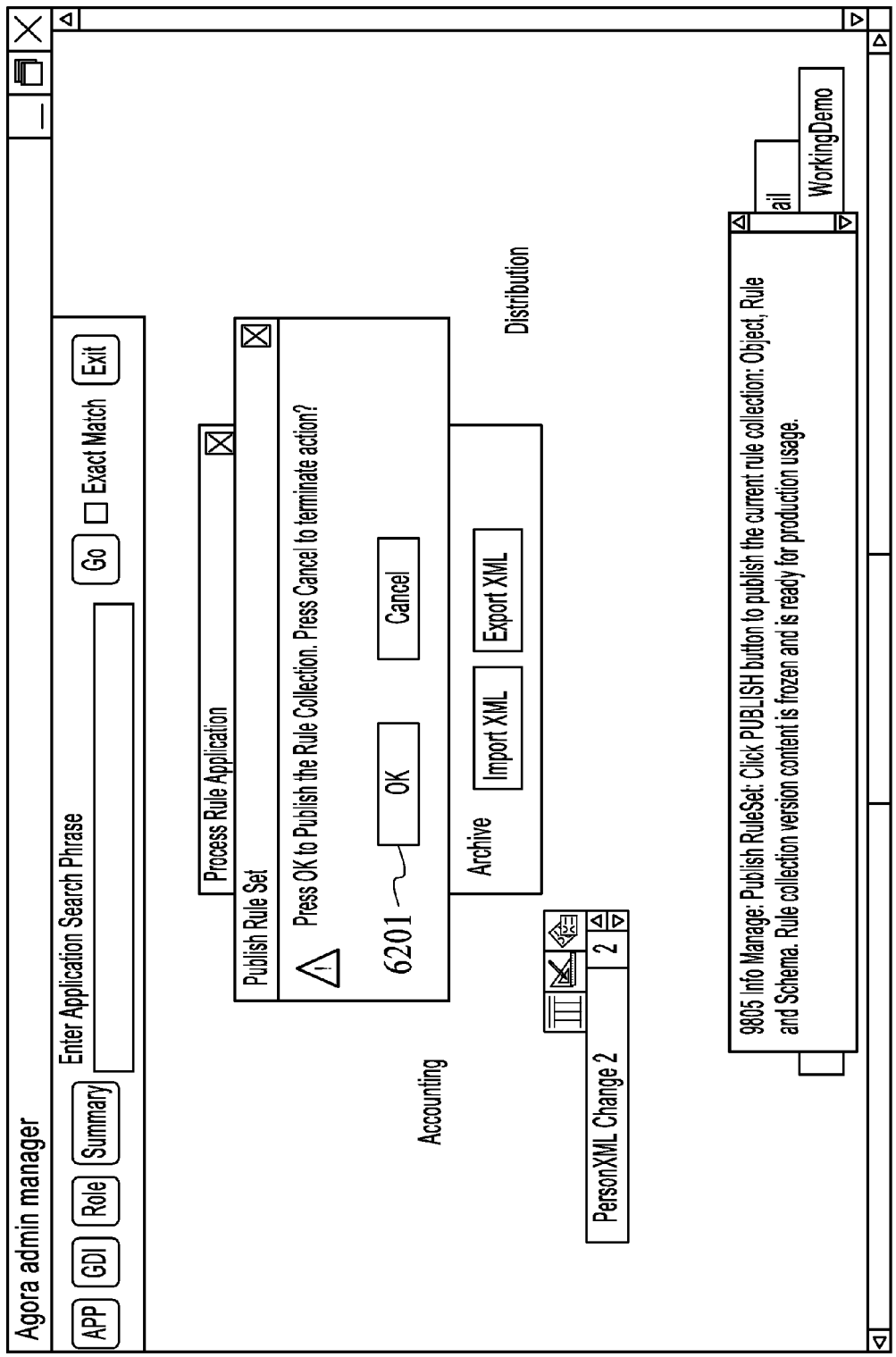
FIG. 62 is an example of the Publish (compile) command for a Composite Object (Data Integration Application.

Publish is the process of taking an unpublished Composite Object to Published status as shown in FIG. 62 in order for use in a company's production environment as a compiled Data Integration Application. The Person XML Change 2 Version 2 is being published via clicking on the Publish tab Manager Mode Screen (FIG. 39) then user clicks on OK or Cancel to Publish 6201. Click on OK creates a published Composite Object the Person XML Publish 2 Version 2. NOTE: there is no automatic create process for a Version 3 in Change state until the user takes specific action for an Up-Version to be initiated.

Figure 63:
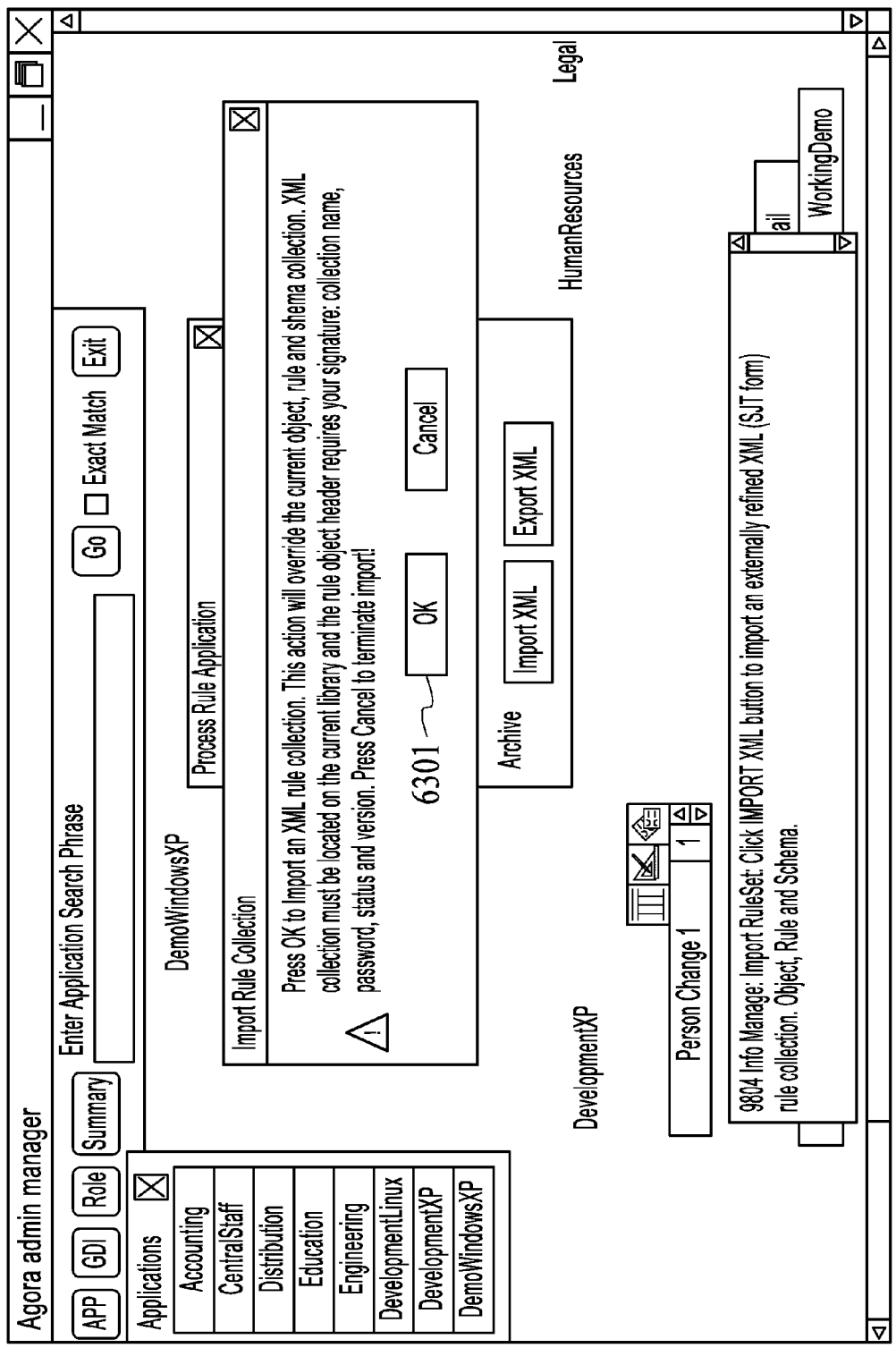
FIG. 63 is an example of the Import XML of a Composite Object function from the Manage Mode Screen

The capability to archive existing published Composite Objects or import Composite Objects is done via the Export XML and Import XML 3905 options as illustrated in FIG. 63. The authorized user will click on the XML command required (FIG. 39) and initiate the Import or Export Tab 6301. User clicks on the OK or Cancel tabs. If OK, in this example an XML formatted Object is imported into the Library. This can be Composite Objects from other locations or flat files containing key data to be imported or exported per the requirement.

The following provides an example Composite Object—Data Integration Application according to aspects of the invention.

In particular, referring back to FIG. 9, it shows that the software development and compile process is performed on small server with one to two 901 compute engines to support the process 902. Once the Composite (Data Integration application) is published or compiled 903, the compiled application can be placed in a number of library options 904 as designated by the company's IT computing system processes. AGORA does not require special library location or control by AGORA once compiled. When the DIA is used in a production environment FIG. 9, AGORA design enables it to execute in any computing environment 905 with a compiled adapter for that environment, as either part of a business application executing as a CALL 906 statement or as an independently executed application; options that interpretive code cannot do.

Figure 10:
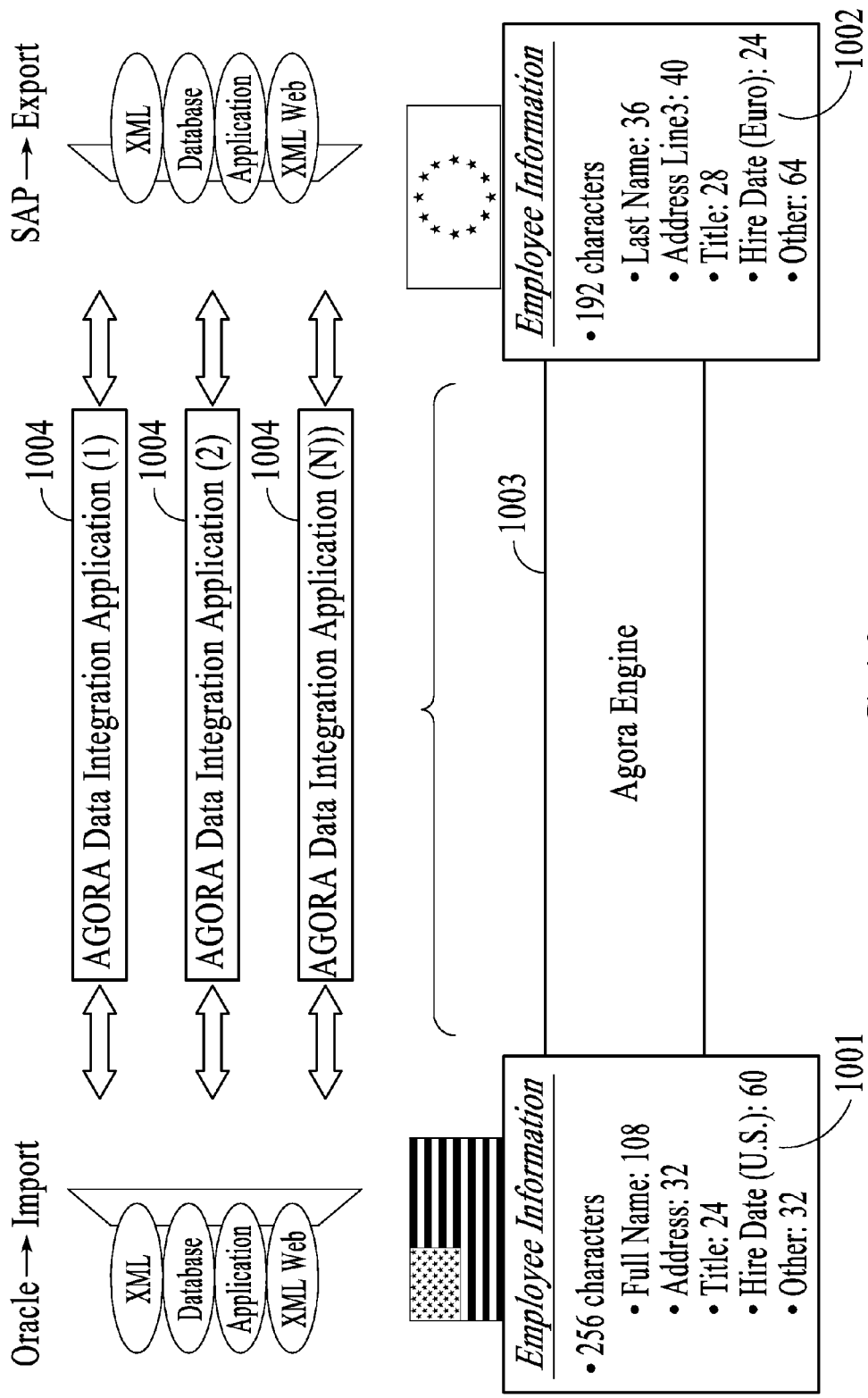
FIG. 10 is a drawing example of a Composite Object HR application between US and EU operations

FIG. 10 is an example display for a company with headquarters in the U.S. and a division located in Europe. The units have different HR record formats, different software profiles: the US has Oracle HR and Database software. While the EU division uses SAP HR software and IBM database software. Even if the vendor software profile was to be consolidated to one profile, the data sources will remain disparate due to the respective government regulatory requirements. The U.S. HQ Employee HR Information Record is 256 characters 5801 and the European is 192 characters 5802. The AGORA software design and processes take the data elements from the U.S. record(s) pass them through the Oracle supplied adapter into the AGORA Import Engine that initiates the transform the Oracle based record to an AGORA process in the transforms them via the Composite Data Integration Application processes outlined in prior content of this section.

The code examples below in TABLES 2 and 3 are an embodiment of the invention and design for the Rule and Schema objects. The Rule Object following is a version of FIG. 10 and the source 6401 to target 1002 and reverse using the AGORA software invention 1003 for creating the Composite. This example uses the Person Change 1 Version 1 example in the detailed definition. The Rule and Schema in this example have been successfully developed and tested using the inventions and design software.

TABLE 2

Person Change 1

Header

| | |
|---|---|
| Compare (Branch == "denver") | The Rule list example shows using |
| ComputeString City LeftTrim Address "," | the current commands (Compare, Compute) |
| ComputeString State LeftTrim Address " " | in a number of different definitions and |
| ComputeString ZIP LeftTrim Address "" | calculations tied to the data field segment |
| ComputeString LastName RightTrim FullName " " | information. The Rule on the source side |
| ComputeString MiddleName RightTrim FullName " " | takes the existing data field name, length, |

TABLE 2-continued

Person Change 1

Header

| | |
|---|---|
| ComputeString FirstName RightTrim FullName "" | and type into the Schema List below. The |
| EOB | variables created in the Schema list must be |
| ComputeString Month LeftTrim Date1 "" 2 | used by the Rule List on the Source side. |
| ComputeString Day LeftTrim Date1 "" 2 | This is why in the default screen display the |
| ComputeString Year LeftTrim Date1 "" 2 | Schema screen is the default screen for |
| ComputeValue TYear = Year | using the software. |
| Compare (TYear < 1900) | The expansion or reduction of the |
| ComputeValue Year + 1900 | length of field is performed in this section. |
| EOB | See the examples following. |
| ComputeString Date2 RightAdd Month "" | |
| ComputeString Date2 RightAdd Day "/" | |
| ComputeString Date2 RightAdd Year "/" | |
| ComputeString EuroDate LeftAdd Year "/" | |
| ComputeString EuroDate LeftAdd Month "/" | |
| ComputeString EuroDate LeftAdd Day "" | |
| ComputeString Month LeftTrim Date1 "" 2 | 1. Trimming field from the left side of the field "Month" |
| ComputeString Day LeftTrim Date1 "" 2 | 2. Trimming field from the left side of the field "Day" |
| ComputeString Year LeftTrim Date1 "" 2 | 3. Trimming field from the left side of the field "Year" |

The code lines above example show how quickly and easily a field segment can be reduced when of different sizes between two structured data source and target. Each data source for US and EU will move data in both directions based on the requirement. Each field of Month, Day, and Year field can expand or reduce a field segment. Software invention is using fundamental command design in order to reduce the issues around data.

TABLE 3

SCHEMA LIST

| | |
|---|---|
| RecordID, string, all, 8 | The Schema list uses the field names for |
| Branch, string, all, 32 | the source and target data sources due to both |
| Date2, string, export, 16 | sides being already established data definitions. |
| EuroDate, string, export, 16 | The focus is to identify and cross reference the |
| FullName, string, import, 256 | data field names, length and type along with the |
| FirstName, string, export, 32 | action to be performed (Export, Import, local, etc). |
| MiddleName, string, export, 32 | A user can review easily the content of the |
| LastName, string, export, 32 | Schema list since it is organized for a person to |
| Address3, string, import, 256 | read and edit in a common sense format. There |
| City, string, export, 64 | are no icons, pop up screens etc. The software |
| State, string, export, 32 | takes the commands and applies the complex and |
| | disparate data integration processes against the |
| | data sources to produce the Composite Object |
| | that will move and transform the requirements. |
| | The user does not need to understand nor |
| | participate. Their focus is the expertise as an HR |
| | skilled person in getting Personnel information into |
| | the right format for the US or the EU |
| | environments. |
| ZIP, string, export, 16 | 1. Field name - ZIP. It is a fixed length field - String. Source Data- Export. And fixed field length - 16 bytes |
| Date1, string, import, 16 | 2. Field name - Date1. Fixed Field - String. Target Data - Import. And fixed field length - 8 bytes |
| Month, integer, local, 8 | |
| Day, integer, local, 8 | |
| Year, integer, local, 8 | |
| MonthStr, string, local, 64 | |
| TYear, integer, local, 8 | |

Reading the Rule or Schema example, aspects of the invention are to keep the external processes in a core design that will complement the Subject Matter Expert user's skill sets. Having a complex solution design with massive function has led to data overwhelming technology. Clear process is more valuable in the AGORA software invention and design than hundreds of icon commands, pop up screens, and numerous workflow options. Computing historically always is most successful when the processes it supports are done in a fundamental design point.

In conclusion, the present invention as described above provides various functions, display techniques and algorithms, and underlying software capabilities that are useful for managing structured data. The following sets forth various aspects, features and advantages of the invention that should be apparent to those skilled in the art after being taught by the present disclosure.

The invention provides a Multi-Tiered display method to draw objects on a TV screen, computer monitor or handheld device (see FIG. 5 and FIG. 11). It provides an implementation of a virtual graphical sketch pad as a display panel that is boundless in the horizontal plane (X) and vertical plane (Y).

It provides an implementation of an information based tiered stack to integrate a virtual graphical sketch display used to navigate, search and investigate composite objects and exploding selected objects to specific object information screens used to build and maintain composite objects. It provides an implementation of single display component group as a composite of objects consisting of horizontal and vertical objects that decompose into sub-objects.

The invention provides placement algorithms to automatically place objects on a screen based on the intra and inter-relationships among objects. It provides a suite of placement algorithms that place components onto the virtual sketch pad based on component heuristics, inter-component relationships and intra-component relationships. It provides a suite of placement algorithms that place components onto the virtual sketch pad based on usage, process and expert user knowledge defined into an algorithm. It provides a placement strategy to place related components onto cells in a left to right process clustered around a center horizontal axis the overall algorithm is called the "T" algorithm as shown on slide FIG. 13, FIG. 15. It provides a placement strategy to place related components onto cells in a bottom to top and left to right overall algorithm is called the "L". It provides a suite of algorithms called the "Z" algorithm places components onto cells using a composite of "L" and "T" algorithms based on the clumping of intra-relationships of related components and inter-relationships of related components FIG. 18.

The invention provides Navigation methods where a user can easily move from object to object on a virtual sketchpad. It provides a navigation aid provides a quick 1 or 2 button click from any primary level (application) and/or secondary level (library) component to a third level (object) component group located anywhere on the virtual sketch pad. It provides a single click on a virtual sketch pad neutral image area turns "on" or "off" the display of all third level components. It provides a single click on a virtual sketch pad primary level (application) image turns "on" or "off" the display of all third level components that belong to the selected primary level. It provides a single click on a virtual sketch pad primary level (application) component highlights the display of all secondary level components that belong to the selected primary level component. It provides a single click on a virtual sketch pad secondary level (library) component highlights the display of all third level components that belong to the selected secondary level component. It provides a pan ability to point and click to slide the virtual sketch pad logically via a reference link, to the left, to the right, to the top and to the bottom. It provides a zoom ability to point and click to zoom in (magnify) or zoom out (compress) the current virtual sketch-pad display. The zoom in and zoom out can be either via a reference link or actual pixel manipulation FIG. 18.

The invention provides a component layer that has 3 tiers of specification and can be shown as an inverted tree diagram consisting of five or more composite sub-object level objects. The Project level is the root of an inverted tree that consists of the following hierarchical structure: Application level; Library level; Composite level; Variable level, Language level, Connector level, Analysis level and one or more User levels.

The invention provides a Composite Object as a graphical union of a variable object, language object, connector object, analysis object and user object managed as a single manageable object. (see FIG. 21, FIG. 22, FIG. 44 for example). It provides a variable object—for example the address object consists of city, state and ZIP_code variables. It provides object—for example the area language object consists of the instruction: area=lengtha multiplied by lengthb. It provides a connector object—for example the connection of Euro date to a U.S. date. It provides an analysis object—for example using many test cases, test the validity of a Euro date transformed to a U.S. date. It provides one or more user objects—for example a user object can be a browse or edit toggle for analysis, variable, language and connector objects or separate browse and edit user objects can be provided to zoom onto the composite object suite. A user object can replace the default provided analysis, variable, language and connector object icons. It provides a version object as a visual icon to toggle through all published and unpublished versions of a composite object. It provides a zoom method to click on a composite variable object as a logical zoom to display the variable object detail. It provides a zoom method to click on a composite language object as a logical zoom to display the language object display detail. It provides a zoom method to click on a composite connector object as a logical zoom to display the connector object display detail. It provides a zoom method to click on a composite analysis object as a logical zoom to display the analysis object display detail. It provides a zoom method to click on a composite user object is a logical zoom to display a customized user object display detail. There may be zero, one or many user objects.

The invention provides a Variable Object to encapsulate a structured and/or unstructured definition for a composite object (see FIG. 24, FIG. 25 for example). It provides an implementation of a display list object as a variable object list to name and define variable attributes. It provides an implementation of a display object as a distinct command set to manipulate a distinct variable list object. The basic variable process is: Select and click a Name value or enter a new Name; Select and click on a Type value; Select and click on a Length value or enter a new Length; Click the EDIT button to edit or insert the variable information to the highlighted variable text line.

The invention provides a Language Object to encapsulate rules/formulas to transform an external source object to and external target object.(see FIG. 26, FIG. 27 for example). It provides an implementation of an object as a language that defines a set of operators to manipulate a variable list object. It provides an implementation of an operator set to perform character manipulations. It provides an implementation of an operator set to perform numeric computations. It provides an implementation of an operator set to perform content aggregates. It provides an implementation of a language that is a simple operator point and click process. It provides an implementation of a left to right language construction where the previous zero or more clicks determine a current point and click word list. It provides a language where a selection can be from a language word list or manually entered by the operator. It provides a language where the point and clink word set constructs a human readable command (sentence). It provides a language object that has an ability to "include" other language objects and the included objects can "include" other language objects. It provides an implementation of a language object management service to create, maintain and manipulate language objects. It provides a language where a source to target transforms can execute an inverse target to source and yield the results found in the original source object. It provides a language object that is retained in a structured file form called a binary object. It provides a language object that can be transformed into a human readable object. The basic language process is: Select and click on a Command; Each command is dynamic and specific drop-down lists are uniquely displayed for each command and parameter values; Select and click on each command parameter or enter a new parameter value; Click Edit button to edit the highlighted command line or click the Insert button to insert a new command line., wherein a numeric operator is add (+), minus (−), divide (/), multiply (*), percent (%), square root (SQRT) or square (SQ), Wherein a string operator is add to a source string at the end position (RightAdd), subtract from a source string at an end position (RightTrim), add a string to a source string at a start position (LeftAdd), subtract from a source string at a string start position (LeftTrim), add to a source string at any position in a string (Add) or subtract from a source string at any position in a string (Trim), Wherein a compare operator is AND (&), OR (|), equal (==), greater than (>), less than (<), not equal (!=), greater than and equal (>=) or less than and equal (<=), The invention provides a Connector Object to encapsulate methods to access and filter external source and target objects (see FIG. 28, FIG. 29 for example). It provides a technology method to connect an external source or target object. An external object can be a text file, binary file, database, memory map or stream technology. It provides rules to access and/or filter the information contained in an external source or target.

The invention provides an Analysis Object to encapsulate methods to analysis test cases for external source to target object transforms and target to source transforms (see FIG. 30, FIG. 31 for example). It provides analysis methods to test an external source to target object. An external object can be a text file, binary file, database, memory map or stream technology. It provides analysis methods to test an external target to source object. An external object can be a text file, binary file, database, memory map or stream technology.

The invention provides an Executable Object to encapsulate the result of a composition object compilation. It provides an object that is a compiled package i.e. a specified language object and variable object that has been compiled as a package object and can be executed as a program on a computer processor. It provides a process to translate human readable language, variable and connector objects into a compact, instruction based numerical machine-independent object. It provides a machine independent object that is secure and not easily readable by a human and is not easily re-engineered into a human readable object. It provides a machine independent object that can be easily executed on different operating systems and computer processors. The source object environment consists of language objects, variable objects, and connector objects. These source objects are compiled into runtime objects and are saved in a run-time environment which usually is a production environment that is separate both physically and logically from the source object environment. The executable objects are launched as requests from a user script, a scheduler or from within a parent application. At runtime, the specified compiled package is bound to the executable object and the result is realized (see FIG. 32, FIG. 33, FIG. 34 for example).

The invention provides a graphical Search Engine method that provides a search, match and display method to enter a phrase and return all applications, libraries and composite names that match the entered phrase. The matched applications, libraries and composite names can be displayed either graphically on a virtual sketch pad as shown in FIG. 35 or optionally an hierarchical text representation (see FIG. 35, FIG. 36 for example). It provides a graphical search engine to access, audit, find, display and show language object hierarchy and "used on" INCLUDE attributes as. It provides the display for all first instance search matches for any composite object and displays all secondary references via the INCLUDE object claim. It provides the ability to browse on highlighted search map by clicking on and object to drill into the composite object detail.

The invention provides an Version Control Object to encapsulate the methods to identify and manage multiple implementations of a composite object. A version control object method is: Language Object+Variable Object+Connector Object+User Object; Sequential index—1, 2, 3 . . . the uniquely identifies each compiled composite object.

The invention provides a Composite Object Life-cycle process to manage all composite object components and composite object The Composite Object life-cycle has three states (see FIG. 21, FIG. 39 for example): New—an invention created default object that has not been modified by invention methods; Change—a composite object that has been modified by invention methods; Publish—a composite that has been qualified to be released for production usage and changes to the current version object is frozen. If changes are required a new object needs to created or the invention version control method increases the version counter i.e. version 2 to version 3.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of processing data applications using a computer, comprising:
   managing, by the computer, processing of data that is distributed among one to multiple data sources, including:
   providing a data application object as a compiled union of a variable object, a language object, a connector object, and one or more user objects that provide functionality to browse, analyze or edit the variable, language and connector objects or to zoom onto the data application object, wherein the data application object is adapted to be managed as a single integrated object;
   providing a programming process for creating the variable object as a data schema of a source and a target data structure in the data, the language object as a data application for an execution process, and the connector object which defines a connection between the source and target data structures,
   wherein a structured framework is provided for defining data variables of the variable object, creating a compute application for the language object, and defining the source and target data structures for the connector object; and
   allowing for asynchronous execution of the compiled data application object as an Import, Compute, Export (ICE) method, the execution being allowed to be performed in parallel and serially in relation to the execution of other data application objects; and
   managing, by the computer, display of the data applications, including:
   providing a virtual graphical display that comprises a horizontal plane (X), vertical plane (Y) and depth plane (Z);
   automatically placing graphical cells on the virtual graphical display along one or more of the horizontal, vertical and depth planes; and
   providing display controls used to navigate, search and investigate data application objects that are represented by the graphical cells and that operate on the data and for exploding selected graphical cells into screens used to build, drill into and maintain the data application objects, and enabling subject matter expert users to achieve application characteristics applied to data sources among the one to multiple data sources, the enabling step including:

providing a bi-directional algorithm to enable a data application object to support data movement between data sources bi-directionally through an iterative inverse process with execution of a connector object process;

providing a function for extending a current formula or adding new command options;

providing a function for extending current or additional formulas through a series of spread sheet function and for enabling creation of one or more components of the language object; and providing an automatic documentation process of each of the variable, language, connector and analysis objects within the compiled data application object, wherein the step of providing the bi-directional algorithm allows for executing an application in the forward and then executing the application in the reverse direction to yield the equivalent results of an original source equivalent; and wherein the automatic placement of the graphical cells provides a single display component group as a composite of graphical cells that are arranged horizontally, vertically and/or in depth in accordance with one or more placement algorithms performed using the data operated on by the corresponding data application objects represented by the graphical cells.

2. The method according to claim 1, wherein the placement algorithms include determining intra and inter-relationships among objects.

3. The method according to claim 1, wherein the placement algorithms include determining one or more of component heuristics, inter-component relationships and intra-component relationships.

4. The method according to claim 1, wherein the placement algorithms include applying one or more of usage, process and expert user knowledge defined into an algorithm.

5. The method according to claim 1, wherein the placement algorithms include a placement strategy to place graphical cells representing related data application objects in one or more of a left to right process clustered around a center horizontal axis in a "T" configuration, a bottom to top and left to right process in an "L" configuration.

6. The method according to claim 1, wherein a "Z" algorithm that places data application objects onto cells using a composite of "L" and "T" configurations based on the clumping of intra-relationships of related components and inter-relationships of related components represented by the graphical cells.

7. The method according to claim 1, wherein the component groups comprise a plurality of hierarchical levels, and wherein the display controls include a navigation aid that provides a quick one or two button click from any primary level (application) and/or secondary level (library) component to a third level (object) component group located anywhere on the virtual graphical display.

8. The method according to claim 1, wherein the component groups comprise a plurality of hierarchical levels, and wherein the display controls include a single click function on a neutral image area in the virtual graphical display that turns "on" or "off" the display of all third level component groups.

9. The method according to claim 1, wherein the component groups comprise a plurality of hierarchical levels, and wherein the display controls include a single click function on a primary level (application) image that turns "on" or "off" the display of all third level component groups that belong to the selected primary level component group.

10. The method according to claim 1, wherein the component groups comprise a plurality of hierarchical levels, and wherein the display controls include a single click function on a primary level (application) component group that highlights the display of all secondary level component groups that belong to the selected primary level component group.

11. The method according to claim 1, wherein the component groups comprise a plurality of hierarchical levels, and wherein the display controls include a single click function on a secondary level (library) component group that highlights the display of all third level component groups that belong to the selected secondary level component group.

12. The method according to claim 1, wherein the automatic placement of graphical cells and the providing of the virtual graphical display are performed in a device-independent manner and wherein the display controls include a pan ability to point and click to slide the virtual graphical display logically via a reference link, to the left, to the right, to the top and to the bottom on a physical display device.

13. The method according to claim 12, further comprising presenting the virtual graphical display on the physical device, the physical device being one or more of a desktop computer display, a laptop computer display, a flat panel display and a smart phone display.

14. The method according to claim 1, wherein the step of managing display of the data applications further includes providing a graphical search engine to access, audit, find, display and show language object hierarchy and to display for all first instance search matches for any data application object and to display all secondary references via an INCLUDE object.

15. The method according to claim 1, wherein the step of managing display of the data applications further includes providing a version object as a visual icon to toggle through all published and unpublished versions of the data application object.

16. The method according to claim 1, wherein the step of managing display of the data applications further includes providing a zoom method to click on a variable object in a selected data application object as a logical zoom to display corresponding object detail.

17. The method according to claim 1, wherein the step of managing display of the data applications further includes providing a zoom method to click on a language object in a selected data application object as a logical zoom to display corresponding object detail.

18. The method according to claim 1, further comprising a horizontal data computing process enabling a transaction for a data application object to support the application functionality but at the data level using the data application object structure and execution process without invoking traditional vendor applications.

19. The method according to claim 1, wherein execution of the data application object data processes to obtain, process, and move data to a target location is accomplished without additional conventional programming as a single interactive transaction or as a data process with the one to multiple data sources.

20. The method according to claim 1, wherein unique data processes are provided to a user via a user object that includes allowing customized object functions created by the user for specialized function processes to be incorporated with a data application object not contained in the language, variable or connector objects.

21. The method according to claim 1, further comprising:
providing for creation of additional versions of a published data application object to be configured for new requirements, wherein the additional versions are represented by graphical cells that form the depth plane (Z) within the virtual graphical display,
wherein a new version of a data application object comprises an independently functioning data application object;
providing new version of the data object with a new, unique identifier;
providing a version object as a visual icon to toggle through all published and unpublished versions of the data application object; and
providing revision authority to the data object version to create a new data application Object.

22. The method according to claim 21, further comprising enabling an audit and tracking process for all versions of the original data application object and corresponds to a version level that provides modified data objects by author within data use and access.

23. The method according to claim 1, further comprising providing a process to execute a compiled data application object via a scheduled job that is defined and designated by a computer operating system to execute as one or more of an individual local transaction for specific data, an individual web-based transaction for specific data or an extended data process against one or multiple data sources, wherein the number of data application objects in the execution process can be one to many per each scheduled job.

24. The method according to claim 1, wherein the structured framework includes repeat-use processes used to define each of the Variable, Language, and Connector objects and to create and publish the integrated data application object,
wherein the data application object is thereby created via individual graphical displays through a series of predictable, repeat use commands, pre-defined format processes, and then analyzed with test or live data prior to and after publishing using a point and single click process, and
wherein the framework processes have the capability to produce and manage an unlimited number of variations and versions of data application objects.

25. The method according to claim 1, wherein the step of managing the data applications further includes providing a process to insert by command into a data application object other existing data application objects as an INCLUDE object that executes as part of the combined data application object, wherein a data application object can have multiple INCLUDE objects, wherein the INCLUDE object's data processes are used by the data application object, wherein a data application object being can be used as an INCLUDE object in multiple data application objects, and wherein the data application object used as an INCLUDE object continues as an independent data object executing its data processes.

26. A system for processing data using a computer, comprising:
a managing process executed by the computer that is configured to manage the processing of data that is distributed among one to multiple data sources, including:
providing a data application object as a compiled union of a variable object, a language object, a connector object, and one or more user objects that provide functionality to browse, analyze or edit the variable, language and connector objects or to zoom onto the data application object, wherein the data application object is adapted to be managed as a single integrated object;
providing a programming process for creating the variable object as a data schema of a source and a target data structure in the data, the language object as a data application for an execution process, and the connector object which defines a connection between the source and target data structures,
wherein a structured framework is provided for defining data variables of the variable object, creating a compute application for the language object, and defining the source and target data structures for the connector object; and
allowing for asynchronous execution of the compiled data application object as an Import, Compute, Export (ICE) method; and
a display process executed by the computer for managing display of the data applications, including:
providing a virtual graphical display that comprises a horizontal plane (X), vertical plane (Y) and depth plane (Z);
automatically placing graphical cells on the virtual graphical display along one or more of the horizontal, vertical and depth planes; and
providing display controls used to navigate, search and investigate data application objects that are represented by the graphical cells and that operate on the data and for exploding selected graphical cells into screens used to build, drill into and maintain the data application objects,
an enabling process executed by the computer that allows subject matter expert users to achieve application characteristics applied to data sources among the one to multiple data sources, including:
providing a bi-directional algorithm to enable a data application object to support data movement between data sources bi-directionally through an iterative inverse process with execution of a connector object process;
providing a function for extending a current formula or adding new command options;
providing a function for extending current or additional formulas through a series of spread sheet function and for enabling creation of one or more components of the language object; and
providing an automatic documentation process of each of the variable, language, connector and analysis objects within the compiled data application object,
wherein the step of providing the bi-directional algorithm allows for executing an application in the forward and then executing the application in the reverse direction to yield the equivalent results of an original source equivalent, and wherein the automatic placement of the graphical cells provides a single display component group as a composite of graphical cells that are arranged horizontally, vertically and/or in depth in accordance with one or more placement algorithms performed using the data operated on by the corresponding data application objects represented by the graphical cells.

* * * * *